US010715300B2

(12) United States Patent
Ren et al.

(10) Patent No.: US 10,715,300 B2
(45) Date of Patent: Jul. 14, 2020

(54) DEMODULATION REFERENCE SIGNAL INDICATING AND RECEIVING METHODS, TRANSMIT END, AND RECEIVE END

(71) Applicant: Huawei Technologies Co., Ltd., Shenzhen (CN)

(72) Inventors: Xiang Ren, Shanghai (CN); Yong Liu, Shanghai (CN); Lu Rong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/517,198

(22) Filed: Jul. 19, 2019

(65) Prior Publication Data
US 2019/0342062 A1 Nov. 7, 2019

Related U.S. Application Data

(63) Continuation of application No. PCT/CN2018/096201, filed on Jul. 19, 2018.

(30) Foreign Application Priority Data

Aug. 11, 2017 (CN) .......................... 2017 1 0686645
Nov. 17, 2017 (CN) .......................... 2017 1 1147995

(51) Int. Cl.
*H04W 4/00* (2018.01)
*H04L 5/10* (2006.01)
(Continued)

(52) U.S. Cl.
CPC ............. *H04L 5/10* (2013.01); *H04L 5/0051* (2013.01); *H04L 5/026* (2013.01); *H04W 76/27* (2018.02)

(58) Field of Classification Search
None
See application file for complete search history.

(56) References Cited

U.S. PATENT DOCUMENTS

2012/0300709 A1   11/2012   Su et al.
2013/0022087 A1    1/2013   Chen et al.
(Continued)

FOREIGN PATENT DOCUMENTS

CN   102082595 A   6/2011
CN   102088429 A   6/2011
(Continued)

OTHER PUBLICATIONS

"Design of DL DMRS for Data Transmission," 3GPP TSG RAN WG1 NR Ad-Hoc Meeting, Spokane, USA, R1-1700067, pp. 1-4, 3rd Generation Partnership Project—Valbonne, France (Jan. 16-20, 2017).
(Continued)

*Primary Examiner* — Clemence S Han
(74) *Attorney, Agent, or Firm* — Leydig, Voit & Mayer, Ltd.

(57) ABSTRACT

A demodulation reference signal (DMRS) indicating method, a DMRS receiving method, and an apparatus are described. A transmit end determines, from a plurality of groups of demodulation reference signal DMRS configuration information, DMRS configuration information corresponding to a current DMRS transmission scheme. The transmit end obtains DMRS indication information based on the DMRS configuration information, where each group of DMRS configuration information includes a plurality of pieces of DMRSs configuration information. The transmit end sends the DMRS indication information. The described method and the apparatus are implemented to match a plurality of New Radio (NR) scenarios. The described
(Continued)

operations can satisfy a requirement for transmitting more layers of data and reduce indication overheads.

20 Claims, 22 Drawing Sheets

(51) Int. Cl.
*H04W 76/27* (2018.01)
*H04L 5/00* (2006.01)
*H04L 5/02* (2006.01)

(56) References Cited

U.S. PATENT DOCUMENTS

| | | | |
|---|---|---|---|
| 2013/0039332 | A1 | 2/2013 | Nazar et al. |
| 2014/0307757 | A1* | 10/2014 | Seo .................. H04L 5/0023 375/147 |
| 2015/0236801 | A1 | 8/2015 | Sun et al. |
| 2015/0237602 | A1 | 8/2015 | Chae et al. |
| 2015/0282123 | A1 | 10/2015 | Miao et al. |
| 2015/0319750 | A1 | 11/2015 | Ko et al. |
| 2017/0078006 | A1 | 3/2017 | Liu et al. |
| 2018/0026684 | A1* | 1/2018 | Wei .................. H04B 7/0452 370/329 |
| 2018/0205577 | A1 | 7/2018 | Shin et al. |
| 2019/0013910 | A1 | 1/2019 | Zhang et al. |
| 2019/0013916 | A1 | 1/2019 | Jin et al. |
| 2019/0140801 | A1* | 5/2019 | Ko ..................... H04L 5/005 |

FOREIGN PATENT DOCUMENTS

| | | |
|---|---|---|
| CN | 102158302 A | 8/2011 |
| CN | 102714527 A | 10/2012 |
| CN | 102957471 A | 3/2013 |
| CN | 103684676 A | 3/2014 |
| CN | 105900387 A | 8/2016 |
| CN | 106063180 A | 10/2016 |
| CN | 106470087 A | 3/2017 |
| CN | 106470088 A | 3/2017 |
| WO | 2014046503 A1 | 3/2014 |
| WO | 2016127309 A1 | 8/2016 |
| WO | 2017007240 A1 | 1/2017 |

OTHER PUBLICATIONS

"Design of DL DMRS for Data Transmission," 3GPP TSG RAN WG1 Meeting #88, Athens, Greece, R1-1701692, pp. 1-5, 3rd Generation Partnership Project—Valbonne, France (Feb. 13-17, 2017).

"Rate Matching for Data Channel," 3GPP TSG RAN WG1 NR Ad Hoc Meeting, Qingdao, China, R1-1709933, pp. 1-5, 3rd Generation Partnership Project—Valbonne, France (Jun. 27-30, 2017).

"Signaling of DMRS Ports for SU/MU-MIMO," 3GPP TSG RAN WG1 NR Ad Hoc Meeting, Qingdao, China, R1-1710455, pp. 1-6, 3rd Generation Partnership Project—Valbonne, France (Jun. 27-30, 2017).

"On the Remaining Details of DM-RS Design," 3GPP TSG RAN WG1 NR Ad-Hoc#2, Qingdao, P.R. China, R1-1710534, pp. 1-4, 3rd Generation Partnership Project—Valbonne, France (Jun. 27-30, 2017).

"3rd Generation Partnership Project; Technical Specification Group Radio Access Network; NR; Physical Channels and Modulation (Release 15)," 3GPP TS 38.211, V0.1.0, pp. 1-22, 3rd Generation Partnership Project—Valbonne, France (Jun. 2017).

"3rd Generation Partnership Project; Technical Specification Group Radio Access Network; NR; Multiplexing and Channel Coding (Release 15)," 3GPP TS 38.212, V0.0.0, pp. 1-10, 3rd Generation Partnership Project—Valbonne, France (May 2017).

"3rd Generation Partnership Project; Technical Specification Group Radio Access Network; NR; Physical Layer Procedures for Data (Release 15)," 3GPP TS 38.214, V0.0.1, pp. 1-30, 3rd Generation Partnership Project—Valbonne, France (Jul. 2017).

"3rd Generation Partnership Project; Technical Specification Group Radio Access Network; Evolved Universal Terrestrial Radio Access (E-UTRA); Physical Layer Procedures (Release 14)," 3GPP TS 36.213, V14.3.0, pp. 1-460, 3rd Generation Partnership Project—Valbonne, France (Jun. 2017).

* cited by examiner

DMRS configuration 2-1 symbol

RMI=1/'01'

Mapping order: CDM->FDM

30(a)

| Value | RMI |
|---|---|
| 0 | 2 |
| 1 | 4 |

| 3/4 | 1/2 | 3/4 | 1/2 | 3/4 | 1/2 | 3/4 | 1/2 | 3/4 | 1/2 | 3/4 | 1/2 |

30(b)

| Value | RMI |
|---|---|
| 0 | 4 |
| 1 | 8 |

| 5-8 | 1-4 | 5-8 | 1-4 | 5-8 | 1-4 | 5-8 | 1-4 | 5-8 | 1-4 |

30(c)

| Value | RMI |
|---|---|
| 0 | 2 |
| 1 | 4 |
| 2 | 6 |
| 3 | Reserved |

| 5/6 | 5/6 | 3/4 | 3/4 | 1/2 | 1/2 | 5/6 | 5/6 | 3/4 | 3/4 | 1/2 | 1/2 |

30(d)

| Value | RMI |
|---|---|
| 0 | 4 |
| 1 | 8 |
| 2 | 12 |
| 3 | Reserved |

| 9-12 | 5-8 | 1-4 | 9-12 | 5-8 | 1-4 |

30(e)

| Value | RMI |
|---|---|
| 0 | 2 |
| 1 | 4 |
| 2 | 6 |
| 3 | Reserved |

| 5/6/11/12 | 3/4/9/10 | 1/2/7/8 | 5/6/11/12 | 3/4/9/10 | 1/2/7/8 |

FIG. 30

Mapping order: FDM->CDM

31(a):

| 2/4 | 1/3 | 2/4 | 1/3 | 2/4 | 1/3 | 2/4 | 1/3 | 2/4 | 1/3 | 2/4 | 1/3 |
|---|---|---|---|---|---|---|---|---|---|---|---|

| Value | RMI |
|---|---|
| 0 | 1 |
| 1 | 2 |

31(b):

| 2/4/6/8 | 1/3/5/7 | 2/4/6/8 | 1/3/5/7 | 2/4/6/8 | 1/3/5/7 | 2/4/6/8 | 1/3/5/7 | 2/4/6/8 | 1/3/5/7 | 2/4/6/8 | 1/3/5/7 |
|---|---|---|---|---|---|---|---|---|---|---|---|

| Value | RMI |
|---|---|
| 0 | 1 |
| 1 | 2 |

31(c):

| 3/6 | 3/6 | 2/5 | 2/5 | 1/4 | 1/4 | 3/6 | 3/6 | 2/5 | 2/5 | 1/4 | 1/4 |
|---|---|---|---|---|---|---|---|---|---|---|---|

| Value | RMI |
|---|---|
| 0 | 1 |
| 1 | 2 |
| 2 | 3 |
| 3 | Reserved |

31(d):

| 3/6/9/12 | 2/5/8/11 | 1/4/7/10 | 3/6/9/12 | 2/5/8/11 | 1/4/7/10 |
|---|---|---|---|---|---|

| Value | RMI |
|---|---|
| 0 | 1 |
| 1 | 2 |
| 2 | 3 |
| 3 | Reserved |

FIG. 31

Port mapping order: LTE: CDM->FDM->CDM

32(a)

| 3/4 | 1/2 | 3/4 | 1/2 | 3/4 | 1/2 | 3/4 | 1/2 | 3/4 | 1/2 | 3/4 | 1/2 |
|---|---|---|---|---|---|---|---|---|---|---|---|

| Value | RMI |
|---|---|
| 0 | 2 |
| 1 | 4 |

32(b)

| 3/4/6/8 | 1/2/5/7 | 3/4/6/8 | 1/2/5/7 | 3/4/6/8 | 1/2/5/7 | 3/4/6/8 | 1/2/5/7 | 3/4/6/8 | 1/2/5/7 | 3/4/6/8 | 1/2/5/7 |
|---|---|---|---|---|---|---|---|---|---|---|---|

| Value | RMI |
|---|---|
| 0 | 2 |
| 1 | 4 |

32(c)

| 5/6 | 5/6 | 3/4 | 3/4 | 1/2 | 1/2 | 5/6 | 5/6 | 3/4 | 3/4 | 1/2 | 1/2 |
|---|---|---|---|---|---|---|---|---|---|---|---|

| Value | RMI |
|---|---|
| 0 | 2 |
| 1 | 4 |
| 2 | 6 |
| 3 | Reserved |

32(d)

| 5/6/9/12 | 3/4/8/11 | 1/2/7/10 | 5/6/9/12 | 3/4/8/11 | 1/2/7/10 |
|---|---|---|---|---|---|

| Value | RMI |
|---|---|
| 0 | 2 |
| 1 | 4 |
| 2 | 6 |
| 3 | Reserved |

DMRS type 1, two CDM groups, which mutually mute QCL groups of peer TRPs ical Field

DEMODULATION REFERENCE SIGNAL INDICATING AND RECEIVING METHODS, TRANSMIT END, AND RECEIVE END

CROSS-REFERENCE TO RELATED APPLICATIONS

This application is a continuation of International Application No. PCT/CN2018/096201, filed on Jul. 19, 2018, which claims priority to Chinese Patent Application No. 201710686645.9, filed on Aug. 11, 2017 and Chinese Patent Application No. 201711147995.4, filed on Nov. 17, 2017. The disclosures of the aforementioned applications are hereby incorporated by reference in their entireties.

TECHNICAL FIELD

This application relates to the communications field, and in particular, to demodulation reference signal (DMRS) indicating and receiving methods, a transmit end, and a receive end.

BACKGROUND

In a multiple-input multiple-output (MIMO) technology, resources in spatial dimension are used, so that a signal may spatially obtain array gains, multiplexing and diversity gains, and interference cancellation gains without increasing a system bandwidth, thereby exponentially improving a capacity and spectral efficiency of a communications system. For example, in a Long Term Evolution (LTE) system, a single user supports multiplexing of a maximum of eight layers of orthogonal DMRS ports, and a DMRS occupies 24 resource elements (Res). Specifically, in frequency domain, DMRS ports may be mapped onto the zeroth, the first, the fifth, the sixth, the tenth, and the eleventh subcarriers in each resource block (RB) pair, and in time domain, DMRS ports may be mapped onto the fifth, the sixth, the twelfth, and the thirteenth symbols in each subframe, as shown in FIG. 1.

However, as people have increasingly high communication requirements such as a high rate, high reliability, and a low latency, modern communications systems will always face challenges of a larger capacity, wider coverage, and a lower latency. These requirements are also key requirements on a New Radio (NR) future network.

In a demodulation process at a receive end in the communications systems, compared with incoherent demodulation, coherent demodulation has better performance, and has a performance gain of approximately 3 dB. Therefore, the coherent demodulation is more widely used in the modern communications systems. However, modulation on each carrier in an orthogonal frequency-division multiplexing (OFDM) system is to suppress the carrier. Reference signals (RS), also referred to as pilot signals, are required during the coherent demodulation at the receive end. In an OFDM symbol, they are distributed on different resource units in two-dimensional time-frequency space, and have amplitudes and phases that are known. Likewise, in a MIMO system, each transmitting antenna (a virtual antenna or a physical antenna) has an independent data channel. Based on a predicted RS signal, a receiver performs channel estimation for each transmitting antenna, and restores sent data based on the estimation.

The channel estimation is a process in which a received signal is reconstructed to compensate for channel fading and noise. In this process, time-domain and frequency-domain changes of a channel are tracked by using RSs predicted by a transmitter and a receiver. For example, to implement data demodulation in a high-order multi-antenna system, an LTE-A system defines a demodulation reference signal (DMRS). The reference signal is used for demodulating uplink and downlink control channels and a data channel such as a physical downlink shared channel (PDSCH).

A same preprocessing manner is used for the DMRS and user data. Characteristics of the DMRS are as follows:

(1) The DMRS is user-specific. To be specific, a same precoding matrix is used for each piece of terminal data and a demodulation reference signal corresponding to the terminal data.

(2) From a perspective of a network side, DMRSs transmitted on layers are mutually orthogonal.

(3) The DMRS is usually used to support beamforming and precoding technologies, and therefore, is sent only on a scheduled resource block, where a quantity of sent DMRS ports is related to a quantity of data streams (or referred to as a quantity of layers). The DMRS ports are in one-to-one correspondence with antenna ports rather than a quantity of physical antennas. The quantity of DMRS ports is less than or equal to the quantity of physical antennas, and the two quantities are associated through layer mapping and precoding.

In a current standard, a maximum quantity of orthogonal data streams that can be supported by DMRSs used on a downlink is 8, resource overheads of each PRB pair are 24 REs, and the DMRSs are distributed in all PRBs in forms of block pilots. Each port (port) occupies 12 REs. In other words, densities of the ports are the same. In addition, a design of a DMRS sequence is determined based on the density of each port, and therefore, a length of the DMRS sequence is a fixed value.

However, New Radio (NR) supports more diverse scenarios, and therefore supports a plurality of configurations (patterns). For example, to adapt to data transmission in different frequency bands, multiplexing modes differ greatly. In addition, to further satisfy a larger-capacity transmission requirement, a maximum quantity of orthogonal data streams that can be supported by DMRSs on a data channel is greater than 8. For example, in the 3GPP RAN1 #88bis meeting, it was agreed that 12 orthogonal DMRS ports are supported.

Moreover, in the LTE system, all transceiver antennas have a very low dimension. Therefore, a multiple user (MU) dimension supported during MU matching is relatively low. For example, during MU scheduling, a maximum of two layers are allowed for a single user, and there are a total of four orthogonal layers. Compared with the LTE system, in a future network, four receive antennas may be necessary for future UE. In this case, an MU dimension changes.

During actual transmission, a base station needs to notify a terminal of information such as a quantity of layers that are allocated by the base station, a DMRS port number, a sequence configuration, and a multiplexing mode. In LTE, all of the information is indicated by using downlink control information (DCI). However, NR has supported a plurality of patterns, there are a plurality of variations in a quantity of ports, a multiplexing mode, and a mapping rule, and very high overheads are caused if the DCI-based indication manner in LTE is still used. Therefore, how to indicate a DMRS in NR is a technical problem that urgently needs to be resolved.

SUMMARY

To resolve the foregoing technical problem, this application provides a demodulation reference signal indicating and receiving method and an apparatus.

A quantity of orthogonal ports that are for code division multiplexing (CDM) type multiplexing and that can be supported by an MU-MIMO scenario in an NR system is different from that in LTE, and a maximum of 12 orthogonal ports can be supported. Therefore, a manner in LTE is no longer applicable in which a terminal is notified, based on only a DMRS configuration information table, of information such as a quantity of layers that are allocated in LTE, an orthogonal DMRS port number, a sequence configuration, and a multiplexing mode. In embodiments of this application, a plurality of groups of DMRS configuration information are designed to respectively match DMRS transmission requirements in different scenarios in a future network (new radio, or NR).

According to a first aspect, a demodulation reference signal indicating and receiving method provided in this application includes: determining, by a transmit end from a plurality of groups of DMRS configuration information, DMRS configuration information corresponding to a current DMRS transmission scheme, and obtaining DMRS indication information based on the DMRS configuration information, where each group of DMRS configuration information includes a plurality of pieces of DMRS configuration information; sending the DMRS indication information to a receive end; and assisting, by the receive end, in demodulating data after receiving the DMRS indication information.

In this embodiment of this application, the current DMRS transmission scheme is indicated by using the indication information, and different DMRS transmission schemes correspond to different maximum supported orthogonal-port quantities, or correspond to different DMRS patterns or different DMRS configuration types.

The maximum supported orthogonal-port quantities in DMRS configuration information corresponding to the different DMRS transmission schemes are different.

Lengths of DMRS indication information corresponding to the different DMRS transmission schemes are different.

A plurality of DMRS ports in the plurality of pieces of DMRS configuration information belong to different code division multiplexing (CDM) groups, where different CDM groups satisfy a non-quasi co-location (QCL) relationship.

In an implementation, for different maximum supported orthogonal-port quantities, different groups of DMRS configuration information may be configured. The group of DMRS configuration information includes a plurality of pieces of DMRS configuration information. For example, in MIMO scenarios in which a maximum supported orthogonal-port quantity is 4, a maximum supported orthogonal-port quantity is 6, a maximum supported orthogonal-port quantity is 8, and a maximum supported orthogonal-port quantity is 12, corresponding DMRS configuration information is separately configured. The DMRS configuration information is used to inform the receive end of an orthogonal DMRS port number, a sequence configuration, a multiplexing mode, and the like that can be used by the receive end, thereby correctly decoding data.

In another implementation, the DMRS configuration information is configured for different DMRS patterns. Usually, one DMRS pattern corresponds to one MIMO scenario that supports a maximum supported orthogonal-port quantity or a maximum supported orthogonal-transmission-layer quantity. The DMRS pattern shows a quantity of orthogonal port groups supported by the MIMO scenario and a quantity of resource units included in each orthogonal port group. Therefore, configuring different DMRS configuration information for different DMRS patterns can also enable the receive end to know an orthogonal DMRS port number, a sequence configuration, a multiplexing mode, and the like that can be used by the receive end, thereby correctly decoding data.

In an implementation of the first aspect, the DMRS configuration information may be presented by a protocol-agreed table, and a specific implementation form thereof may be a downlink control information (DCI) table. A plurality of DCI tables include at least one group of different DMRS configuration information. One group of DMRS configuration information includes a plurality of pieces of DMRS configuration information, and is presented by one table. The table is referred to as a DMRS configuration information table in this specification.

The DMRS transmission scheme corresponding to the DMRS indication information is sent by using higher layer signaling, for example, radio resource control (RRC) signaling. Certainly, the DMRS configuration information may alternatively be bound with another configuration parameter, for example, a carrier frequency, a carrier spacing, or a frame structure, corresponding to a scenario. In this way, the DMRS indication information can be sent by using DCI signaling or a media access control control element (MAC CE).

During specific implementation, each DMRS configuration information table corresponds to a different maximum supported orthogonal-port quantity (port). For example, the maximum supported orthogonal-port quantity may be at least two of {4, 6, 8, 12}.

In another implementation, each DMRS configuration information table may correspond to a different DMRS pattern or DMRS configuration type.

In an implementation, in the DMRS configuration information table, column arrangement design is performed based on an orthogonal port group. For example, column arrangement design is performed on an orthogonal port combination having four or less transmission layers and an orthogonal port combination having more than four transmission layers.

In an implementation, when the DMRS configuration information is presented in a form of a DMRS configuration information table, division may be performed based on a codeword number, or may be performed based on a total maximum supported orthogonal-port quantity or a quantity of transmission layers at the receive end, instead of a codeword number. Specifically, division may be performed based on a ratio.

The DMRS configuration information table further includes indication information of a total quantity of orthogonal ports, and the indication information may indicate a quantity of all orthogonal ports that are possibly actually presented or a quantized value of a quantity of all orthogonal ports that are possibly actually presented. The quantized value of the quantity of all the orthogonal ports may be information about a quantity of orthogonal DMRS layers, indication information of an orthogonal DMRS antenna port set, CDM group information of an orthogonal DMRS antenna port, or information generated based on a CDM group size. It should be understood that the total quantity of orthogonal ports is the same as a total quantity of orthogonal DMRS transmission layers. The CDM group information of the orthogonal DMRS antenna port may be a number of CDM groups, a number of CDM groups, or CDM group state information.

It should be noted that the plurality of groups of DMRS configuration information may be presented by using a general information table. In other words, a plurality of DMRS configuration information tables may be a general information table, the general information table supports the maximum supported orthogonal-port quantity, and the plurality of DMRS configuration information tables are subsets of the general information table. A subset may be selected from the general information table based on the maximum supported orthogonal-port quantity, the DMRS pattern, or the higher layer signaling.

In the DMRS configuration information, the CDM group information of the orthogonal DMRS antenna port is CDM group state information, a CDM group sequence number, a number of CDM groups, or a number of CDM groups. In an implementation, the number of CDM groups is a quantity of CDM group occupied/scheduled (co-scheduled) in a system.

The DMRS configuration information further includes DMRS symbol information.

An available range of the DMRS configuration information is bound to a parameter indicating a maximum number of symbols of a DMRS in radio resource control signaling RRC.

The available range of the DMRS configuration information is bound with a parameter that is in the Radio Resource Control RRC signaling and that indicates the maximum number of symbols of the DMRS.

In cases of different maximum symbol quantities of the DMRS, lengths of downlink control information DCI signaling for performing DMRS port scheduling are different, quantities of bits in DCI are different, or DCI fields are different.

When single-user SU scheduling is performed by using the DMRS configuration information, FDM scheduling is first performed in two CDM groups. A quantity of orthogonal ports that are for CDM multiplexing and that can be supported by a MIMO scenario in an NR system is different from that in LTE, and a maximum of 12 orthogonal ports can be supported. The terminal usually needs to know port information of another terminal that is co-scheduled, to learn of RE locations that are occupied by DMRSs on ports used by the another terminal and at which no data of the terminal is transmitted. If the terminal cannot learn of the information, the terminal may use a DMRS from another user as the data of the terminal for decoding, leading to a decoding error. An effective DMRS rate matching indicating manner is required to show how to enable a terminal to know ports on which DMRSs are occupied. To resolve the technical problem, this application provides a demodulation reference signal indicating method and receiving method, including: generating, by a transmit end, demodulation reference signal DMRS indication information, where the DMRS indication information is used to indicate a resource that is not occupied by DMRS and that is in resources available for carrying a DMRS; sending, by the transmit end, the DMRS indication information to a receive end; and demodulating, by the receive end based on the DMRS indication information, data on the resource that is not occupied by DMRS, where specifically, the receive end needs to receive the DMRS indication information by using downlink control information or a Media Access Control control element.

The receive end obtains, based on the received DMRS indication information, a current quantized quantity of orthogonal transmission layers, a combination of currently used port group states, an orthogonal-transmission-layer quantity or a port group state that is not currently used by the receive end, or a resource unit that needs to be muted, to obtain the resource that is not occupied by DMRS and that is in the resources available for carrying a DMRS.

In an implementation, before receiving the DMRS indication information, the receive end further receives DMRS transmission scheme indication information indicating current DMRS transmission scheme. Different DMRS transmission schemes correspond to different maximum supported orthogonal-port quantities, or correspond to different DMRS patterns or different DMRS configuration types.

It should be understood that, the DMRS transmission scheme is reflected by using a DMRS pattern, a DMRS configuration type, or a maximum supported orthogonal-port quantity.

It should be noted that herein, the maximum supported orthogonal-port quantity is a maximum quantity of orthogonal ports that can be scheduled by the transmit end in a current frame. For example, a 12-port DMRS pattern can be used. However, a current maximum quantity of scheduled ports is only 4, and the maximum supported orthogonal-port quantity is related to base station scheduling, and is less than or equal to a maximum quantity of orthogonal ports supported by the DMRS pattern.

For example, in an MU-MIMO scenario in which a maximum supported orthogonal-port quantity is 4, 6, 8, or 12, or in a scenario in which a maximum supported non-orthogonal-port quantity is 8, 12, 16, or 24 (a scenario with two scrambling codes), corresponding DMRS indication information is separately configured. In other words, based on different maximum supported orthogonal-port quantities, corresponding DMRS indication information is separately configured. The indication information is used to inform the receive end of resource units on a time-frequency resource that are occupied by DMRSs of other users and on which no data of the receive end exists. In this way, the receive end can avoid these resource units during data demodulation, to correctly decode data.

In another implementation, the DMRS indication information is configured for different DMRS patterns, or may be configured in correspondence with a quantity of DMRS port groups in a DMRS pattern (for example, there may be two tables respectively corresponding to DMRS patterns that include two or three DMRS port groups).

Usually, one DMRS pattern corresponds to one MU-MIMO scenario supporting a maximum supported orthogonal-port quantity. The DMRS pattern shows a quantity of orthogonal CDM port groups supported by the MU-MIMO scenario and a quantity of resource units included in each port group. Therefore, different indication information is configured for different DMRS patterns.

In still another implementation, the indication information may be further configured for a DMRS configuration type.

In all of the foregoing implementations, the receive end may be informed of resource units on a time-frequency resource that are occupied by DMRSs of other users, so that the receive end can correctly decode data.

In an implementation, the receive end needs to receive a signaled correspondence between the DMRS indication information and the resource that is not occupied by DMRS and that is in the resources available for carrying a DMRS. The signaling described herein is usually higher layer signaling, for example, RRC signaling.

In another implementation, the receive end further stores DMRS configuration information. In other words, a correspondence between the DMRS indication information and the resource that is not occupied by DMRS and that is in the resources available for carrying a DMRS can be found in the locally stored DMRS configuration information.

In this embodiment of this application, the DMRS configuration information further includes indication information of a total quantity of orthogonal ports, and the indication information for the total quantity of orthogonal ports may indicate a quantity of all orthogonal ports that are possibly actually presented or a quantized value of a quantity of all orthogonal ports that are possibly actually presented. The quantized value of the quantity of all the orthogonal ports is information about a quantity of orthogonal DMRS layers, indication information of an orthogonal DMRS antenna port set, CDM group information of an orthogonal DMRS antenna port, or information generated based on a CDM group size. The CDM group information of the orthogonal DMRS antenna port is a number of CDM groups, a number of CDM groups, or CDM group state information.

In the information about the quantity of orthogonal DMRS layers, the quantity of orthogonal DMRS layers is an integer multiple of a quantity of DMRS antenna ports in a CDM group, an integer multiple of a quantity of DMRS antenna ports having consecutive sequence numbers in a CDM group, or a value of a sequence number of a DMRS antenna port in a CDM group. During specific implementation, the information about the quantity of DMRS layers may be information about a quantity of DMRS layers that are quantized through grading. In the information about the quantity of DMRS layers that are quantized through grading, the quantity of DMRS layers may be an integer multiple of a quantity of DMRS antenna ports in a CDM group. For example, for a DMRS pattern including two DMRS antenna port groups, assuming that DMRS ports included in a port group 1 are 11, 2, 3, 41, and DMRS ports included in a port group 2 are {5, 6, 7, 8}, the port group 1 and the port group 2 may be quantized into four layers and eight layers. In addition, in the information about the quantity of DMRS layers, the quantity of DMRS layers may alternatively be an integer multiple of a quantity of DMRS antenna ports having consecutive sequence numbers in ascending order in a CDM group. For example, CDM groups {1, 2, 5, 7} and {3, 4, 6, 8} may be quantized into two layers and four layers. All of the information can enable the receive end to identify which resource units are occupied by the DMRS of the receive end, and which resource units are occupied by DMRSs of other receive ends that implement CDM multiplexing. Remaining resource units are used for data transmission related to the receive end. Therefore, the receive end demodulates data on a corresponding resource unit.

A reason for using the quantized value of the quantity of orthogonal transmission layers is that if a specific quantity of transmission layers of the receive end needs to be indicated, for example, if transmission layer quantities {1, 2, 3, 4} need to be separately indicated, two bits are required for indication. When the transmission layer quantities {1, 2, 3, 4} are quantized, for example, quantized upward into a transmission layer quantity 4, or quantized downward into a transmission layer quantity 1, or when the transmission layer quantities {1, 2, 3, 4} are represented by 2 or 3, only one bit is required to indicate the quantized value of the quantity of transmission layers. For example, 0 is used to represent a quantized value 4 of the transmission layer quantity. Therefore, indication overheads can be reduced.

Based on the foregoing principle, in this embodiment of this application, the DMRS indication information may indicate the quantized value of the quantity of orthogonal transmission layers. One manner is implicit indication, and another manner is explicit indication.

In the implicit indication solution, the quantized value of the quantity of orthogonal transmission layers is configured in a DMRS configuration information table, and the indication information is indicated by using DMRS indication information (a value) in the DMRS configuration information table. The DMRS configuration information table may be similar to that in LTE. For example, the DMRS indication information is a quantity of antenna ports, a scrambling identification (scrambling identification), and an indication of a quantity of transmission layers that are in LTE. The DMRS configuration information table may further include at least one of a DMRS port quantity, a port index, sequence generation information, and a CDM type. Based on this, the quantized value of the quantity of transmission layers is added. The DMRS configuration information table may be stored at both the transmit end and the receive end. The transmit end sends the indication information to the receive end. It should be understood that, the transmit end sends original DCI signaling in LTE (because the signaling in LTE is still used, the DCI signaling may not be named as indication information, but may indicate a rate matching solution) to the receive end. The receive end obtains, based on the signaling, port information of the receive end and a total quantized quantity of transmission layers in a system, and calculates, with reference to the two pieces of information, a port used by another receive end. In other words, the receive end identifies which resource units are used for DMRS transmission at the receive end and which resource units are used for DMRS transmission at other receive ends that implement CDM multiplexing. Remaining resource units are used for data transmission related to the receive end. Therefore, the receive end demodulates data on a corresponding resource unit.

In the explicit signaling indication solution, a correspondence between the indication information and the quantized value of the quantity of orthogonal transmission layers exists independently of a DMRS configuration information table in LTE. In other words, the correspondence between the indication information and the quantized value of the quantity of transmission layers is not implied in the DMRS configuration information table. Therefore, in addition to the DMRS configuration information table, the transmit end and the receive end further separately store a correspondence configuration table between the indication information and the quantized value of the quantity of transmission layers (or the information table may be configured through RRC). The correspondence configuration table exists independently of the DMRS configuration information table. The transmit end sends rate configuration indication information to the receive end through implicit signaling. The receive end uses the indication information as an index, and searches the correspondence configuration table for a corresponding quantized value of a quantity of transmission layers. The receive end combines the quantized value of the quantity of transmission layers with the DMRS configuration information table, to identify which resource units are occupied by the DMRS of the receive end, and which resource units are occupied by DMRSs of other receive ends that implement CDM multiplexing. Remaining resource units are used for data transmission related to the receive end. Therefore, the receive end demodulates data on a corresponding resource unit.

It should be noted that indication information having a same value may correspond to quantized values of different quantities of transmission layers. Therefore, the correspondence between the indication information and the quantized value of the quantity of transmission layers may alternatively be indicated through separate signaling.

It should be understood that, in the explicit indication solution, the quantized quantity of transmission layers is indicated by using the indication information. The receive end receives two pieces of signaling, where one piece of signaling is DMRS DCI signaling in LTE, and the other piece of signaling is indication information signaling (which may also be referred to as rate matching signaling in this specification) used to transmit a current quantized quantity of transmission layers.

It may be understood that, regardless of the implicit indication solution or the explicit indication solution, the DMRS indication information may be sent to the receive end as independent signaling or may be carried in downlink signaling for sending, for example, downlink control information DCI. This is not limited herein.

In an implementation, whether to send the DMRS indication information is determined based on a codeword quantity. For example, in a case of one codeword, signaling is triggered to send the DMRS indication information, but in a case of two codewords, the signaling is not sent. This is because in the case of one codeword, there are a single-user (SU) scenario and a multi-user (MU) scenario, while in the case of two codewords, there is only single-user (SU) scenario. In the single user multiple-input multiple-output (SU-MIMO) scenario corresponding to the two codewords, when the transmit end, for example, a base station, communicates with only one receive end (a terminal), only information (RS, control signaling, data, or the like) of the terminal is transmitted on a time-frequency resource. In this case, the terminal can directly learn of locations of DMRS REs of the terminal based on the information of the terminal (for example, a port, a quantity of layers, or the like of the terminal), and avoid the REs during data decoding. Therefore, there is no DMRS rate matching problem in the SU scenario.

According to a second aspect of the embodiments of this application, a DMRS rate matching indicating and receiving method is further provided. The method includes: in a 2-PDCCH scenario, two TRPs in a non-QCL group are used, where each TRP mutes a resource unit corresponding to a DMRS that is of a QCL group and that is not used by the TRP, and then transmits data, one TRP may have DMRSs of one or more QCL groups, and this behavior may be a default operation; or in a 1-PDCCH scenario, a transmit end needs to send DMRS indication information to a receive end, where the DMRS indication information indicates a resource unit corresponding to a DMRS in one or more QCL groups used by the transmit end.

In the 2-PDCCH scenario or the 1-PDCCH scenario, the transmit end notifies the receive end also in two manners.

Manner 1: The transmit end sends DMRS indication information to the receive end. The DMRS indication information indicates, in the 2-PDCCH scenario, a current quantized quantity of transmission layers in a DMRS port that may be used by the TRP, or in the 1-PDCCH scenario, a total quantity of layers that may be used by a coordinating TRP in a current system.

Manner 2: In the 2-PDCCH scenario, for different DMRS patterns, the receive end may use a DMRS configuration information table that corresponds to the DMRS patterns and that includes DMRS indication information, to perform rate matching. It should be noted that, the DMRS pattern herein is a DMRS pattern including DMRS ports in a QCL group that may be used by the TRP. Alternatively, in the 1-PDCCH scenario, a coordinating TRP may use a DMRS pattern including DMRS ports in a plurality of QCL groups.

It should be noted that, a plurality of DMRS configuration information tables may alternatively be a general information table, the general information table supports a maximum supported port quantity, and the plurality of DMRS configuration information tables are subsets of the general information table. A subset may be selected from the general information table based on the maximum supported port quantity, the DMRS pattern, or higher layer signaling.

In an implementation in which the DMRS indication information indicates DMRS antenna port set information, the DMRS antenna port set information indicates a status of an occupied DMRS antenna port group based on an actual quantity of DMRS layers that are scheduled in a current system. For example, a port group 1 is {1, 2, 3, 4}, and a port group 2 is {5, 6, 7, 8}. It is assumed that the base station performs scheduling in ascending order of DMRS port numbers. When a quantity of scheduled layers is 4, it indicates that the port group 1 is occupied. When the quantity of scheduled layers is greater than 4, it indicates that the port groups 1 and 2 are occupied. This is only an example, and specific port number grouping and base station scheduling are not limited herein.

In an implementation in which the DMRS indication information indicates code division multiplexing CDM group information of the DMRS antenna port, the code division multiplexing CDM group information includes CDM port group information that is of a DMRS antenna port and that is not used by the receive end, or a sum of DMRS antenna port group information used by the receive end and DMRS antenna port group information not used by the receive end.

The DMRS CDM port group information not used by the receive end may include at least one of the following states:

1. Data can be transmitted on all DMRS RE locations (SU);

2. All DMRS RE locations are occupied (MU). This case includes: the receive end uses one (or two) DMRS port CDM group and other two (or one) CDM groups are occupied, or the receive end uses two DMRS port CDM groups and another one CDM group is occupied.

3. A larger one of two port groups that are not of the receive end is muted (MU, where UE uses one port group); and 4. A smaller one of two port groups that are not of the receive end is muted (MU, where UE uses one port group).

It should be understood that, "larger" and "smaller" may be defined as a comparison between maximum or minimum port numbers in two CDM port groups (in other words, a relative relationship between DMRS port groups that are not of UE).

During specific implementation, for the states 3 and 4, no comparison between "larger" and "smaller" may exist. For example, the DMRS CDM port group information may be a port number included in a port group or a number of a port group.

The DMRS CDM port group information not used by the receive end may be bound with a DMRS type (a DMRS configuration/Type 1/A or 2/B), or bound with a quantity (2 or 3) of CDM groups included in a pattern.

This manner of indicating the DMRS port group status not used by the receive end can further reduce indication overheads. In addition, this manner can further support a plurality of scenarios and has better universality. For example, 1-PDCCH NC-JT, dynamic TDD, and 2-PDCCH NC-JT may be directly supported, and an existing instruction has few changes.

According to another aspect, an embodiment of this application provides a transmit end. The transmit end includes: a processor, for determining, from a plurality of groups of demodulation reference signal DMRS configuration information, DMRS configuration information corresponding to a current DMRS transmission scheme, and obtaining DMRS indication information based on the DMRS configuration information, where each group of DMRS configuration information includes a plurality of pieces of DMRS configuration information; and a transceiver, for sending the DMRS indication information.

According to another aspect, an embodiment of this application provides a transmit end, including: a processor, for generating demodulation reference signal DMRS indication information, where the DMRS indication information corresponds to a maximum supported port quantity, a DMRS pattern, or a DMRS configuration type; and a transceiver, for sending the DMRS indication information.

According to another aspect, this application provides a receive end, including: a transceiver, for receiving demodulation reference signal DMRS indication information sent by a transmit end, where the DMRS indication information is obtained by the transmit end based on demodulation reference signal DMRS configuration information, the DMRS configuration information is determined by the transmit end from a plurality of groups of DMRS configuration information based on a current DMRS transmission scheme, and each group of DMRS configuration information includes a plurality of pieces of DMRS configuration information; and a processor, configured to obtain the DMRS configuration information and assisting in demodulating data, based on the DMRS indication information received by the transceiver.

According to still another aspect, this application provides another transmit end, including: a processor, for generating demodulation reference signal DMRS indication information, where the DMRS indication information is used to indicate a resource that is not occupied by DMRS and that is in resources available for carrying a DMRS; and a transceiver, for sending the DMRS indication information.

According to still another aspect, this application provides another receive end, including: a transceiver, configured to receive demodulation reference signal DMRS indication information, where the DMRS indication information is used to indicate a resource that is not occupied by DMRS and that is in resources available for carrying a DMRS; and a processor, configured to demodulate, based on the DMRS indication information, data on the resource that is not occupied by DMRS.

When being applied to an uplink transmission scenario, the foregoing apparatus may be a terminal. When being applied to a downlink transmission scenario, the apparatus may be a network side device. The network side device may be a base station or a control node.

The network side device may include a system and a device for improving a peer device in a conventional wireless telecommunications system. Such a senior or next-generation device may be included in an evolved wireless communications standard (for example, Long Term Evolution (LTE)).

According to another aspect, an embodiment of this application provides a base station. The base station has functions of implementing behavior of the base station in the foregoing method designs. The functions may be implemented by hardware, or may be implemented by hardware executing corresponding software. The hardware or software includes one or more modules corresponding to the foregoing functions.

In a possible design, a structure of the base station includes a processor and a transceiver. The processor is configured to support the base station in performing a corresponding function in the foregoing methods. The transceiver is configured to: support the base station in communicating with a terminal, send, to the terminal, the information or the signaling in the foregoing methods, and receive information or an instruction sent by the base station. The base station may further include a memory. The memory is configured to be coupled to the processor. The memory stores a program instruction and data that are necessary for the base station.

When being applied to an uplink transmission scenario, the foregoing apparatus may be a network device. When being applied to a downlink transmission scenario, the apparatus may be a terminal. The terminal has functions of implementing behavior of the terminal in the foregoing method designs. The functions may be implemented by hardware, and a structure of the terminal includes a transceiver and a processor. Alternatively, the functions may be implemented by hardware executing corresponding software. The hardware or software includes one or more modules corresponding to the foregoing functions. The module may be software and/or hardware.

According to still another aspect, an embodiment of this application further provides a processing apparatus, including a processor and an interface.

The processor is a processor of the foregoing transmit end or of the foregoing receive end.

The processing apparatus may be a chip. The processor may be implemented by hardware or software. When being implemented by hardware, the processor may be a logic circuit, an integrated circuit, or the like. When being implemented by software, the processor may be a general-purpose processor, and may be implemented by reading software code stored in a memory. The memory may be integrated in the processor, or may exist independently of the processor.

According to yet another aspect, an embodiment of this application provides a communications system. The system includes the base station and the terminal in the foregoing aspects, and optionally, may further include the control node in the foregoing embodiments.

According to still another aspect, an embodiment of this application provides a computer storage medium, configured to store a computer software instruction used by the foregoing base station. The computer storage medium includes a program designed for executing the foregoing aspects.

According to still another aspect, an embodiment of this application provides a computer storage medium, configured to store a computer software instruction used by the foregoing terminal. The computer storage medium includes a program designed for executing the foregoing aspects.

According to the demodulation reference signal sending method and apparatus and the demodulation reference signal obtaining method and apparatus provided in this application, a plurality of pieces of DMRS configuration information may be matched with a plurality of scenarios in NR, to satisfy a requirement for transmitting more layers of data. In addition, the plurality of information tables support switching. This can further reduce indication overheads.

According to another aspect of the embodiments of the present invention, a data sending method is provided. The method is used for sending a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. The plurality of DMRS ports are allocated to at least two transmit-end devices, and DMRS ports allocated to each transmit-end device belong to a same port group. The method includes the following designs.

In a possible design, each transmit-end device maps a codeword to a data stream corresponding to a DMRS port allocated to the transmit-end device; and each transmit-end device sends, to the receive-end device, the data stream corresponding to the DMRS port allocated to the transmit-end device.

In a possible design, the at least two transmit-end devices are at least two antenna panels of a same transmit-end device; the mapping, by each transmit-end device, a codeword to a data stream corresponding to a DMRS port allocated to the transmit-end device is specifically: mapping, by the same transmit-end device for each antenna panel, a codeword to a data stream corresponding to a DMRS port allocated to the antenna panel; and the sending, by each transmit-end device to the receive-end device, the data stream corresponding to the DMRS port allocated to the transmit-end device is specifically: sending, by each antenna panel to the receive-end device, the data stream corresponding to the DMRS port allocated to the antenna panel.

In a possible design, before the mapping, by each transmit-end device, a codeword to a data stream corresponding to a DMRS port allocated to the transmit-end device, the method further includes: sending, by one of the at least two transmit-end devices, indication information to the receive-end device, where the indication information is used to indicate the plurality of DMRS ports allocated to the receive-end device.

In a possible design, before the mapping, by each transmit-end device, a codeword to a data stream corresponding to a DMRS port allocated to the transmit-end device, the method further includes: sending, by the same transmit-end device, indication information to the receive-end device, where the indication information is used to indicate the plurality of DMRS ports allocated to the receive-end device.

In various aspects and possible designs of this embodiment of the present invention, a quantity of the plurality of data streams (in other words, a quantity of the plurality of DMRS ports) is less than or equal to 4, but may not be limited thereto. For example, the technical solution provided in this embodiment of the present invention may be applied to a scenario in which a quantity of data streams is less than or equal to 4, but is not applied to a scenario in which a quantity of data streams is greater than 4. Further, in the scenario in which the quantity of data streams is less than or equal to 4, the technical solution provided in this embodiment of the present invention may be applied to a scenario in which the quantity of data streams is 3 and/or 4 (in other words, the quantity of the plurality of data streams is 3 and/or 4), but is not applied to a scenario in which the quantity of the plurality of data streams is 4. Certainly, the technical solution provided in this embodiment of the present invention may not be limited to the foregoing scenarios.

According to a second aspect of the embodiments of the present invention, a data receiving method is provided. The method includes: receiving a plurality of data streams through a plurality of DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship; and restoring, by a receive-end device for each of the at least two port groups, a codeword based on a data stream corresponding to a DMRS port that is in the plurality of DMRS ports and that is in the port group.

In a possible design, before the receiving a plurality of data streams, the method further includes: receiving indication information, where the indication information is used to indicate the plurality of DMRS ports.

In a possible design, a quantity of the plurality of data streams (in other words, a quantity of the plurality of DMRS ports) is less than or equal to 4, but may not be limited thereto. For example, the technical solution provided in this embodiment of the present invention may be applied to a scenario in which a quantity of data streams is less than or equal to 4, but is not applied to a scenario in which a quantity of data streams is greater than 4. Further, in the scenario in which the quantity of data streams is less than or equal to 4, the technical solution provided in this embodiment of the present invention may be applied to a scenario in which the quantity of data streams is 3 and/or 4 (in other words, the quantity of the plurality of data streams is 3 and/or 4), but is not applied to a scenario in which the quantity of the plurality of data streams is 4. Certainly, the technical solution provided in this embodiment of the present invention may not be limited to the foregoing scenarios.

According to a third aspect of the embodiments of the present invention, a data receiving method is provided. The method includes: receiving a plurality of data streams through a plurality of DMRS ports, where the plurality of DMRS ports belong to a same port group, and DMRS ports in the port group satisfy a quasi co-location QCL relationship; and restoring a codeword based on the plurality of data streams.

In a possible design, before the receiving a plurality of data streams, the method further includes: receiving indication information, where the indication information is used to indicate the plurality of DMRS ports.

In a possible design, a quantity of the plurality of data streams is less than or equal to 4.

In the foregoing various aspects and possible designs, the indication information is downlink control information DCI.

The data stream is also referred to as a data layer.

According to a fourth aspect of the embodiments of the present invention, a transmit-end device is provided. The transmit-end device is configured to send, together with at least one other transmit-end device, a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. The plurality of DMRS ports are allocated to the transmit-end device and the at least one other transmit-end device, DMRS ports allocated to the transmit-end device and each of the at least one other transmit-end device belong to a same port group. The transmit-end device includes: a mapping module, configured to map a codeword to a data stream corresponding to a DMRS port allocated to the transmit-end device; and a transmitting module, configured to send, to the receive-end device, the data stream corresponding to the DMRS port allocated to the transmit-end device.

In a possible design, the transmit-end device and the at least one other transmit-end device are at least two antenna panels of a same transmit-end device; the mapping module is disposed in the same transmit-end device, and the mapping module is specifically configured to map, for each antenna panel, a codeword to a data stream corresponding to a DMRS port allocated to the antenna panel; and the transmitting module is disposed in the same transmit-end device, and the transmitting module is specifically configured to: send, by each antenna panel to the receive-end device, the data stream corresponding to the DMRS port allocated to the antenna panel.

In a possible design, the transmitting module is further configured to send indication information to the receive-end device, where the indication information is used to indicate the plurality of DMRS ports allocated to the receive-end device.

In a possible design, a quantity of the plurality of data streams is less than or equal to 4.

According to a fifth aspect of the embodiments of the present invention, a receive-end device is provided. The receive-end device includes: a receiving module, configured to receive a plurality of data streams through a plurality of DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship; and a restoration module, configured to restore, for each of the at least two port groups, a codeword based on a data stream corresponding to a DMRS port that is in the plurality of DMRS ports and that is in the port group.

In a possible design, the receiving module is further configured to receive indication information, where the indication information is used to indicate the plurality of DMRS ports.

In a possible design, a quantity of the plurality of data streams is less than or equal to 4.

According to a sixth aspect of the embodiments of the present invention, a receive-end device is provided. The receive-end device includes: a receiving module, configured to receive a plurality of data streams through a plurality of DMRS ports, where the plurality of DMRS ports belong to a same port group, and DMRS ports in the port group satisfy a quasi co-location QCL relationship; and a restoration module, configured to restore a codeword based on the plurality of data streams.

In a possible design, the receiving module is further configured to receive indication information, where the indication information is used to indicate the plurality of DMRS ports.

In a possible design, a quantity of the plurality of data streams is less than or equal to 4.

In the foregoing various aspects and designs of this embodiment of the present invention, the indication information may be downlink control information DCI.

According to a seventh aspect of the embodiments of the present invention, a data sending method is provided. The method is used for sending a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. The plurality of DMRS ports are allocated to a same transmit-end device. For each port group, the method includes: mapping, by the transmit-end device, a codeword to a data stream corresponding to a DMRS port that is in the plurality of DMRS ports and that is in the port group; and sending, by the transmit-end device, the data stream to the receive-end device.

In a possible design, the method further includes: sending, by the transmit-end device, indication information to the receive-end device, where the indication information is used to indicate the plurality of DMRS ports allocated to the receive-end device.

In a possible design, a quantity of the plurality of data streams is less than or equal to 4.

According to an eighth aspect of the embodiments of the present invention, a transmit-end device is provided. The transmit-end device is configured to send a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. The plurality of DMRS ports are allocated to the transmit-end device. The transmit-end device includes: a mapping module, configured to map, for each port group, a codeword to a data stream corresponding to a DMRS port that is in the plurality of DMRS ports and that is in the port group; and a transmitting module, configured to send the data stream to the receive-end device.

In a possible design, the method further includes: the transmitting module is further configured to send indication information to the receive-end device, where the indication information is used to indicate the plurality of DMRS ports allocated to the receive-end device.

In a possible design, a quantity of the plurality of data streams is less than or equal to 4.

To sum up, the embodiments of the present invention provide a data sending method. The method is used for sending a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. For each port group, the method includes: mapping a codeword to a data stream corresponding to a DMRS port that is in the plurality of DMRS ports and that is in the port group; and sending the data stream to the receive-end device.

In a possible design, the method further includes: sending indication information to the receive-end device, where the indication information is used to indicate the plurality of DMRS ports allocated to the receive-end device.

In a possible design, a quantity of the plurality of data streams is less than or equal to 4.

In a possible design, the plurality of DMRS ports may be allocated to a same transmit-end device; or may be allocated to a plurality of antenna panels of a same transmit-end device, where DMRS ports allocated to each antenna panel belong to a same port group; or may be allocated to a plurality of transmit-end devices serving a same receive-end device (for example, based on a coordinated multi-point (CoMP) related technology), where DMRS ports allocated to each transmit-end device belong to a same port group. In addition, the DMRS ports may alternatively be allocated to one or more transmit-end devices in another manner, for example, but not limited to, various feasible combinations of the foregoing several manners.

Correspondingly, an embodiment of the present invention further provides a data receiving method, including: receiving a plurality of data streams through a plurality of DMRS ports, where the plurality of DMRS ports belong to a same port group or at least two port groups, DMRS ports in each port group satisfy a quasi co-location QCL relationship, and any DMRS port in each port group and any DMRS port in any other port group satisfy a non-quasi co-location Non-QCL relationship; and restoring, by a receive-end device for the same port group or each of the at least two port groups, a codeword based on a data stream corresponding to a DMRS port that is in the plurality of DMRS ports and that is in the port group.

In a possible design, before the receiving a plurality of data streams, the method further includes: receiving indication information, where the indication information is used to indicate the plurality of DMRS ports.

A quantity of the plurality of data streams is less than or equal to 4.

It is easily understood that, on a side of the receive-end device, the receive-end device may not need to be concerned about whether the plurality of DMRS ports come from a same transmit-end device, a plurality of antenna panels of a same transmit-end device, or a plurality of transmit-end devices.

Quasi co-location (QCL) is usually used to describe similar large-scale fading, similar spatial directions (for example, but not limited to, beam directions), and the like. Therefore, non-quasi co-location (Non-QCL) is usually used to describe different large-scale fading, different spatial directions, and the like. Related content of the QCL and the non-QCL has been clearly described in the prior art, and therefore, is not described herein.

During actual transmission, an information bit is usually divided in a form of a transport block (Transport Block, TB), and a transport block may be a codeword (CW). For content related to the TB and the CW, refer to the prior art.

Usually, DMRS ports supported by a system may be grouped into a plurality of port groups, DMRS ports in each port group satisfy a QCL relationship, and any DMRS port in each port group and any DMRS port in any other port group satisfy a non-QCL relationship. When a plurality of transmit-end devices serve a same receive-end device, DMRS ports allocated to each transmit-end device come from a same port group. For example, DMRS ports 0 to 9 may be grouped into two port groups, namely, a port group 1 and a port group 2, where the DMRS ports 0 to 4 belong to the port group 1, and the DMRS ports 5 to 9 belong to the port group 2. When DMRS ports are allocated to a transmit-end device, any quantity of DMRS ports in the port group 1 may be allocated to the transmit-end device, or any quantity of DMRS ports in the port group 2 may be allocated to the transmit-end device. In addition, regardless of whether a receive-end device is served by a plurality of transmit-end devices or a single transmit-end device, DMRS ports allocated to a same transmit-end device may come from a same port group or from different port groups. For example, when the DMRS ports come from a same port group, the port 1 and the port 2 in the port group 1 may be allocated to the transmit-end device. When the DMRS ports come from different port groups, the ports 2 and 3 in the port group 1 and the ports 8 and 9 in the port group 2 may be allocated to the transmit-end device. It is easily understood that, when DMRS ports allocated to a same transmit-end device come from different port groups, wireless transmission performed by the transmit-end device through the DMRS ports in the different port groups has a non-QCL characteristic, for example, has different large-scale fading, different spatial directions, or the like. When DMRS ports allocated to a same transmit-end device come from a same port group, wireless transmission performed by the transmit-end device through the DMRS ports in the same port group has a QCL characteristic, for example, has similar large-scale fading, similar spatial directions, or the like.

For related content of grouping DMRS ports into a plurality of port groups, refer to the prior art. For example, a grouping status of DMRS ports may be preset in the transmit-end device and the receive-end device before delivery, or the transmit-end device may notify the receive-end device of a grouping status of DMRS ports. For example, but not limited to that, the transmit-end device notifies the receive-end device of the grouping status by using an Radio Resource Control (RRC) message, for example, but not limited to, periodically or when the receive-end device accesses a communications network. When DMRS ports are grouped into a plurality of port groups, a DMRS port may be allocated to the transmit-end device based on a grouping status and a specific requirement (for example, various application scenarios, such as CoMP).

The plurality of transmit-end devices may be a plurality of transmit-end devices, or may be a plurality of antenna panels of a same transmit-end device. The transmit-end device may be, for example, but not limited to, a base station. The receive-end device may be, for example, but not limited to, a terminal.

For the process of mapping the codeword to the data stream and the process of restoring the codeword from the data stream, refer to the prior art.

When the plurality of transmit-end devices serve a same receive-end device, the indication information may be sent by one of the plurality of transmit-end devices. In this case, the transmit-end device sending the indication information may be referred to as a serving device, and other transmit-end devices may be referred to as coordinating devices.

The data stream may also be referred to as a data layer, and usually, may be obtained by performing layer mapping on a codeword. For a specific process, refer to the prior art.

The steps in the foregoing method may be performed by one or more processors, or may be performed by one or more processors executing a program.

Functions of the modules of the transmit-end device and the receive-end device may be performed by one or more processors, or may be performed by one or more processors executing a program.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

FIG. 30 is another schematic diagram of a correspondence between indication information and a pattern in a DMRS indicating and receiving method according to an embodiment of this application;

FIG. 31 is another schematic diagram of a correspondence between indication information and a pattern in a DMRS indicating and receiving method according to an embodiment of this application;

FIG. 32 is another schematic diagram of a correspondence between indication information and a pattern in a DMRS indicating and receiving method according to an embodiment of this application;

Figure 33:
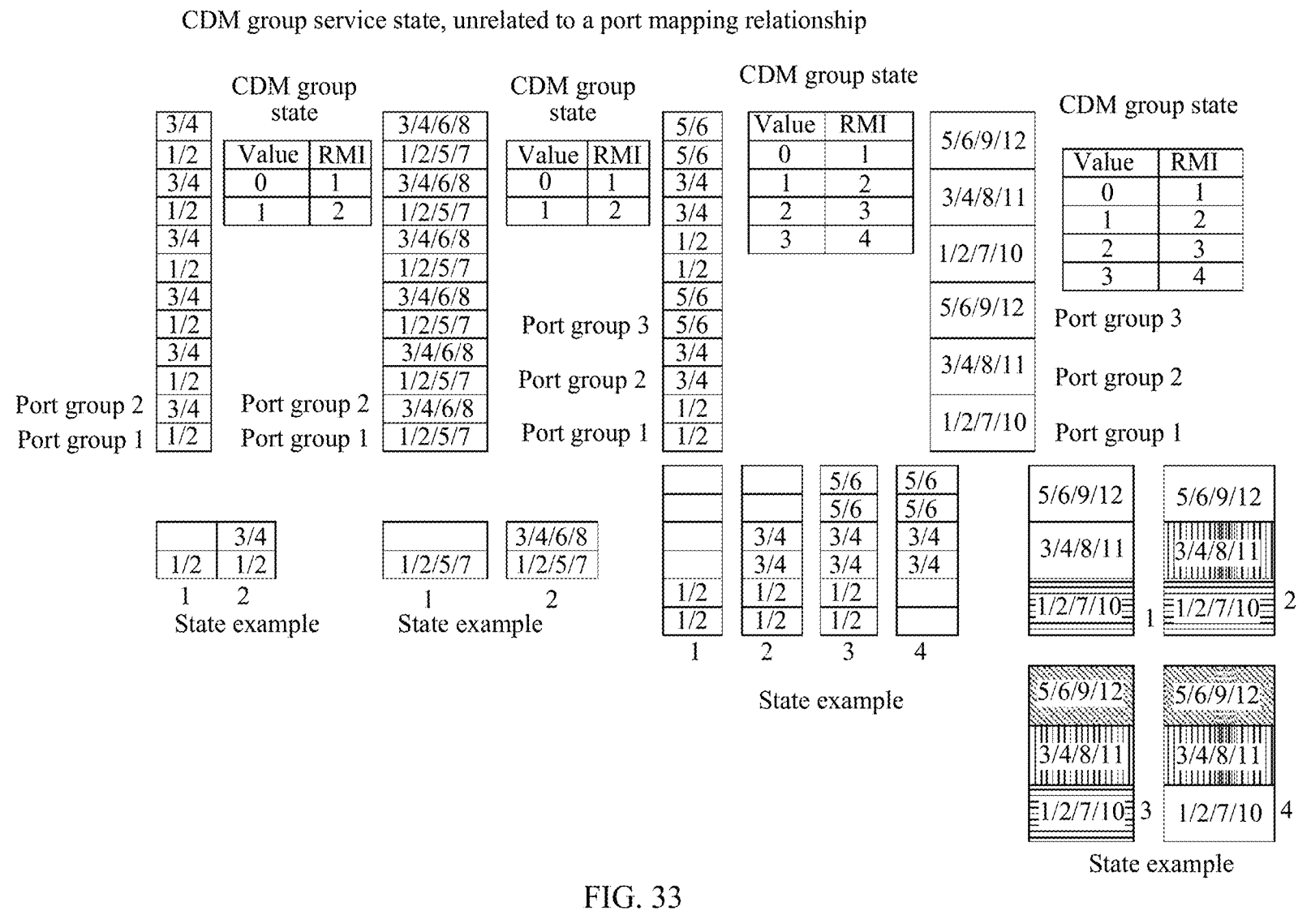

FIG. 33 is another schematic diagram of a correspondence between indication information and a pattern in a DMRS indicating and receiving method according to an embodiment of this application;

DESCRIPTION OF EMBODIMENTS

First, to facilitate understanding by readers, related terms in this specification are briefly described.

(1) Resource Unit

Similar to an RB and an RB pair in an LTE standard, a resource unit is provided in some embodiments of this application. The resource unit may be used as a basic unit for scheduling a terminal to allocate a resource, or may be used to describe a manner of arranging a plurality of reference signals.

The resource unit may include a plurality of consecutive subcarriers in frequency domain and a time interval (TI) in time domain. In different scheduling processes, sizes of a resource unit may be the same or different. The TI herein may be a transmission time interval (TTI) in an LTE system, a symbol-level short TTI, a short TTI in a large subcarrier spacing in a high-frequency system, a slot or a mini-slot in a 5G system, or the like. This is not limited in this application.

Figure 1:
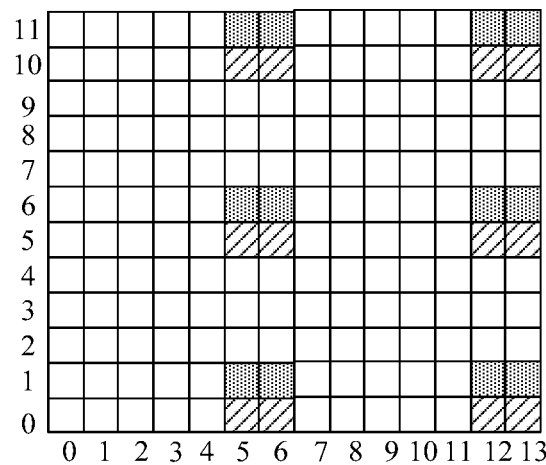
FIG. 1 is a schematic diagram of a pilot pattern in the prior art.
Figure 2:
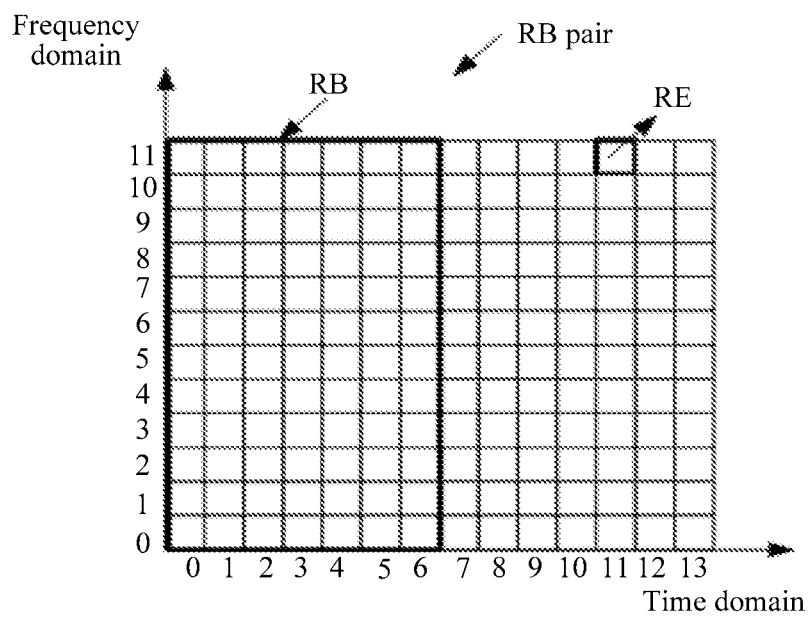
FIG. 2 is a schematic diagram of a resource unit according to an embodiment of this application.

Optionally, one resource unit may include one or more RBs, one or more RB pairs, or the like, or may be half an RB or the like. In addition, the resource unit may be another time-frequency resource. This is not limited in this application. One RB pair includes 12 consecutive subcarriers in frequency domain and a subframe in time domain. A time-frequency resource including one subcarrier in frequency domain and one symbol in time domain is a resource element (RE), as shown in FIG. 2. An RB pair in FIG. 2 includes 12 consecutive subcarriers (numbered from 0 to 11)

in frequency domain and 14 symbols (numbered from 0 to 13) in time domain. In FIG. 2, a horizontal coordinate indicates the time domain, and a vertical coordinate indicates the frequency domain. It should be noted that all accompanying drawings indicating a time domain resource in this application are described based on an example of the RB pair shown in FIG. 2. A person skilled in the art may understand that specific implementation is not limited thereto. It may be understood that, the "symbol" in this application may include but is not limited to any one of the following: an orthogonal frequency division multiplexing (OFDM) symbol, a universal filtered multi-carrier (UFMC) signal, a filter-band multi-carrier (FBMC) symbol, a generalized frequency-division multiplexing (GFDM) symbol, and the like.

(2) DMRS Port Group

The "DMRS port group" used in this application is a logical concept introduced to clearly describe technical solutions provided in this application, and specifically, is a logical concept introduced to clearly describe a pilot pattern or a variant thereof provided in this application. It may be understood that, during actual implementation, a base station and a terminal may not group DMRS ports, and a pilot pattern or a variant thereof designed in any manner and described in this application shall fall within the protection scope of this application.

One DMRS port group may include one or more DMRS ports. In this application, a same time-frequency resource is multiplexed for DMRSs corresponding to ports in a DMRS port group through CDM, for example, orthogonal cover code (OCC), cyclic shift (CS), cyclic phase rotation, or a combination of a plurality of the foregoing methods, for example, OCC+CS. A technical solution in which a time-frequency resource is multiplexed for a plurality of reference signals through CDM has been clearly described in the prior art, and details are not described in this specification.

(3) System-Supported DMRS Port

A system-supported DMRS port may be considered as a DMRS port that can be used by the base station. During actual implementation, the base station may schedule a terminal by using some or all of DMRS port supported by the base station. A maximum supported orthogonal-port quantity is a maximum value of a quantity of orthogonal DMRS ports that can be supported by the system or the base station.

In this application, that a quantity of system-supported DMRS ports is 4, 6, 8, and 12 is used as an example for description.

(4) Other Terms

"A plurality of" in this specification indicates two or more than two.

Terms "first" and "second" in this specification are only intended to distinguish between different objects, but do not limit a sequence of the objects. For example, a first symbol group and a second symbol group are only intended to distinguish between different symbol groups, but do not limit a sequence.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

The following describes the technical solutions provided in this application with reference to the accompanying drawings.

The technical solutions provided in this application may be applied to various communications systems, for example, current 2G, 3G, and 4G communications systems, and future evolved networks such as a 5G communications system, for example, an LTE system, a 3rd Generation Partnership Project (3GPP) related cellular system, and other communications systems of this type, and particularly, may be applied to a 5G NR system.

It should be noted that a 5G standard may include a machine to machine (machine to machine, M2M) scenario, a device to machine (D2M) scenario, a macro/micro communication scenario, an enhanced mobile broadband (eMBB) scenario, an ultra-reliable and low latency communication (uRLLC) scenario, a massive machine type communication (mMTC) scenario, and the like. These scenarios may include but are not limited to a communication scenario between terminals, a communication scenario between base stations, a communication scenario between a base station and a terminal, and the like. The technical solutions provided in the embodiments of this application may also be applied to scenarios such as communication between terminals or communication between base stations in the 5G communications system.

Figure 3:
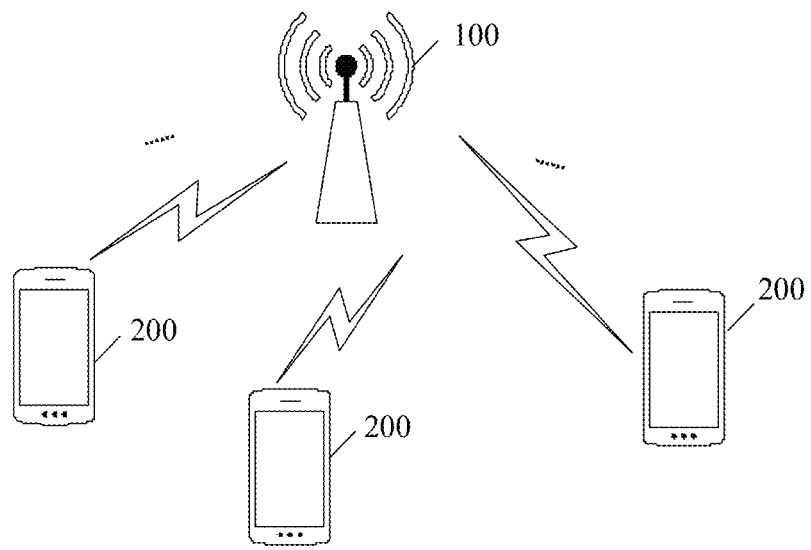
FIG. 3 is a schematic diagram of a system architecture to which the technical solutions provided in the embodiments of this application are applicable.

The technical solutions provided in the embodiments of this application may be applied to a system architecture shown in FIG. 3. The system architecture may include a base station 100 and one or more terminals 200 connected to the base station 100.

Figure 4:
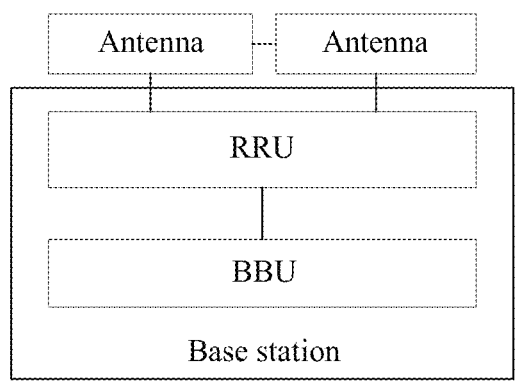
FIG. 4 is a schematic structural diagram of a base station according to an embodiment of this application.

In an example, the base station 100 may be implemented by using a structure shown in FIG. 4.

The base station 100 may be a device capable of communicating with the terminal 200. The base station 100 may be a relay station, an access point, or the like. The base station 100 may be a base transceiver station (BTS) in a Global System for Mobile Communications (GSM) or in a Code Division Multiple Access (CDMA) network, or may be an NB (NodeB) in Wideband Code Division Multiple Access (WCDMA), or may be an eNB or eNodeB (evolved-NodeB) in LTE. Alternatively, the base station 100 may be a wireless controller in a cloud radio access network (CRAN) scenario. Alternatively, the base station 100 may be a network device in a 5G network or a network device in a future evolved PLMN network, or may be a wearable device, an in-vehicle device, or the like.

The terminal 200 may be user equipment (UE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a future 5G network, or a terminal in a future evolved PLMN network, or the like.

A universal hardware architecture of the base station 100 is described. As shown in FIG. 4, the base station may include a building baseband unit (BBU) and a remote radio unit (RRU). The RRU is connected to an antenna feed system (in other words, an antenna), and the BBU and the RRU may be disassembled for use based on a requirement. It should be noted that, in a specific implementation process, the base station 100 may further use another universal hardware architecture, and is not limited to the universal hardware architecture shown in FIG. 4.

Figure 5:
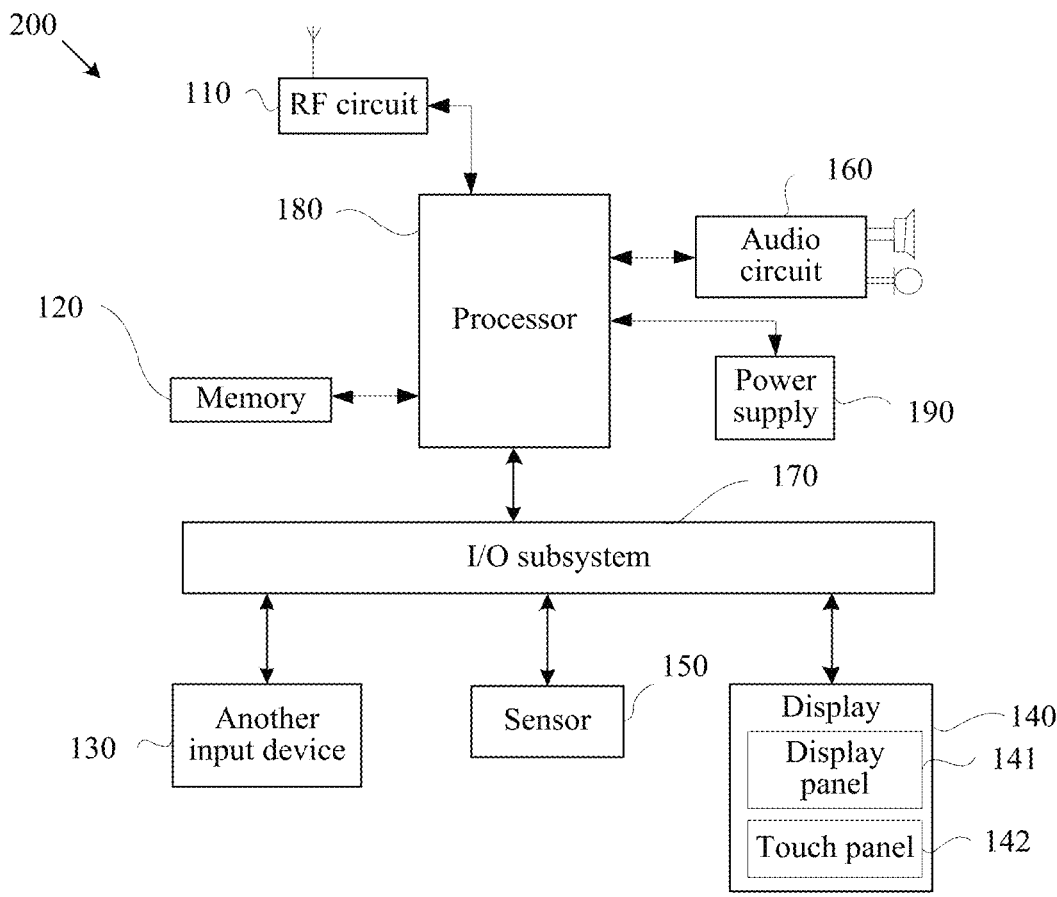
FIG. 5 is a schematic structural diagram of a terminal according to an embodiment of this application.

That the terminal 200 is a mobile phone is used as an example to describe a universal hardware architecture of the mobile phone. As shown in FIG. 5, the mobile phone includes components such as a radio frequency (RF) circuit 110, a memory 120, another input device 130, a display screen 140, a sensor 150, an audio circuit 160, an I/O subsystem 170, a processor 180, and a power supply 190. A person skilled in the art may understand that the structure of the mobile phone shown in FIG. 5 does not constitute a limitation on the mobile phone, and the mobile phone may include more or fewer components than those shown in the figure, or some components may be combined, some components may be disassembled, or different component arrangements may be used. A person skilled in the art may understand that the display screen 140 belongs to a user interface (UI), and the display screen 140 may include a display panel 141 and a touch panel 142. In addition, the mobile phone may include more or fewer components than those shown in the figure. Although not shown, the mobile phone may further include functional modules or parts such as a camera and a Bluetooth module, and details are not described herein.

Further, the processor 180 is connected to all of the RF circuit 110, the memory 120, the audio circuit 160, the I/O subsystem 170, and the power supply 190. The I/O subsystem 170 is connected to all of the another input device 130, the display screen 140, and the sensor 150. The RF circuit 110 may be configured to send and receive signals in an information sending and receiving process or a call process. Particularly, the RF circuit receives downlink information from a base station, and then delivers the downlink information to the processor 180 for processing. The memory 120 may be configured to store a software program and module. The processor 180 runs the software program and module that are stored in the memory 120, to perform various functional applications of the mobile phone and process data. The another input device 130 may be configured to: receive input digit or character information, and generate a key signal input related to a user setting and function control of the mobile phone. The display screen 140 may be configured to display information entered by a user or information provided for a user and various menus on the mobile phone, and may further receive a user input. The sensor 150 may be an optical sensor, a motion sensor, or another sensor. The audio circuit 160 may provide an audio interface between a user and the mobile phone. The I/O subsystem 170 is configured to control an external input/output device, and the external device may include another device input controller, a sensor controller, and a display controller. The processor 180 is a control center of the mobile phone 200, and is connected to various parts of the entire mobile phone by using various interfaces and lines. By running or executing the software program and/or module stored in the memory 120, and scheduling the data stored in the memory 120, the processor 180 performs various functions of the mobile phone 200 and processes data, thereby performing overall monitoring on the mobile phone. The power supply 190 (such as a battery) is configured to supply power to the components. Preferably, the power supply may be logically connected to the processor 180 by using a power supply management system, so as to implement functions such as charging, discharging, and power consumption management by using the power supply management system.

The technical solutions provided in this application may be applied to a single-carrier transmission scenario, a multi-carrier transmission scenario, a scenario in which a plurality of waveforms are mixedly transmitted, an uplink transmission scenario, a downlink transmission scenario, or a scenario with both uplink and downlink transmission.

The following describes a DMRS transmission method provided in this application. The DMRS transmission method may include a method for sending a DMRS by a transmit end and a method for obtaining the DMRS by a receive end.

Figure 6:
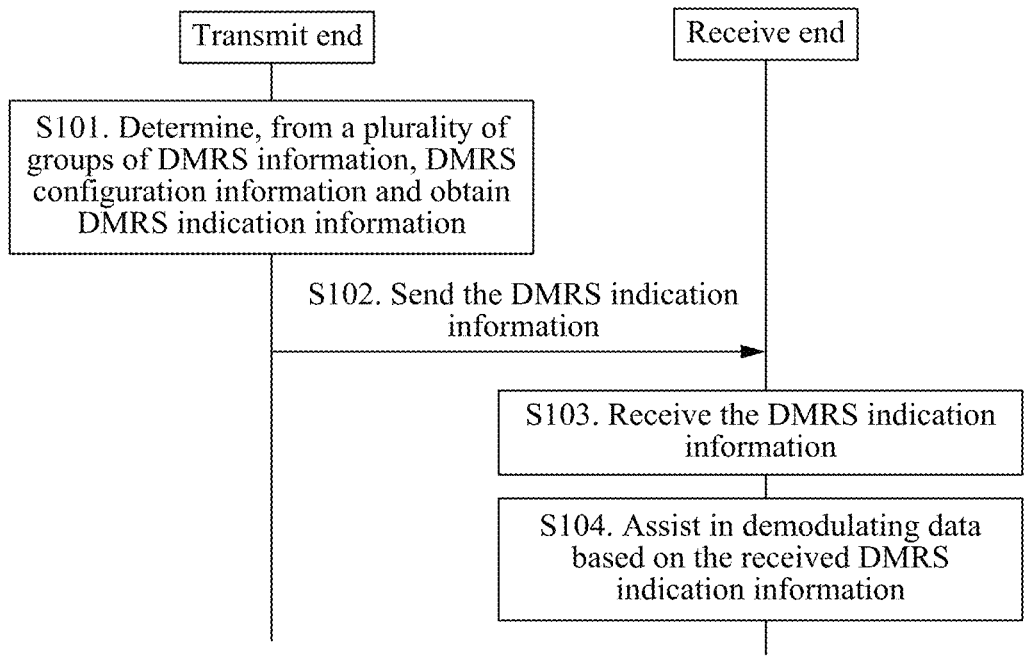
FIG. 6 is a schematic interaction diagram of a DMRS indicating and receiving method according to an embodiment of this application.

FIG. 6 shows a DMRS transmission method provided in this application. The method may include the following steps.

S101. A transmit end determines, from a plurality of groups of demodulation reference signal DMRS configuration information, DMRS configuration information corresponding to a current DMRS transmission scheme, and obtains DMRS indication information based on the DMRS configuration information, where each group of DMRS configuration information includes a plurality of pieces of DMRS configuration information.

The plurality of pieces of DMRS configuration information may be presented in a form of a DMRS configuration information table. In one manner, the plurality of pieces of DMRS configuration information are presented in a form of a plurality of independent tables. Or the plurality of pieces of DMRS configuration information are subsets of a general information table.

S102. The transmit end sends the DMRS indication information on a time-frequency resource.

S103. A receive end receives the DMRS indication information.

S104. The receive end performs channel estimation or assists in demodulating data, based on the received DMRS indication information.

A time-frequency resource used to carry a DMRS may include one or more symbols in time domain, and may include one or more subcarriers in frequency domain.

If the technical solution is applied to an uplink transmission scenario, the transmit end may be a terminal, and the receive end may be a base station. If the technical solution is applied to a downlink transmission scenario, the transmit end may be a base station, and the receive end may be a terminal.

In this embodiment of this application, the current DMRS transmission scheme is indicated by using the indication information, and different DMRS transmission schemes correspond to different maximum supported orthogonal-port quantities, or correspond to different DMRS patterns or different DMRS configuration types.

The maximum supported orthogonal-port quantities in DMRS configuration information corresponding to the different DMRS transmission schemes are different.

Lengths of DMRS indication information corresponding to the different DMRS transmission schemes are different.

A plurality of DMRS ports in the at least one piece of DMRS configuration information belong to different code division multiplexing CDM groups, where different CDM groups satisfy a non-quasi co-location QCL relationship.

For different maximum supported orthogonal-port quantities, different DMRS configuration information may be configured. For example, in MIMO scenarios in which a maximum supported orthogonal-port quantity is 4, a maximum supported orthogonal-port quantity is 6, a maximum supported orthogonal-port quantity is 8, and a maximum supported orthogonal-port quantity is 12, corresponding DMRS configuration information is separately configured. The DMRS configuration information is used to inform the receive end of an orthogonal DMRS port number, a sequence configuration, a multiplexing mode, and the like that can be used by the receive end, thereby correctly decoding data.

In another implementation, the DMRS configuration information is configured for different DMRS patterns. Usually, one DMRS pattern corresponds to one MIMO scenario that supports a maximum supported orthogonal-port quantity or a maximum supported orthogonal-transmission-layer quantity. The DMRS pattern shows a quantity of orthogonal port groups supported by the MIMO scenario and a quantity of resource units included in each orthogonal port group. Therefore, configuring different DMRS configuration information for different DMRS patterns can also enable the receive end to know an orthogonal DMRS port number, a sequence configuration, a multiplexing mode, and the like that can be used by the receive end, thereby correctly decoding data.

In an implementation, the DMRS configuration information may be presented by a protocol-agreed table, and a specific implementation form thereof may be a downlink control information (DCI) table. A plurality of DCI tables include at least one group of different DMRS configuration information. The DMRS transmission scheme corresponding to the DMRS configuration information is sent by using higher layer signaling, for example, radio resource control (RRC) signaling. Certainly, the DMRS configuration information may alternatively be bound with another configuration parameter, for example, a frequency, a carrier spacing, or a frame structure, corresponding to a scenario. In this way, the DMRS indication information can be sent by using DCI signaling or a media access control control element (MAC CE).

During specific implementation, each DMRS configuration information table corresponds to a different maximum supported orthogonal-port quantity (port). For example, the maximum supported orthogonal-port quantity may be at least two of {4, 6, 8, 12}.

In another implementation, each DMRS configuration information table may correspond to a different DMRS pattern or DMRS configuration type.

In an implementation, in the information table, column arrangement design is performed based on an orthogonal port combination. For example, column arrangement design is performed on an orthogonal port combination having four or less transmission layers and an orthogonal port combination having more than four transmission layers.

In an implementation, when the DMRS configuration information is presented in a form of a DMRS configuration information table, division may be performed based on a codeword number codeword number, or may be performed based on a total maximum supported orthogonal-port quantity or a quantity of transmission layers at the receive end, instead of a codeword number. Specifically, division may be performed based on a ratio.

The DMRS configuration information further includes indication information of a total quantity of orthogonal ports, and the indication information may indicate a quantity of all orthogonal ports that are possibly actually presented or a quantized value of a quantity of all orthogonal ports that are possibly actually presented. The quantized value of the quantity of all the orthogonal ports may be information about a quantity of orthogonal DMRS layers, indication information of an orthogonal DMRS antenna port set, CDM group information of an orthogonal DMRS antenna port, or information generated based on a CDM group size. It should be understood that the total quantity of orthogonal ports is the same as a total quantity of orthogonal DMRS transmission layers.

A reason for using a quantized value of a quantity of orthogonal DMRS transmission layers is that if a specific quantity of transmission layers of the receive end needs to be indicated, for example, if orthogonal-transmission-layer quantities {1, 2, 3, 4} need to be indicated, four bits are required for indication. When the orthogonal-transmission-layer quantities {1, 2, 3, 4} are quantized into a value, for example, quantized upward into an orthogonal-transmission-layer quantity 4, or quantized downward into an orthogonal-transmission-layer quantity 1, or when the orthogonal-transmission-layer quantities {1, 2, 3, 4} are represented by 2 or 3, only one bit is required to indicate the quantized value of the quantity of orthogonal transmission layers. For example, 0 is used to represent a quantized value 4 of the orthogonal-transmission-layer quantity. Therefore, indication overheads can be reduced.

It should be noted that, a plurality of DMRS configuration information tables may alternatively be a general information table, the general information table supports a maximum supported port quantity, and the plurality of DMRS configuration information tables are subsets of the general information table. A subset may be selected from the general information table based on the maximum supported port quantity, the DMRS pattern, or the higher layer signaling.

The following describes specific implementation processes of sending a DMRS and obtaining a DMRS that are provided in this application.

Embodiment 1

A plurality of tables of DMRS configuration information, briefly referred to as DMRS configuration information tables, are designed in Embodiment 1. Each DMRS configuration information table is associated with a maximum supported orthogonal-port quantity, or different DMRS configuration information tables are designed for different DMRS patterns or different DMRS configuration types. Each of the maximum supported orthogonal-port quantity, the DMRS pattern, and the DMRS configuration type can indicate a DMRS transmission scheme. Before transmission, based on different pattern configuration information, a DMRS configuration information table is selected or switching is performed between different DMRS configuration information tables.

Figure 7:
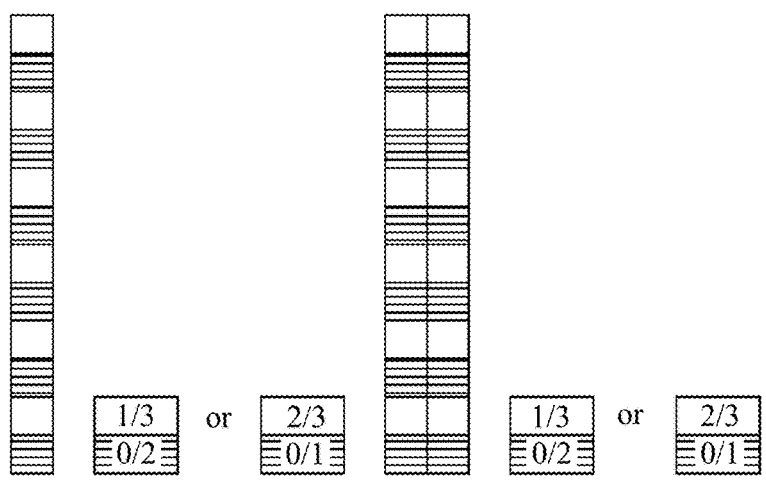
FIG. 7 is a schematic diagram of a DMRS pattern according to an embodiment of this application.

As shown in FIG. 7, the DMRS configuration information table is a DMRS configuration information table designed based on a maximum supported orthogonal-port quantity of a single terminal (UE) being 4 in SU-MIMO or MU-MIMO.

TABLE 1

DMRS for a maximum of four ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 1 layer, port 0 | 0 | Reserved | Reserved |
| 1 | 1 | 1 layer, port 1 | 1 | Reserved | Reserved |
| 2 | 1 | 1 layer, port 2 | 2 | Reserved | Reserved |
| 3 | 1 | 1 layer, port 3 | 3 | Reserved | Reserved |
| 4 | 2 | 2 layers, ports 0-1 | 4 | Reserved | Reserved |
| 5 | 2 | 2 layers, ports 2-3 | 5 | Reserved | Reserved |
| 6 | 3 | 3 layers, ports 0-2 | 6 | Reserved | Reserved |

TABLE 1-continued

DMRS for a maximum of four ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 7 | 4 | 4 layers, ports 0-3 | 7 | Reserved | Reserved |
| 8 | Reserved | Reserved | 8 | Reserved | Reserved |

DMRS indication information or an index is represented by using a value. When the value is 0, it indicates that the terminal supports one transmission layer (which is represented by a rank in the table), and an orthogonal port index corresponding to the value 0 is one transmission layer with a port number of 0. For another example, when the value of the DMRS indication information is 7, it indicates that the terminal supports four transmission layers (Rank), and orthogonal port indexes corresponding to the value 7 are 0 to 3 (ports 0 to 3).

A port combination shown in Table 1 may basically cover all configurations of four or less ports, where reserved may be used for an additional combination (combination) to increase scheduling flexibility, although the listed combinations have satisfied a scheduling requirement.

The DMRS configuration information table shown in Table 1 is applicable to an orthogonal DMRS implementing a maximum of four streams/layers of data transmission or a pattern corresponding to FIG. 7 (for example, config. 1-1 symbol in a left part or config. 1-2 symbols in a right part, but time-domain repetition is used, e.g., TD-OCC {(1, 1), (1, 1)}).

The DMRS configuration information table in this embodiment is designed based on an LTE table (in other words, columns are divided based on a codeword number), and a corresponding value requires three bits of indication overheads.

It should be understood that, the port index in the DMRS configuration information table is only a representation manner, and is only an example for description. Alternatively, another digit may be used for indication based on an actual requirement.

As shown in Table 2, the DMRS configuration information table is a DMRS configuration information table designed based on a maximum supported orthogonal-port quantity of a single terminal (UE) being 6 in SU-MIMO or MU-MIMO.

TABLE 2

DMRS for a maximum of six ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 (SU) |
| 1 | 1 | 1 | 1 | 6 | 0-5 (SU) |
| 2 | 1 | 2 | 2 | Reserved | Reserved |
| 3 | 1 | 3 | 3 | Reserved | Reserved |
| 4 | 1 | 4 | 4 | Reserved | Reserved |
| 5 | 1 | 5 | 5 | Reserved | Reserved |
| 6 | 2 | 0-1 | 6 | Reserved | Reserved |
| 7 | 2 | 2-3 | 7 | Reserved | Reserved |
| 8 | 2 | 4-5 | 8 | Reserved | Reserved |
| 9 | 3 | 0-2 | 9 | Reserved | Reserved |

TABLE 2-continued

DMRS for a maximum of six ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 10 | 3 | 3-5 | 10 | Reserved | Reserved |
| 11 | 4 | 0-3 | 11 | Reserved | Reserved |
| 12 | Reserved | Reserved | 12 | Reserved | Reserved |
| 13 | Reserved | Reserved | 13 | Reserved | Reserved |
| 14 | Reserved | Reserved | 14 | Reserved | Reserved |
| 15 | Reserved | Reserved | 15 | Reserved | Reserved |
| 16 | Reserved | Reserved | 16 | Reserved | Reserved |

Indication information or an index of DMRS configuration information is represented by using a value. For example, when the value of the indication information of the DMRS configuration information is 0, it indicates that the terminal supports one transmission layer (Rank), and an orthogonal port index corresponding to the value 0 is 0. When the value of the indication information of the DMRS configuration information is 10, it indicates that the terminal supports three transmission layers (Rank), and orthogonal port indexes corresponding to the value 10 are 3 to 5. It should be noted that the orthogonal port index herein is only an example, and a specific orthogonal port number may be represented by using another digit.

A port combination listed in a table shown in Table 2 may basically cover all configurations of six or less ports, where reserved may be used for an additional combination to increase scheduling flexibility, although the listed combinations have satisfied a scheduling requirement.

Figure 8:
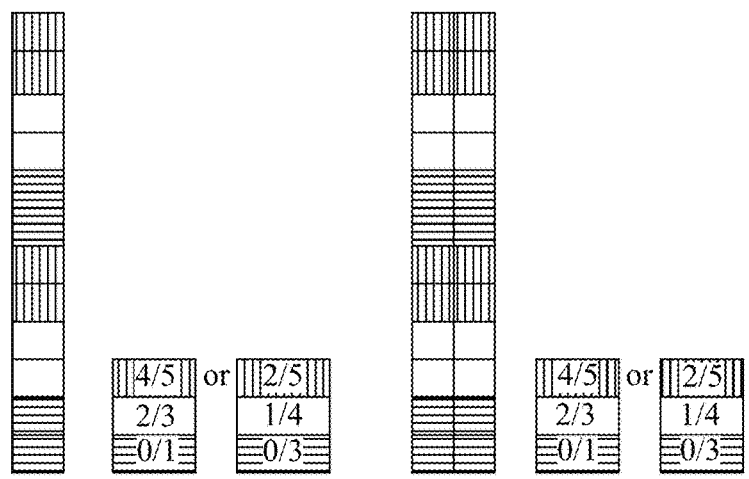
FIG. 8 is a schematic diagram of another DMRS pattern according to an embodiment of this application.

The DMRS configuration information table shown in Table 2 is applicable to an orthogonal DMRS implementing a maximum of six streams/layers of data transmission or a pattern corresponding to FIG. 8 (for example, config. 1-1 symbol in a left part or config. 1-2 symbol in a right part, but time-domain repetition is used, e.g., TD-OCC {(1, 1), (1, 1)}).

The DMRS configuration information table in this embodiment is designed based on an LTE table (in other words, columns are divided based on a codeword number), and a corresponding value requires four bits of indication overheads.

As shown in Table 3, the DMRS configuration information table is a DMRS configuration information table designed based on a maximum supported orthogonal-port quantity of a single terminal (UE) being 8 in SU-MIMO or MU-MIMO.

TABLE 3

DMRS for a maximum of eight ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 |
| 1 | 1 | 1 | 1 | 6 | 0-5 |
| 2 | 1 | 2 | 2 | 7 | 0-6 |
| 3 | 1 | 3 | 3 | 8 | 0-7 |
| 4 | 1 | 4 | 4 | Reserved | Reserved |
| 5 | 1 | 5 | 5 | Reserved | Reserved |
| 6 | 1 | 6 | 6 | Reserved | Reserved |
| 7 | 1 | 7 | 7 | Reserved | Reserved |

TABLE 3-continued

DMRS for a maximum of eight ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 8 | 2 | 0-1 | 8 | Reserved | Reserved |
| 9 | 2 | 2-3 | 9 | Reserved | Reserved |
| 10 | 2 | 4-5 | 10 | Reserved | Reserved |
| 11 | 2 | 6-7 | 11 | Reserved | Reserved |
| 12 | 3 | 0-2 | 12 | Reserved | Reserved |
| 13 | 3 | 3-5 | 13 | Reserved | Reserved |
| 14 | 4 | 0-3 | 14 | Reserved | Reserved |
| 15 | 4 | 4-7 | 15 | Reserved | Reserved |

Indication information of DMRS configuration information is represented by using a value. For example, when the value of the indication information of the DMRS configuration information is 0, it indicates that the terminal supports one transmission layer (Rank), and an orthogonal port index corresponding to the value 0 is 0. For another example, when the value is 15, it indicates that the terminal supports four transmission layers (Rank), and orthogonal port indexes corresponding to the value 15 are 4 to 7. It should be noted that the orthogonal port index herein is only an example, and a specific orthogonal port number may be represented by using another digit.

A port combination listed in a table shown in Table 3 may basically cover all configurations of eight or less ports, where reserved may be used for an additional combination (combination) to increase scheduling flexibility, although the listed combinations have satisfied a scheduling requirement.

Figure 9:
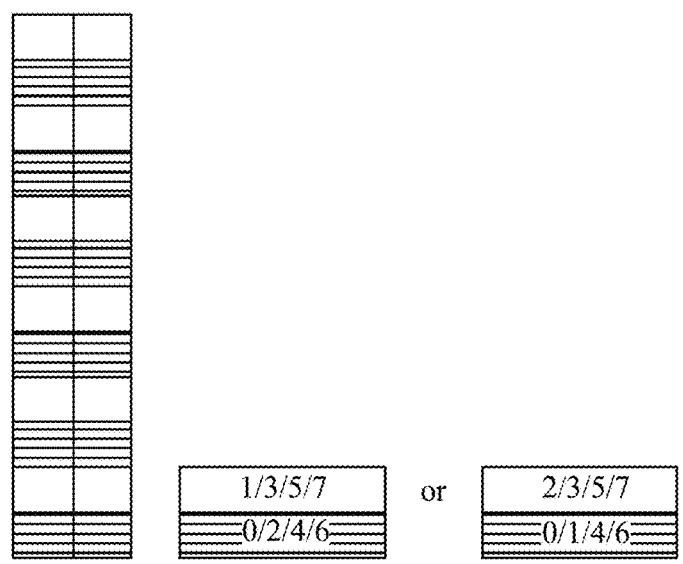
FIG. 9 is a schematic diagram of another DMRS pattern according to an embodiment of this application.

The DMRS configuration information table shown in Table 3 is applicable to an orthogonal DMRS implementing a maximum of eight streams/layers of data transmission or a pattern corresponding to FIG. 9 (config. 1-2 symbols).

The DMRS configuration information table in this embodiment is designed based on an LTE table (in other words, columns are divided based on a codeword number), and a corresponding value requires four bits of indication overheads.

As shown in Table 4, the DMRS configuration information table is a DMRS configuration information table designed based on a maximum supported orthogonal-port quantity of a single terminal (UE) being 12 in SU-MIMO or MU-MIMO.

TABLE 4

DMRS for a maximum of 12 ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 |
| 1 | 1 | 1 | 1 | 6 | 0-5 |
| 2 | 1 | 2 | 2 | 7 | 0-6 |
| 3 | 1 | 3 | 3 | 8 | 0-7 |
| 4 | 1 | 4 | 4 | Reserved | Reserved |
| 5 | 1 | 5 | 5 | Reserved | Reserved |
| 6 | 1 | 6 | 6 | Reserved | Reserved |
| 7 | 1 | 7 | 7 | Reserved | Reserved |
| 8 | 1 | 8 | 8 | Reserved | Reserved |
| 9 | 1 | 9 | 9 | Reserved | Reserved |
| 10 | 1 | 10 | 10 | Reserved | Reserved |
| 11 | 1 | 11 | 11 | Reserved | Reserved |
| 12 | 2 | 0-1 | 12 | Reserved | Reserved |
| 13 | 2 | 2-3 | 13 | Reserved | Reserved |
| 14 | 2 | 4-5 | 14 | Reserved | Reserved |
| 15 | 2 | 6-7 | 15 | Reserved | Reserved |
| 16 | 2 | 8-9 | 16 | Reserved | Reserved |
| 17 | 2 | 10-11 | 17 | Reserved | Reserved |
| 18 | 3 | 0-2 | 18 | Reserved | Reserved |
| 19 | 3 | 3-5 | 19 | Reserved | Reserved |
| 20 | 3 | 6-8 | 20 | Reserved | Reserved |
| 21 | 3 | 9-11 | 21 | Reserved | Reserved |
| 22 | 4 | 0-3 | 22 | Reserved | Reserved |
| 23 | 4 | 4-7 | 23 | Reserved | Reserved |
| 24 | 4 | 8-11 | 24 | Reserved | Reserved |
| 25 | Reserve | Reserve | 25 | Reserved | Reserved |
| 26 | Reserve | Reserve | 26 | Reserved | Reserved |
| 27 | Reserve | Reserve | 27 | Reserved | Reserved |
| 28 | Reserve | Reserve | 28 | Reserved | Reserved |
| 29 | Reserve | Reserve | 29 | Reserved | Reserved |
| 30 | Reserve | Reserve | 30 | Reserved | Reserved |
| 31 | Reserve | Reserve | 31 | Reserved | Reserved |

Indication information of DMRS configuration information is represented by using a value. For example, when the value of the indication information of the DMRS configuration information is 0, it indicates that the terminal supports one transmission layer (Rank), and an orthogonal port index corresponding to the value 0 is 0. For another example, when the value of the indication information of the DMRS configuration information is 24, it indicates that the terminal supports four transmission layers (Rank), and orthogonal port indexes corresponding to the value 24 are 8 to 11. It should be noted that the orthogonal port index herein is only an example, and a specific orthogonal port number may be represented by using another digit.

A port combination listed in a table shown in Table 4 may basically cover all configurations of twelve or less ports, where reserved may be used for an additional combination to increase scheduling flexibility, although the listed combinations have satisfied a scheduling requirement.

Figure 10:
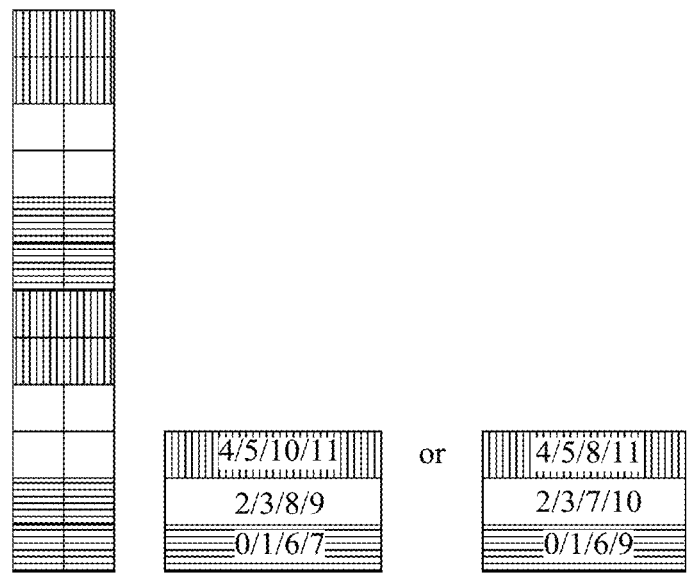
FIG. 10 is a schematic diagram of another DMRS pattern according to an embodiment of this application.

The DMRS configuration information table shown in Table 4 is applicable to an orthogonal DMRS implementing a maximum of twelve streams/layers of data transmission or a pattern corresponding to FIG. 10 (config. 2-2 symbols).

The DMRS configuration information table in this embodiment is designed based on an LTE table (in other words, columns are divided based on a codeword number), and a corresponding value requires five bits of indication overheads.

According to the embodiment shown in Table 1 to Table 4, designing a corresponding DMRS configuration information table for each maximum supported orthogonal-port quantity can satisfy requirements for different scenarios in an NR system. For example, a table is not only applied to a pattern in an ultra-reliable and low latency communication (URLLC) scenario but also applied to a pattern in Enhanced Mobile Broadband (eMBB). For other different patterns, a design of the table is re-considered.

In this embodiment, a plurality of DMRS configuration information tables are designed. The plurality of DMRS configuration information tables may also be different DMRS configuration information tables designed for DMRS pattern configuration types, which are briefly referred to as DMRS configuration types. Before transmission, based on different configuration type information, a DMRS configuration information table is selected or switching is performed between different information tables.

There are two configuration types, and DMRS configuration information tables corresponding to the two configuration types are respectively Table 3 in which a maximum of eight ports are shown (configuration type 1) and Table 4 in which a maximum of 12 ports (configuration type 2) are shown. The two tables are the same, and details are not described herein again. The DMRS configuration information tables shown in Table 1 to Table 4 correspond to different DMRS patterns, or correspond to maximum supported orthogonal-port quantities that are supported by a system, or correspond to different DMRS configuration types. The patterns, the maximum supported orthogonal-port quantities 4, 6, 8, and 12, the DMRS configuration types, or the like that correspond to the DMRS configuration information tables may be indicated by using explicit signaling such as RRC, a MAC CE, or DCI, or may be bound with another configuration parameter, for example, a frequency, a carrier spacing, or a frame structure, corresponding to a scenario.

Embodiment 2

This embodiment describes a column arrangement design manner of a DMRS configuration information table. Different from a column arrangement manner in LTE, in this embodiment, division is not performed based on a codeword number. Instead, division is performed according to a ratio and based on a maximum supported orthogonal-port quantity. Alternatively, information is grouped into two columns, where information corresponding to which a quantity of orthogonal ports is greater than a specific value belongs to one column, and information corresponding to which a quantity of orthogonal ports is less than or equal to the specific value belongs to the other column. Alternatively, column arrangement is performed based on a quantity of transmission layers (in other words, UE RANK) of the receive end.

As shown in Table 5, that the maximum supported orthogonal-port quantity is equal to 12 is used as an example for description. The left column in the information table is information corresponding to which a quantity of orthogonal ports is less than or equal to 8, and the right column is information corresponding to which a quantity of orthogonal ports is greater than 8.

TABLE 5

Column arrangement is performed based on a ratio of a total quantity of ports
Total quantity of layers or config. 2-2-symbol pattern, ratio being 2/3

| Total layer number ≤ 8 | | | | Total layer number > 8 | | | |
|---|---|---|---|---|---|---|---|
| Value | Total | UE rank | Ports | Value | Total | UE rank | Ports |
| 0 | 4 | 1 | 0 | 0 | 12 | 1 | 0 |
| 1 | 4 | 1 | 1 | 1 | 12 | 1 | 1 |
| 2 | 4 | 1 | 2 | 2 | 12 | 1 | 2 |
| 3 | 4 | 1 | 3 | 3 | 12 | 1 | 3 |
| 4 | 4 | 2 | 0-1 | 4 | 12 | 1 | 4 |
| 5 | 4 | 2 | 2-3 | 5 | 12 | 1 | 5 |
| 6 | 4 | 3 | 0-2 | 6 | 12 | 1 | 6 |
| 7 | 4 | 4 | 0-3 | 7 | 12 | 1 | 7 |

TABLE 5-continued

Column arrangement is performed based on a ratio of a total quantity of ports
Total quantity of layers or config. 2-2-symbol pattern, ratio being 2/3

| Total layer number ≤ 8 | | | | Total layer number > 8 | | | |
|---|---|---|---|---|---|---|---|
| Value | Total | UE rank | Ports | Value | Total | UE rank | Ports |
| 8 | 8 | 1 | 0 | 8 | 12 | 1 | 8 |
| 9 | 8 | 1 | 1 | 9 | 12 | 1 | 9 |
| 10 | 8 | 1 | 2 | 10 | 12 | 1 | 10 |
| 11 | 8 | 1 | 3 | 11 | 12 | 1 | 11 |
| 12 | 8 | 1 | 4 | 12 | 12 | 2 | 0-1 |
| 13 | 8 | 1 | 5 | 13 | 12 | 2 | 2-3 |
| 14 | 8 | 1 | 6 | 14 | 12 | 2 | 4-5 |
| 15 | 8 | 1 | 7 | 15 | 12 | 2 | 6-7 |
| 16 | 8 | 2 | 0-1 | 16 | 12 | 2 | 8-9 |
| 17 | 8 | 2 | 2-3 | 17 | 12 | 2 | 10-11 |
| 18 | 8 | 2 | 4-5 | 18 | 12 | 3 | 0-2 |
| 19 | 8 | 2 | 6-7 | 19 | 12 | 3 | 3-5 |
| 20 | 8 | 3 | 0-2 | 20 | 12 | 3 | 6-8 |
| 21 | 8 | 3 | 3-5 | 21 | 12 | 3 | 9-11 |
| 22 | 8 | 4 | 0-3 | 22 | 12 | 4 | 0-3 |
| 23 | 8 | 4 | 4-7 | 23 | 12 | 4 | 4-7 |
| 24 | 8 | 5 | 0-4 | 24 | 12 | 4 | 8-11 |
| 25 | 8 | 6 | 0-5 | 25 | | | |
| 26 | 8 | 7 | 0-6 | 26 | | | |
| 27 | 8 | 8 | 0-7 | 27 | | | |

Table 5 shows that column arrangement is performed on the information table by dividing a maximum supported orthogonal-port quantity by 2. This is only an example, and in this embodiment of this application, there may also be another column arrangement manner. As shown in Table 6 and Table 7, division is performed based on a quantity of transmission layers (RANK) of UE. A principle is to enable quantities of rows of effective information on both columns to be balanced as far as possible, thereby reducing storage overheads.

TABLE 6

DMRS for a maximum of six ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 |
| 1 | 1 | 1 | 1 | 6 | 0-5 |
| 2 | 1 | 2 | 2 | 2 | 0-1 |
| 3 | 1 | 3 | 3 | 2 | 2-3 |
| 4 | 1 | 4 | 4 | 2 | 4-5 |
| 5 | 1 | 5 | 5 | 3 | 0-2 |
| 6 | | | 6 | 3 | 3-5 |
| 7 | | | 7 | 4 | 0-3 |

TABLE 7

DMRS for a maximum of four ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 1 layer, port 0 | 0 | 2 | 2 layers, ports 0-1 |
| 1 | 1 | 1 layer, port 1 | 1 | 2 | 2 layers, ports 2-3 |

TABLE 7-continued

DMRS for a maximum of four ports

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 2 | 1 | 1 layer, port 2 | 2 | 3 | 3 layers, ports 0-2 |
| 3 | 1 | 1 layer, port 3 | 3 | 4 | 4 layers, ports 0-3 |

Embodiment 3

In this embodiment, a plurality of DMRS configuration information tables are integrated into a general information table, and selection is performed based on a maximum supported orthogonal-transmission-layer quantity, a pattern, or higher layer signaling, specifically as shown in Table 8-0.

TABLE 8-0

DMRS for a maximum of 12 ports

| Value | UE rank | Port index |
|---|---|---|
| 0 | 1 | 0 |
| 1 | 1 | 1 |
| 2 | 1 | 2 |
| 3 | 1 | 3 |
| 4 | 2 | 0-1 |
| 5 | 2 | 2-3 |
| 6 | 3 | 0-2 |
| 7 | 4 | 0-3 |
| 8 | 1 | 4 |
| 9 | 1 | 5 |
| 10 | 2 | 4-5 |
| 11 | 3 | 3-5 |
| 12 | 5 | 0-4 |
| 13 | 6 | 0-5 |
| 14 | 1 | 6 |
| 15 | 1 | 7 |
| 16 | 2 | 6-7 |
| 17 | 7 | 0-6 |
| 18 | 8 | 0-7 |
| 19 | 4 | 4-7 |
| 20 | 1 | 8 |
| 21 | 1 | 9 |
| 22 | 1 | 10 |
| 23 | 1 | 11 |
| 24 | 2 | 8-9 |
| 25 | 2 | 10-11 |
| 26 | 3 | 6-8 |
| 27 | 3 | 9-11 |
| 28 | 4 | 8-11 |
| 29 | reserved | reserved |
| 30 | reserved | reserved |
| 31 | reserved | reserved |

A maximum quantity of orthogonal ports that is supported by the DMRS configuration information table shown in Table 8-0 is 12, DMRS configuration information corresponding to other port quantities such as 4, 6, or 8 are all subsets of the general information table. When DMRS configuration information is selected, a corresponding sub-table may be selected from the general information table based on a maximum supported orthogonal-port quantity, based on binding with a pattern, or based on an indication of higher layer signaling such as RRC signaling. For example, values 0 to 7 correspond to a total quantity 4 of orthogonal ports, values 0 to 13 correspond to a total quantity 6 of orthogonal ports, values 0 to 19 correspond to a total quantity 8 of orthogonal ports, and values 0 to 28 correspond to a total quantity 12 of orthogonal ports.

According to the DMRS sending method provided in this application, designing a plurality of DMRS configuration information tables can reduce overheads for NR DMRS port indication.

In addition, in a specific implementation of integrating a plurality of DMRS configuration information tables into a general information table, DMRS configuration information of a same DMRS configuration type may be designed in one general table, and is selected based on DMRS symbol information.

Specifically, the DMRS configuration information table may include symbol information of a front-loaded (FL) DMRS, for example, a symbol quantity of the DMRS, where Table 8-1 corresponds to an FL DMRS configuration type 1, and Table 8-2 corresponds to an FL DMRS configuration type 2. In other words, each table corresponds to a different FL DMRS type. In addition, the table may further include state information of a CDM group (State of CDM group), and the state information of the CDM group may be used as rate matching information.

Columns in number of symbols in Table 8-1 and Table 8-2 respectively correspond to a 1-symbol FL DMRS type 1 and a 2-symbol FL DMRS type 1. In this embodiment of this application, DMRS port indication information of the 1-symbol FL DMRS type 1 and the 2-symbol FL DMRS type 1 of a same FL DMRS configuration type are included in one table, and beneficial effects thereof may be indicating different states in a table by using DCI, to implement dynamic switching between the 1-symbol FL DMRS and the 2-symbol FL DMRS.

In addition, the following gives only an example. States of the symbol quantity are 1 and 2, respectively corresponding to the 1-symbol FL DMRS and the 2-symbol FL DMRS. In an implementation, the symbol quantity may be represented by 0 and 1. For example, 0 corresponds to the 1-symbol FL DMRS and 1 corresponds to the 2-symbol FL DMRS, or the 1-symbol is represented as a single symbol and the 2-symbol is represented as double symbols. During specific implementation, there may be a plurality of representation methods. This is not limited in this embodiment of this application.

In another implementation, the column of the number of symbols may not be added to the DMRS configuration information table, but is directly implicitly indicated by using a value. For example, the column of the number of symbols may be removed in Table 8-1 and Table 8-2, but other elements remain unchanged. In this case, the transmit end can still complete dynamic switching between the 1-symbol FL DMRS and the 2-symbol FL DMRS by indicating a value to the receive end.

For example, in Table 8-1, value=18 includes a DMRS port number whose value is greater than 3, and port numbers of a 1-symbol FL DMRS type 1 are 0 to 3. In this way, the receive end can know that a 2-symbol DMRS pattern has been scheduled. In an implementation, the receive end and the transmit end may predefine some values to correspond to a 1-symbol FL DMRS pattern. However, some values correspond to the 2-symbol FL DMRS pattern. For example, in Table 8-1, it may be predefined that values 0 to 10 correspond to the 1-symbol FL DMRS, and values greater than 11 correspond to the 2-symbol FL DMRS. In this case, for same scheduling content, value=0 corresponds to the 1-symbol FL DMRS, and value=11 corresponds to the 2-symbol FL DMRS. The receive end learns, by indicating a value 0 and a value 11, that the 1-symbol FL DMRS pattern or the 2-symbol FL DMRS pattern is currently scheduled.

TABLE 8-1

Example of a port combination of a configuration
type 1 in which a symbol quantity is considered

| | One Codeword (≤4 layers): Codeword 0 enabled, Codeword 1 disabled | | | | Two Codewords (>4 layers): Codeword 0 enabled, Codeword 1 enabled | | | |
|---|---|---|---|---|---|---|---|---|
| Value | RMI or State of CDM group | UE rank | Ports | number of symbols | value | RMI or State of CDM group | UE rank | Ports | number of symbols |
| 0  | 1 | 1 | 0        | 1 | 0  | Reserved | Reserved | Reserved | 1 |
| 1  | 1 | 1 | 1        | 1 | 1  | Reserved | Reserved | Reserved | 1 |
| 2  | 1 | 2 | 0-1      | 1 | 2  | Reserved | Reserved | Reserved | 1 |
| 3  | 2 | 1 | 0        | 1 | 3  | Reserved | Reserved | Reserved | 1 |
| 4  | 2 | 1 | 1        | 1 | 4  | Reserved | Reserved | Reserved | 1 |
| 5  | 2 | 1 | 2        | 1 | 5  | Reserved | Reserved | Reserved | 1 |
| 6  | 2 | 1 | 3        | 1 | 6  | Reserved | Reserved | Reserved | 1 |
| 7  | 2 | 2 | 0-1      | 1 | 7  | Reserved | Reserved | Reserved | 1 |
| 8  | 2 | 2 | 2-3      | 1 | 8  | Reserved | Reserved | Reserved | 1 |
| 9  | 2 | 3 | 0-2      | 1 | 9  | Reserved | Reserved | Reserved | 1 |
| 10 | 2 | 4 | 0-3      | 1 | 10 | Reserved | Reserved | Reserved | 1 |
| 11 | 1 | 1 | 0        | 2 | 11 | 2 | 5 | 0-4 | 2 |
| 12 | 1 | 1 | 1        | 2 | 12 | 2 | 6 | 0-5 | 2 |
| 13 | 1 | 1 | 4        | 2 | 13 | 2 | 7 | 0-6 | 2 |
| 14 | 1 | 1 | 6        | 2 | 14 | 2 | 8 | 0-7 | 2 |
| 15 | 1 | 2 | 0-1      | 2 | 15 | Reserved | Reserved | Reserved | 2 |
| 16 | 1 | 2 | 4, 6     | 2 | 16 | Reserved | Reserved | Reserved | 2 |
| 17 | 1 | 3 | 0-1, 4   | 2 | 17 | Reserved | Reserved | Reserved | 2 |
| 18 | 1 | 4 | 0-1, 4, 6| 2 | 18 | Reserved | Reserved | Reserved | 2 |
| 19 | 2 | 1 | 0        | 2 | 19 | Reserved | Reserved | Reserved | 2 |
| 20 | 2 | 1 | 1        | 2 | 20 | Reserved | Reserved | Reserved | 2 |
| 21 | 2 | 1 | 2        | 2 | 21 | Reserved | Reserved | Reserved | 2 |
| 22 | 2 | 1 | 3        | 2 | 22 | Reserved | Reserved | Reserved | 2 |
| 23 | 2 | 1 | 4        | 2 | 23 | Reserved | Reserved | Reserved | 2 |
| 24 | 2 | 1 | 5        | 2 | 24 | Reserved | Reserved | Reserved | 2 |
| 25 | 2 | 1 | 6        | 2 | 25 | Reserved | Reserved | Reserved | 2 |
| 26 | 2 | 1 | 7        | 2 | 26 | Reserved | Reserved | Reserved | 2 |
| 27 | 2 | 2 | 0-1      | 2 | 27 | Reserved | Reserved | Reserved | 2 |
| 28 | 2 | 2 | 2-3      | 2 | 28 | Reserved | Reserved | Reserved | 2 |
| 29 | 2 | 2 | 4, 6     | 2 | 29 | Reserved | Reserved | Reserved | 2 |
| 30 | 2 | 2 | 5, 7     | 2 | 30 | Reserve  | Reserved | Reserved | 2 |
| 31 | 2 | 3 | 0-1, 4   | 2 | 31 | Reserved | Reserved | Reserved | 2 |
| 32 | 2 | 3 | 2-3, 5   | 2 | 32 | Reserved | Reserved | Reserved | 2 |
| 33 | 2 | 4 | 0-1, 4, 6| 2 | 33 | Reserved | Reserved | Reserved | 2 |
| 34 | 2 | 4 | 2-3, 5, 7| 2 | 34 | Reserved | Reserved | Reserved | 2 |

TABLE 8-2

Example of a port combination of a configuration type 2 in which a symbol quantity is considered

| | One Codeword (≤4 layers): Codeword 0 enabled, Codeword 1 disabled | | | | Two Codewords (>4 layers): Codeword 0 enabled, Codeword 1 enabled | | | |
|---|---|---|---|---|---|---|---|---|
| Value | State of CDM group | UE rank | Ports | number of symbols | Value | State of CDM group | UE rank | Ports | number of symbols |
| 0  | 1 | 1 | 0    | 1 | 0  | 3 | 5 | 0-4 | 1 |
| 1  | 1 | 1 | 1    | 1 | 1  | 3 | 6 | 0-5 | 1 |
| 2  | 1 | 2 | 0-1  | 1 | 2  | Reserved | Reserved | Reserved | 1 |
| 3  | 2 | 1 | 0    | 1 | 3  | Reserved | Reserved | Reserved | 1 |
| 4  | 2 | 1 | 1    | 1 | 4  | Reserved | Reserved | Reserved | 1 |
| 5  | 2 | 1 | 2    | 1 | 5  | Reserved | Reserved | Reserved | 1 |
| 6  | 2 | 1 | 3    | 1 | 6  | Reserved | Reserved | Reserved | 1 |
| 7  | 2 | 2 | 0-1  | 1 | 7  | Reserved | Reserved | Reserved | 1 |
| 8  | 2 | 2 | 2-3  | 1 | 8  | Reserved | Reserved | Reserved | 1 |
| 9  | 2 | 3 | 0-2  | 1 | 9  | Reserved | Reserved | Reserved | 1 |
| 10 | 2 | 4 | 0-3  | 1 | 10 | Reserved | Reserved | Reserved | 1 |
| 11 | 3 | 1 | 0    | 1 | 11 | Reserved | Reserved | Reserved | 1 |
| 12 | 3 | 1 | 1    | 1 | 12 | Reserved | Reserved | Reserved | 1 |
| 13 | 3 | 1 | 2    | 1 | 13 | Reserved | Reserved | Reserved | 1 |
| 14 | 3 | 1 | 3    | 1 | 14 | Reserved | Reserved | Reserved | 1 |
| 15 | 3 | 1 | 4    | 1 | 15 | Reserved | Reserved | Reserved | 1 |
| 16 | 3 | 1 | 5    | 1 | 16 | Reserved | Reserved | Reserved | 1 |

TABLE 8-2-continued

Example of a port combination of a configuration type 2 in which a symbol quantity is considered

| | One Codeword (≤4 layers): Codeword 0 enabled, Codeword 1 disabled | | | | Two Codewords (>4 layers): Codeword 0 enabled, Codeword 1 enabled | | | | |
| --- | --- | --- | --- | --- | --- | --- | --- | --- | --- |
| Value | State of CDM group | UE rank | Ports | number of symbols | Value | State of CDM group | UE rank | Ports | number of symbols |
| 17 | 3 | 2 | 0-1 | 1 | 17 | Reserved | Reserved | Reserved | 1 |
| 18 | 3 | 2 | 2-3 | 1 | 18 | Reserved | Reserved | Reserved | 1 |
| 19 | 3 | 2 | 4-5 | 1 | 19 | Reserved | Reserved | Reserved | 1 |
| 20 | 3 | 3 | 0-2 | 1 | 20 | Reserved | Reserved | Reserved | 1 |
| 21 | 3 | 3 | 3-5 | 1 | 21 | Reserved | Reserved | Reserved | 1 |
| 22 | 3 | 4 | 0-3 | 1 | 22 | Reserved | Reserved | Reserved | 1 |
| 23 | 1 | 1 | 0 | 2 | 23 | 2 | 5 | 0-2, 6, 9 | 2 |
| 24 | 1 | 1 | 1 | 2 | 24 | 2 | 6 | 0-3, 6, 9 | 2 |
| 25 | 1 | 1 | 6 | 2 | 25 | 2 | 7 | 0-3, 6, 7, 9 | 2 |
| 26 | 1 | 1 | 9 | 2 | 26 | 2 | 8 | 0-3, 6, 7, 9, 10 | 2 |
| 27 | 1 | 2 | 0-1 | 2 | 27 | Reserved | Reserved | Reserved | 2 |
| 28 | 1 | 2 | 6, 9 | 2 | 28 | Reserved | Reserved | Reserved | 2 |
| 29 | 1 | 3 | 0-1, 6 | 2 | 29 | Reserved | Reserved | Reserved | 2 |
| 30 | 1 | 4 | 0-1, 6, 9 | 2 | 30 | Reserved | Reserved | Reserved | 2 |
| 31 | 2 | 1 | 0 | 2 | 31 | Reserved | Reserved | Reserved | 2 |
| 32 | 2 | 1 | 1 | 2 | 32 | Reserved | Reserved | Reserved | 2 |
| 33 | 2 | 1 | 2 | 2 | 33 | Reserved | Reserved | Reserved | 2 |
| 34 | 2 | 1 | 3 | 2 | 34 | Reserved | Reserved | Reserved | 2 |
| 35 | 2 | 1 | 6 | 2 | 35 | Reserved | Reserved | Reserved | 2 |
| 36 | 2 | 1 | 7 | 2 | 36 | Reserved | Reserved | Reserved | 2 |
| 37 | 2 | 1 | 9 | 2 | 37 | Reserved | Reserved | Reserved | 2 |
| 38 | 2 | 1 | 10 | 2 | 38 | Reserved | Reserved | Reserved | 2 |
| 39 | 2 | 2 | 0-1 | 2 | 39 | Reserved | Reserved | Reserved | 2 |
| 40 | 2 | 2 | 6, 9 | 2 | 40 | Reserved | Reserved | Reserved | 2 |
| 41 | 2 | 2 | 2-3 | 2 | 41 | Reserved | Reserved | Reserved | 2 |
| 42 | 2 | 2 | 7, 10 | 2 | 42 | Reserved | Reserved | Reserved | 2 |
| 43 | 2 | 3 | 0-1, 6 | 2 | 43 | Reserved | Reserved | Reserved | 2 |
| 44 | 2 | 3 | 2-3, 7 | 2 | 44 | Reserved | Reserved | Reserved | 2 |
| 45 | 2 | 4 | 0-1, 6, 9 | 2 | 45 | Reserved | Reserved | Reserved | 2 |
| 46 | 2 | 4 | 2-3, 7, 10 | 2 | 46 | Reserved | Reserved | Reserved | 2 |
| 47 | 3 | 1 | 0 | 2 | 47 | Reserved | Reserved | Reserved | 2 |
| 48 | 3 | 1 | 1 | 2 | 48 | Reserved | Reserved | Reserved | 2 |
| 49 | 3 | 1 | 2 | 2 | 49 | Reserved | Reserved | Reserved | 2 |
| 50 | 3 | 1 | 3 | 2 | 50 | Reserved | Reserved | Reserved | 2 |
| 51 | 3 | 1 | 4 | 2 | 51 | Reserved | Reserved | Reserved | 2 |
| 52 | 3 | 1 | 5 | 2 | 52 | Reserved | Reserved | Reserved | 2 |
| 53 | 3 | 1 | 6 | 2 | 53 | Reserved | Reserved | Reserved | 2 |
| 54 | 3 | 1 | 7 | 2 | 54 | Reserved | Reserved | Reserved | 2 |
| 55 | 3 | 1 | 8 | 2 | 55 | Reserved | Reserved | Reserved | 2 |
| 56 | 3 | 1 | 9 | 2 | 56 | Reserved | Reserved | Reserved | 2 |
| 57 | 3 | 1 | 10 | 2 | 57 | Reserved | Reserved | Reserved | 2 |
| 58 | 3 | 1 | 11 | 2 | 58 | Reserved | Reserved | Reserved | 2 |
| 59 | 3 | 2 | 0-1 | 2 | 59 | Reserved | Reserved | Reserved | 2 |
| 60 | 3 | 2 | 6, 9 | 2 | 60 | Reserved | Reserved | Reserved | 2 |
| 61 | 3 | 2 | 2-3 | 2 | 61 | Reserved | Reserved | Reserved | 2 |
| 62 | 3 | 2 | 7, 10 | 2 | 62 | Reserved | Reserved | Reserved | 2 |
| 63 | 3 | 2 | 4-5 | 2 | 63 | Reserved | Reserved | Reserved | 2 |
| 64 | 3 | 2 | 8, 11 | 2 | 64 | Reserved | Reserved | Reserved | 2 |
| 65 | 3 | 3 | 0-1, 6 | 2 | 65 | Reserved | Reserved | Reserved | 2 |
| 66 | 3 | 3 | 2-3, 7 | 2 | 66 | Reserved | Reserved | Reserved | 2 |
| 67 | 3 | 3 | 4-5, 8 | 2 | 67 | Reserved | Reserved | Reserved | 2 |
| 68 | 3 | 3 | 9-11 | 2 | 68 | Reserved | Reserved | Reserved | 2 |
| 69 | 3 | 4 | 0-1, 6, 9 | 2 | 69 | Reserved | Reserved | Reserved | 2 |
| 70 | 3 | 4 | 2-3, 7, 10 | 2 | 70 | Reserved | Reserved | Reserved | 2 |
| 71 | 3 | 4 | 4-5, 8, 11 | 2 | 71 | Reserved | Reserved | Reserved | 2 |

In an implementation method, the transmit end, for example, a network side device, may schedule only a part of a table during specific scheduling, to be specific, a sub-table or a subset of a table, thereby reducing DCI overheads.

In an implementation, selection of the sub-table may be explicitly configured by using RRC signaling. In other words, the DMRS symbol information is indicated by using RRC signaling, to dynamically schedule the DMRS configuration type corresponding to the 1-symbol or the DMRS configuration type corresponding to the 2-symbol.

For example, in Table 8-2, RRC signaling may instruct to activate a table corresponding to the 1-symbol FL DMRS, for example values 0 to 22 (in other words, a number of symbols=1) in Table 8-2, or indicate that the entire table can be used, for example, all rows (in other words, a number of symbols=1 and a number of symbols=2) in Table 8-2. During specific implementation, the configuration based on the RRC signaling may be implemented in a plurality of manners. For example, independent RRC signaling may be used for configuration, or the RRC signaling may be bound with other RRC signaling indicating FL DMRS indication information to perform implicit indication.

During explicit indication, independent RRC signaling may be used for configuration. For example, in RRC signaling, set1 and set2 are configured to correspond to some predefined state sets (for example, set1 corresponds to a state in a case of a number of symbols=1, and set2 corresponds to all states in the table), or it is directly indicated that first some states (value) are activated (for example, in Table 8-1, '1010/binary' indicates that first 11 values 0 to 10 are used, or a value is directly indicated, where all values before the value are activated), or an on/off state is configured for enabling (for example, off represents that the only a number of symbols=1 is used, and on represents an entire table is used), or a bitmap is used to independently indicate each value in a table. A specific RRC configuration method is not limited herein.

In another implementation, enabling of a sub-table may be bound with other RRC signaling, for example, may be bound with a parameter that is in RRC and that indicates a maximum number of symbols of an FL DMRS, and for example, bound with DL-DMRS-max-len or UL-DMRS-max-len. The following uses DL as an example. When DL-DMRS-max-len=1, it indicates that a maximum number of symbols of an FL DMRS is 1. In other words, the system invokes only a 1-symbol FL DMRS. In this case, the receive end and the transmit end use only a state corresponding to the 1-symbol FL DMRS in Table 8-2, for example, a value is any one of 0 to 22. When DL-DMRS-max-len=2, it indicates that a maximum number of symbols of an FL DMRS is 2. In other words, the system can invoke a 1-symbol FL DMRS pattern and a 2-symbol FL DMRS. In this case, the receive end and the transmit end can use states corresponding to the 1-symbol FL DMRS and the 2-symbol FL DMRS in Table 8-2. In other words, states in the entire table can be used.

In addition, in cases of different maximum symbol quantities of an FL DMRS (for example, when DL-DMRS-max-len or UL-DMRS-max-len in the RRC signaling is equal to 1 or 2), lengths of DCI signaling for corresponding DMRS port scheduling are different, quantities of bits are different, or DCI fields are different.

Embodiment 4

In this embodiment, the method provided in this application is applied to specific implementations of various NR scenarios. Specifically, in a 2-PDCCH or 1-PDCCH non-coherent joint transmission (NC-JT) scenario, a plurality of DMRS configuration information tables bound with a pattern are set for two transmission reception points (TRPs).

Figure 13:
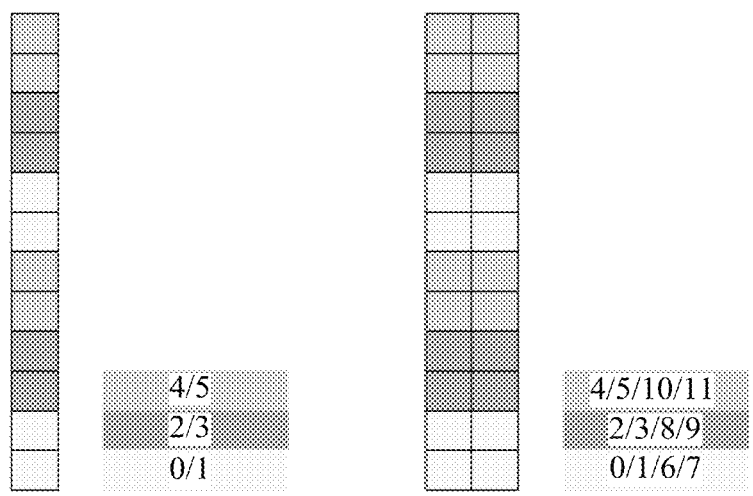
FIG. 13 is a schematic diagram of another DMRS pattern according to an embodiment of this application.
Figure 14:
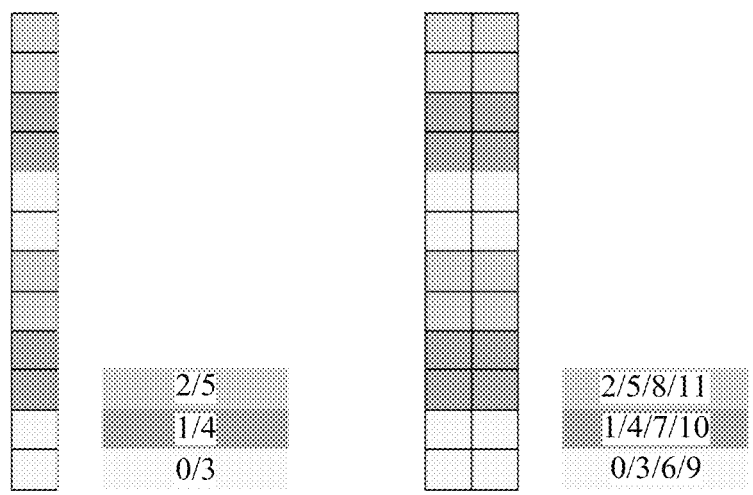
FIG. 14 is a schematic diagram of another DMRS pattern according to an embodiment of this application.
Figure 15:
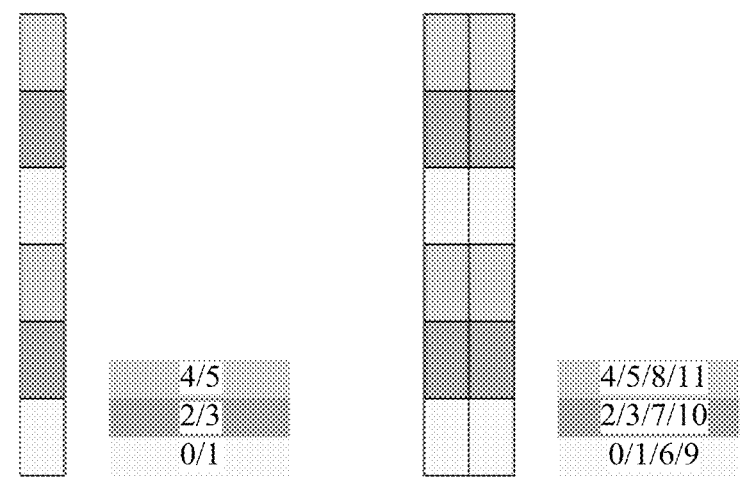
FIG. 15 is a schematic diagram of another DMRS pattern according to an embodiment of this application.

In this embodiment, ports are selected from different DMRS port groups to form port combinations. In a single-PDCCH scenario, a base station needs to notify scheduling UE of the port combinations by using one piece of DCI, while in a dual-PDCCH scenario, may notify UE of the port combinations by using two pieces of DCI. Division of a DMRS port group is related to a pattern configuration and a port mapping scheme. For example, there may be two port mapping schemes for a configuration type 1, as shown in FIG. 11 or FIG. 12, and there may be three port mapping schemes for a configuration type 2, respectively as shown in FIG. 13, FIG. 14, and FIG. 15.

The foregoing various port mapping schemes are obtained by sequentially performing code division multiplexing and frequency division multiplexing on ports, or by sequentially performing frequency division multiplexing and code division multiplexing on ports. Different DMRS port groups may be obtained through various different port mapping, and a grouping basis is that ports on which code division multiplexing is performed can be located only in a same group.

Figure 11:
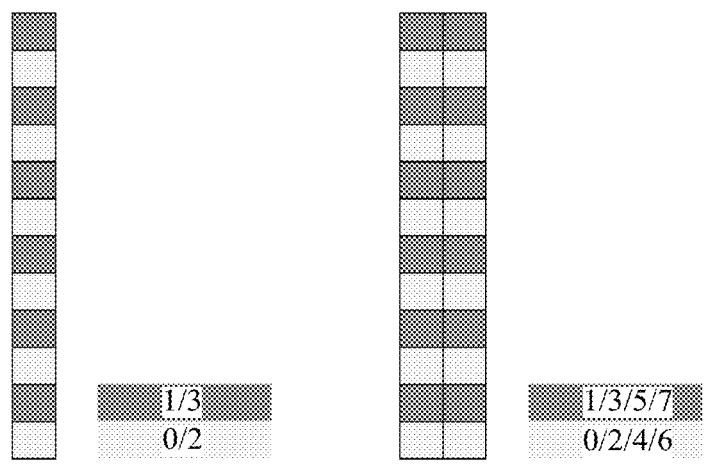
FIG. 11 is a schematic diagram of another DMRS pattern according to an embodiment of this application.
Figure 12:
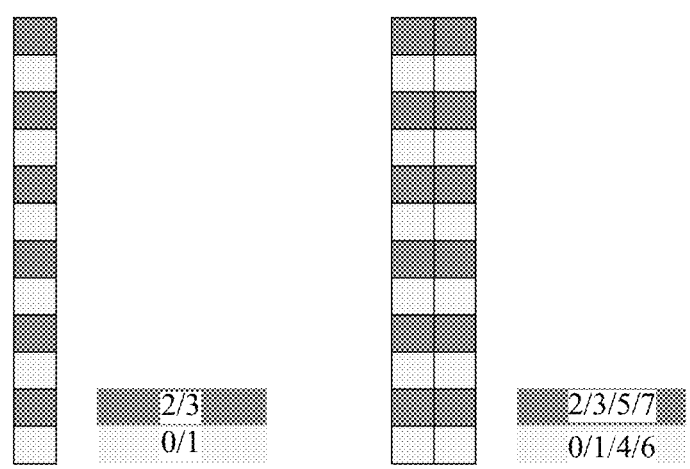
FIG. 12 is a schematic diagram of another DMRS pattern according to an embodiment of this application.

For example, DMRS groups in FIG. 11 are {(0, 2, 4, 6), (1, 3, 5, 7)} or subsets of each group, for example, {(0, 2), (1, 3)};

DMRS groups in FIG. 12 are {(0, 1, 4, 6), (2, 3, 5, 7)} or subsets of each group;

DMRS groups in FIG. 13 are {(0, 1, 6, 7), (2, 3, 4, 5, 8, 9, 10, 11)}, {(0, 1, 6, 7, 4, 5, 10, 11), (2, 3, 8, 9)}, {(0, 1, 6, 7, 2, 3, 8, 9), (4, 5, 10, 11)}, or subsets of each group;

DMRS groups in FIG. 14 are {(0, 3, 6, 9), (1, 4, 7, 10, 2, 5, 8, 11)}, {(0, 3, 6, 9, 1, 4, 7, 10), (2, 5, 8, 11)}, {(1, 4, 7, 10), (0, 3, 6, 9, 2, 5, 8, 11)}, or subsets of each group; and DMRS groups in FIG. 15 are {(0, 1, 6, 9), (2, 3, 7, 10, 4, 5, 8, 11)}, {(0, 1, 6, 9, 4, 5, 8, 11), (2, 3, 7, 10)}, {(4, 5, 8, 11), (0, 1, 6, 9, 2, 3, 7, 10)}, or subsets of each group.

In this embodiment, ports need to be selected from different groups, to form port combinations. Therefore, different port groups form different port combinations. In the following, a DMRS configuration information table is designed by using one port mapping scheme in each configuration as an example.

Figure 16:
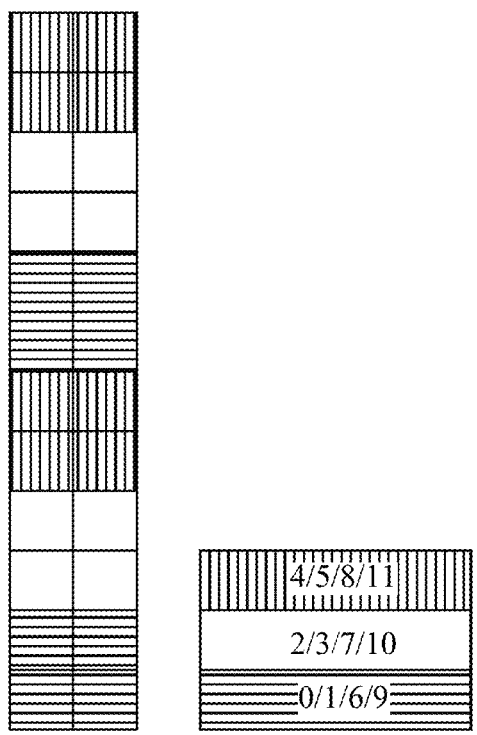
FIG. 16 is a schematic diagram of another DMRS pattern according to an embodiment of this application.

For example, FIG. 16 is a schematic diagram of mapping between a pattern and a port in NC-JT. A corresponding quasi co-location (QCL) group status is that a TRP 1 uses a port group including ports {0, 1, 6, 9}, and a TRP 2 uses ports {2, 3, 4, 5, 7, 8, 10, 11}.

To support an NC-JT 1-PDCCH scenario shown in FIG. 16, a DMRS configuration information table shown in Table 9 is based on the DMRS configuration information table shown in Table 4, where rows corresponding to values 25 to 32 are added to the left column, and rows corresponding to values 4 to 18 are added to the right column. For specific content, refer to Table 9.

TABLE 9

DMRS for a maximum of 12 ports (pattern config. 2-2 symbols), single PDCCH

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 (SU) |
| 1 | 1 | 1 | 1 | 6 | 0-5 (SU) |
| 2 | 1 | 2 | 2 | 7 | 0-6 (SU) |
| 3 | 1 | 3 | 3 | 8 | 0-7 (SU) |
| 4 | 1 | 4 | 4 | 5 | 1, 2-5 |
| 5 | 1 | 5 | 5 | 5 | 7-11 |
| 6 | 1 | 6 | 6 | 5 | 5-9 |
| 7 | 1 | 7 | 7 | 5 | 0-3, 6 |
| 8 | 1 | 8 | 8 | 5 | 0-2, 6, 9 |
| 9 | 1 | 9 | 9 | 6 | 3-8 |
| 10 | 1 | 10 | 10 | 6 | 6-11 |
| 11 | 1 | 11 | 11 | 6 | 0-4, 6 |
| 12 | 2 | 0-1 | 12 | 6 | 0-3, 6, 9 |
| 13 | 2 | 2-3 | 13 | 7 | 2-8 |
| 14 | 2 | 4-5 | 14 | 7 | 1-7 |
| 15 | 2 | 6-7 | 15 | 7 | 0-4, 6, 9 |
| 16 | 2 | 8-9 | 16 | 8 | 2-8, 10 |
| 17 | 2 | 10-11 | 17 | 8 | 0-5, 7-8 |
| 18 | 3 | 0-2 | 18 | 8 | 0-6, 9 |
| 19 | 3 | 3-5 | 19 | Reserved | Reserved |
| 20 | 3 | 6-8 | 20 | Reserved | Reserved |
| 21 | 3 | 9-11 | 21 | Reserved | Reserved |
| 22 | 4 | 0-3 | 22 | Reserved | Reserved |

TABLE 9-continued

DMRS for a maximum of 12 ports (pattern config. 2-2 symbols), single PDCCH

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 23 | 4 | 4-7 | 23 | Reserved | Reserved |
| 24 | 4 | 8-11 | 24 | Reserved | Reserved |
| 25 | 2 | 0, 2 | 25 | Reserved | Reserved |
| 26 | 2 | 1, 3 | 26 | Reserved | Reserved |
| 27 | 3 | 6-7, 9 | 27 | Reserved | Reserved |
| 28 | 3 | 8, 10-11 | 28 | Reserved | Reserved |
| 29 | 3 | 0, 2-3 | 29 | Reserved | Reserved |
| 30 | 3 | 1, 4-5 | 30 | Reserved | Reserved |
| 31 | 4 | 6-9 | 31 | Reserved | Reserved |
| 32 | 4 | 0-1, 2, 6 | 32 | Reserved | Reserved |

To support an NC-JT 2-PDCCH scenario shown in FIG. 16, a DMRS configuration information table shown in Table 10 is based on the DMRS configuration information table shown in Table 4, where rows corresponding to values 25 to 32 are added to the left column, and rows corresponding to values 4 to 7 are added to the right column. For specific content, refer to Table 10.

TABLE 10

DMRS for a maximum of 12 ports (pattern config. 2-2 symbols), two PDCCHs

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 (SU) |
| 1 | 1 | 1 | 1 | 6 | 0-5 (SU) |
| 2 | 1 | 2 | 2 | 7 | 0-6 (SU) |
| 3 | 1 | 3 | 3 | 8 | 0-7 (SU) |
| 4 | 1 | 4 | 4 | 6 | 2-7 |
| 5 | 1 | 5 | 5 | 6 | 2-5, 7-8 |
| 6 | 1 | 6 | 6 | 5 | 2-5, 7 |
| 7 | 1 | 7 | 7 | 7 | 2-5, 7-8, 10 |
| 8 | 1 | 8 | 8 | Reserved | Reserved |
| 9 | 1 | 9 | 9 | Reserved | Reserved |
| 10 | 1 | 10 | 10 | Reserved | Reserved |
| 11 | 1 | 11 | 11 | Reserved | Reserved |
| 12 | 2 | 0-1 | 12 | Reserved | Reserved |
| 13 | 2 | 2-3 | 13 | Reserved | Reserved |
| 14 | 2 | 4-5 | 14 | Reserved | Reserved |
| 15 | 2 | 6-7 | 15 | Reserved | Reserved |
| 16 | 2 | 8-9 | 16 | Reserved | Reserved |
| 17 | 2 | 10-11 | 17 | Reserved | Reserved |
| 18 | 3 | 0-2 | 18 | Reserved | Reserved |
| 19 | 3 | 3-5 | 19 | Reserved | Reserved |
| 20 | 3 | 6-8 | 20 | Reserved | Reserved |
| 21 | 3 | 9-11 | 21 | Reserved | Reserved |
| 22 | 4 | 0-3 | 22 | Reserved | Reserved |
| 23 | 4 | 4-7 | 23 | Reserved | Reserved |
| 24 | 4 | 8-11 | 24 | Reserved | Reserved |
| 25 | 2 | 7-8 | 25 | Reserved | Reserved |
| 26 | 2 | 6, 9 | 26 | Reserved | Reserved |
| 27 | 3 | 7-8, 10 | 27 | Reserved | Reserved |
| 28 | 3 | 0-1, 6 | 28 | Reserved | Reserved |
| 29 | 4 | 2-5 | 29 | Reserved | Reserved |
| 30 | 4 | 7-8, 10-11 | 30 | Reserved | Reserved |
| 31 | 4 | 0, 1, 6, 9 | 31 | Reserved | Reserved |

Figure 17:
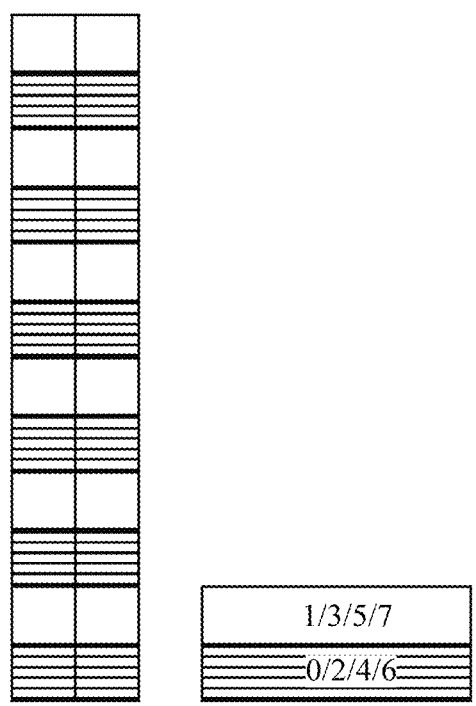
FIG. 17 is a schematic diagram of another DMRS pattern according to an embodiment of this application.

FIG. 17 is another schematic diagram of mapping between a pattern and a port corresponding to NC-JT. A corresponding quasi co-location (QCL) group status is that a TRP 1 uses a port group including ports {0, 2, 4, 6}, and a TRP 2 uses ports {1, 3, 5, 7}.

To support an NC-JT 1-PDCCH scenario shown in FIG. 17, a DMRS configuration information table shown in Table 11 is based on the DMRS configuration information table shown in Table 3, where rows corresponding to values 16 to 19 are added to the left column, and rows corresponding to values 4 to 10 are added to the right column. For specific content, refer to Table 11.

TABLE 11

DMRS for a maximum of eight ports (pattern config. 1-2 symbols), single PDCCH

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 |
| 1 | 1 | 1 | 1 | 6 | 0-5 |
| 2 | 1 | 2 | 2 | 7 | 0-6 |
| 3 | 1 | 3 | 3 | 8 | 0-7 |
| 4 | 1 | 4 | 4 | 5 | 0-2, 4, 6 |
| 5 | 1 | 5 | 5 | 5 | 0-2, 3-4 |
| 6 | 1 | 6 | 6 | 5 | 1-5 |
| 7 | 1 | 7 | 7 | 5 | 1-3, 5, 7 |
| 8 | 2 | 0-1 | 8 | 6 | 0-3, 4, 6 |
| 9 | 2 | 2-3 | 9 | 6 | 0-3, 5, 7 |
| 10 | 2 | 4-5 | 10 | 7 | 1-7 |
| 11 | 2 | 6-7 | 11 | | |
| 12 | 3 | 0-2 | 12 | | |
| 13 | 3 | 3-5 | 13 | | |
| 14 | 4 | 0-3 | 14 | | |
| 15 | 4 | 4-7 | 15 | | |
| 16 | 3 | 4-6 | 16 | | |
| 17 | 3 | 1, 6-7 | 17 | | |
| 18 | 4 | 0-2, 4 | 18 | | |
| 19 | 4 | 1-3, 5 | 19 | | |

To support an NC-JT 2-PDCCH scenario shown in FIG. 17, a DMRS configuration information table shown in Table 12 is based on the DMRS configuration information table shown in Table 3, where rows corresponding to values 16 to 23 are added to the left column. For specific content, refer to Table 12.

TABLE 12

DMRS for a maximum of eight ports (pattern config. 1-2 symbols), two PDCCHs

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 |
| 1 | 1 | 1 | 1 | 6 | 0-5 |
| 2 | 1 | 2 | 2 | 7 | 0-6 |
| 3 | 1 | 3 | 3 | 8 | 0-7 |
| 4 | 1 | 4 | 4 | Reserved | Reserved |
| 5 | 1 | 5 | 5 | Reserved | Reserved |
| 6 | 1 | 6 | 6 | Reserved | Reserved |
| 7 | 1 | 7 | 7 | Reserved | Reserved |
| 8 | 2 | 0-1 | 8 | Reserved | Reserved |
| 9 | 2 | 2-3 | 9 | Reserved | Reserved |
| 10 | 2 | 4-5 | 10 | Reserved | Reserved |
| 11 | 2 | 6-7 | 11 | Reserved | Reserved |
| 12 | 3 | 0-2 | 12 | Reserved | Reserved |
| 13 | 3 | 3-5 | 13 | Reserved | Reserved |
| 14 | 4 | 0-3 | 14 | Reserved | Reserved |
| 15 | 4 | 4-7 | 15 | Reserved | Reserved |
| 16 | 2 | 1, 3 | 16 | Reserved | Reserved |
| 17 | 2 | 5, 7 | 17 | Reserved | Reserved |

TABLE 12-continued

DMRS for a maximum of eight ports (pattern config. 1-2 symbols), two PDCCHs

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 18 | 2 | 0, 2 | 18 | Reserved | Reserved |
| 19 | 2 | 4, 6 | 19 | Reserved | Reserved |
| 20 | 3 | 1, 3, 5 | 20 | Reserved | Reserved |
| 21 | 3 | 0, 2, 4 | 21 | Reserved | Reserved |
| 22 | 4 | 1, 3, 5, 7 | 22 | Reserved | Reserved |
| 23 | 4 | 0, 2, 4, 6 | 23 | Reserved | Reserved |

Figure 18:
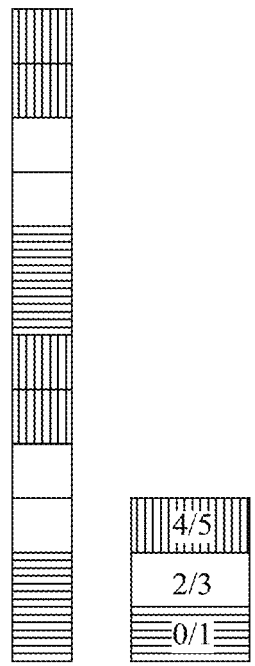
FIG. 18 is a schematic diagram of another DMRS pattern according to an embodiment of this application.

FIG. 18 is another schematic diagram of mapping between a pattern and a port corresponding to NC-JT. A corresponding quasi co-location (QCL) group status is that a TRP 1 uses a port group including ports 10, 11, and a TRP 2 uses ports {2, 3, 4, 5}.

To support an NC-JT 1-PDCCH scenario shown in FIG. 18, a DMRS configuration information table shown in Table 13 is based on the DMRS configuration information table shown in Table 2, where rows corresponding to values 12 to 15 are added to the right column, and a row corresponding to a value 2 is added to the left column. For specific content, refer to Table 13.

TABLE 13

DMRS for a maximum of six ports (pattern config 2-1 symbol), single PDCCH

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 (SU) |
| 1 | 1 | 1 | 1 | 6 | 0-5 (SU) |
| 2 | 1 | 2 | 2 | 5 | 0, 2-5 |
| 3 | 1 | 3 | 3 | Reserved | Reserved |
| 4 | 1 | 4 | 4 | Reserved | Reserved |
| 5 | 1 | 5 | 5 | Reserved | Reserved |
| 6 | 2 | 0-1 | 6 | Reserved | Reserved |
| 7 | 2 | 2-3 | 7 | Reserved | Reserved |
| 8 | 2 | 4-5 | 8 | Reserved | Reserved |
| 9 | 3 | 0-2 | 9 | Reserved | Reserved |
| 10 | 3 | 3-5 | 10 | Reserved | Reserved |
| 11 | 4 | 0-3 | 11 | Reserved | Reserved |
| 12 | 2 | 0, 2 | 12 | Reserved | Reserved |
| 13 | 2 | 1, 3 | 13 | Reserved | Reserved |
| 14 | 3 | 0, 2, 3 | 14 | Reserved | Reserved |
| 15 | 4 | 0, 2-4 | 15 | Reserved | Reserved |
| 16 | Reserved | Reserved | 16 | Reserved | Reserved |

Figure 28:
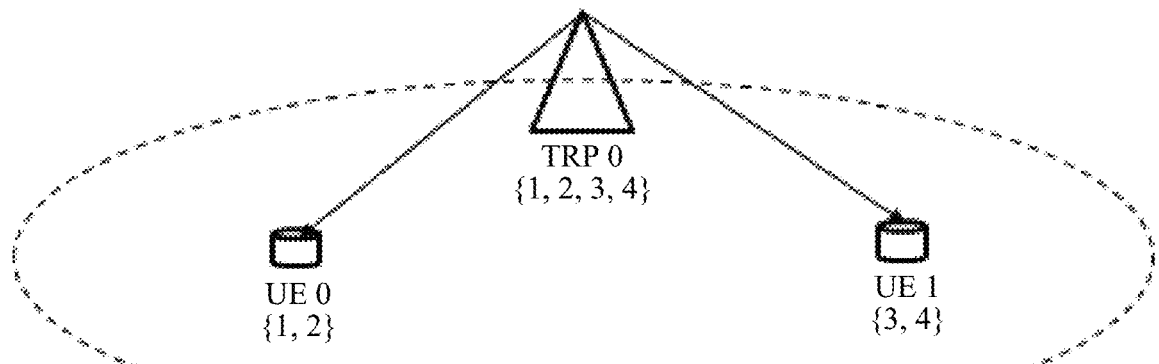
FIG. 28 is another schematic scenario diagram of a DMRS indicating and receiving method according to an embodiment of this application.

To support an NC-JT 2-PDCCH scenario shown in FIG. 28, a DMRS configuration information table shown in Table 14 is based on the DMRS configuration information table shown in Table 2, where a row corresponding to a value 12 is added to the left column. For specific content, refer to Table 14.

TABLE 14

DMRS for a maximum of six ports (pattern config 2-1 symbol), two PDCCHs

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | 5 | 0-4 (SU) |
| 1 | 1 | 1 | 1 | 6 | 0-5 (SU) |
| 2 | 1 | 2 | 2 | Reserved | Reserved |
| 3 | 1 | 3 | 3 | Reserved | Reserved |
| 4 | 1 | 4 | 4 | Reserved | Reserved |
| 5 | 1 | 5 | 5 | Reserved | Reserved |
| 6 | 2 | 0-1 | 6 | Reserved | Reserved |
| 7 | 2 | 2-3 | 7 | Reserved | Reserved |
| 8 | 2 | 4-5 | 8 | Reserved | Reserved |
| 9 | 3 | 0-2 | 9 | Reserved | Reserved |
| 10 | 3 | 3-5 | 10 | Reserved | Reserved |
| 11 | 4 | 0-3 | 11 | Reserved | Reserved |
| 12 | 4 | 2-5 | 12 | Reserved | Reserved |
| 13 | Reserved | Reserved | 13 | Reserved | Reserved |
| 14 | Reserved | Reserved | 14 | Reserved | Reserved |
| 15 | Reserved | Reserved | 15 | Reserved | Reserved |
| 16 | Reserved | Reserved | 16 | Reserved | Reserved |

Figure 19:
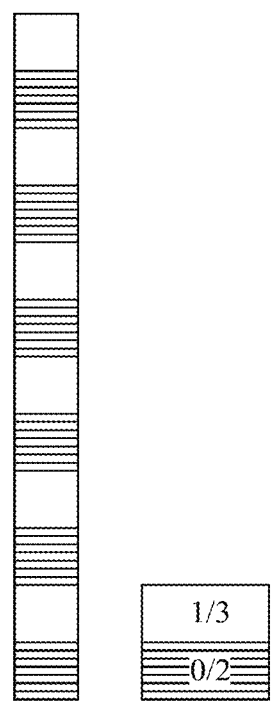
FIG. 19 is a schematic diagram of another DMRS pattern according to an embodiment of this application.

FIG. 19 is another schematic diagram of mapping between a pattern and a port corresponding to NC-JT. A corresponding quasi co-location (QCL) group status is that a TRP 1 uses a port group including ports {0, 2}, and a TRP 2 uses ports {1, 3}.

To support an NC-JT 1-PDCCH scenario shown in FIG. 19, a DMRS configuration information table shown in Table 15-1 is based on the DMRS configuration information table shown in Table 1, where a row corresponding to a value 8 is added to the right column. For specific content, refer to Table 15-1.

TABLE 15-1

DMRS for a maximum of four ports (pattern config. 1-1 symbol), single PDCCH

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | Reserved | Reserved |
| 1 | 1 | 1 | 1 | Reserved | Reserved |
| 2 | 1 | 2 | 2 | Reserved | Reserved |
| 3 | 1 | 3 | 3 | Reserved | Reserved |
| 4 | 2 | 0-1 | 4 | Reserved | Reserved |
| 5 | 2 | 2-3 | 5 | Reserved | Reserved |
| 6 | 3 | 0-2 | 6 | Reserved | Reserved |
| 7 | 4 | 0-3 | 7 | Reserved | Reserved |
| 8 | 3 | 1-3 | 8 | Reserved | Reserved |

To support an NC-JT 2-PDCCH scenario shown in FIG. 19, a DMRS configuration information table shown in Table 15-2 is based on the DMRS configuration information table shown in Table 1, where rows corresponding to values 8 and 9 are added to the left column. For specific content, refer to Table 15-2.

TABLE 15-2

DMRS for a maximum of four ports
(pattern config 1-1 symbol), two PDCCHs

| One Codeword (≤4 layers): Codeword 0 enabled, Codeword 1 disabled | | | Two Codewords (>4 layers): Codeword 0 enabled, Codeword 1 enabled | | |
|---|---|---|---|---|---|
| Value | UE rank | Port index | Value | UE rank | Port index |
| 0 | 1 | 0 | 0 | Reserved | Reserved |
| 1 | 1 | 1 | 1 | Reserved | Reserved |
| 2 | 1 | 2 | 2 | Reserved | Reserved |
| 3 | 1 | 3 | 3 | Reserved | Reserved |
| 4 | 2 | 0-1 | 4 | Reserved | Reserved |
| 5 | 2 | 2-3 | 5 | Reserved | Reserved |
| 6 | 3 | 0-2 | 6 | Reserved | Reserved |
| 7 | 4 | 0-3 | 7 | Reserved | Reserved |
| 8 | 2 | 1, 3 | 8 | Reserved | Reserved |
| 9 | 2 | 0, 2 | 9 | Reserved | Reserved |

According to any one of Embodiment 1 to Embodiment 4, in different NR scenarios or for different transmission requirements, the transmit end selects suitable DMRS configuration information, obtains DMRS indication information based on the selected DMRS configuration information, and then sends the DMRS indication information to the receive end.

When receiving a value indicating the DMRS indication information, the receive end demodulates a reference signal on a corresponding time-frequency resource location based on a quantity of orthogonal transmission layers or an orthogonal port number that is indicated by the value, or based on a resource that is not occupied by a DMRS.

To facilitate scheduling by the base station, in an MU-MIMO scenario, for a particular receive end, the DMRS port is first scheduled from one CDM group, and then scheduled across CDM groups. Such a scheduling rule may be referred to as a CDM-first scheduling rule. Considering that a DMRS port indicates that a table includes both an SU state and an MU state, particularly, for scheduling in SU-MIMO, different scheduling rules have different benefits. The following provides examples for specific descriptions. The following port mapping orders are considered:

for a 1-symbol DMRS type 1, ports included in a CDM group 1 are {0, 1}, and ports included in a CDM group 2 are {2, 3};

for a 2-symbol DMRS type 1, ports included in a CDM group 1 are {0, 1, 4, 5}, and ports included in a CDM group 2 are {2, 3, 6, 7};

for a 1-symbol DMRS type 2, ports included in a CDM group 1 are {0, 1}, ports included in a CDM group 2 are {2, 3}, and ports included in a CDM group 3 are {4, 5}; and for a 2-symbol DMRS type 2, ports included in a CDM group 1 are {0, 1, 6, 7}, ports included in a CDM group 2 are {2, 3, 8, 9}, and ports included in a CDM group 3 are {4, 5, 10, 11}.

For SU, the transmit end may allocate DMRS ports of the receive end according to the following rules. The following provides specific descriptions. It should be noted that, a specific scheduling rule is only provided herein. When the DMRS mapping rule changes, allocation of a DMRS port number in an example may change, but the scheduling rule does not change.

CDM-first scheduling: For the receive end, a DMRS port is preferentially scheduled from one CDM group. When all port numbers in the CDM group are occupied, scheduling is performed in another port group. The scheme has an advantage that SU scheduling and MU scheduling have a same rule. The following provides a specific example for a DMRS type. The following example may be represented as a row (value) in a DMRS port scheduling table (for example, Table 8-1 or Table 8-2).

For the 1-symbol DMRS type 1, when two layers of data of the receive end are scheduled, scheduled ports may be 0 and 1 (or 2 and 3). In other words, the scheduled ports are in a same CDM group. When three layers of data of the receive end are scheduled, scheduled ports may be 0, 1, and 2. In other words, all ports in the CDM group 1 are scheduled, and then, the port 2 in the CDM group 2 is scheduled. Specifically, in Table 16-1, the following rows of downlink state information may be reflected.

TABLE 16-1

Example of a DMRS type 1

| Value | Number of co-scheduled CDM groups | UE rank | Ports | number of symbols |
|---|---|---|---|---|
| X | 1 | 2 | 0, 1 | 1 |
| Y | 2 | 3 | 0, 1, 2 | 1 |

For the 2-symbol DMRS type 1, when four layers of data of the receive end are scheduled, scheduled ports may be 0, 1, 4, and 5. In other words, the scheduled ports are in a same CDM group. When five layers of data of the receive end are scheduled, scheduled ports may be 0, 1, 4, 5, and 2. In other words, all ports in the CDM group 1 are scheduled, and then, a port in the CDM group 2 is scheduled. Specifically, in Table 16-2, the following rows of downlink state information may be reflected.

TABLE 16-2

Example of a DMRS type 1

| Value | Number of co-scheduled CDM groups | UE rank | Ports | number of symbols |
|---|---|---|---|---|
| X | 1 | 4 | 0, 1, 4, 5 | 2 |
| Y | 2 | 5 | 0, 1, 2, 4, 5 | 2 |

For the 1-symbol DMRS type 2, when three layers of data of the receive end are scheduled, scheduled ports may be 0, 1, and 2. In other words, all ports in the CDM group 1 are scheduled, and then, a port in the CDM group 2 is scheduled. When five layers of data of the receive end are scheduled, scheduled ports may be 0, 1, 2, 3, and 4. In other words, all ports in the CDM groups 1 and 2 are scheduled, and then, a port in the CDM group 3 is scheduled, as shown in Table 16-3:

TABLE 16-3

Example of a DMRS type 2

| Value | Number of co-scheduled CDM groups | UE rank | Ports | number of symbols |
|---|---|---|---|---|
| X | 2 | 3 | 0, 1, 2 | 1 |
| Y | 3 | 5 | 0, 1, 2, 3, 4 | 1 |

For the 2-symbol DMRS type 2, when three layers of data of the receive end are scheduled, scheduled ports may be 0, 1, and 6. In other words, the CDM group 1 is occupied, or in other words, scheduling is preferentially performed in the CDM group 1. When five layers of data of the receive end are scheduled, scheduled ports may be 0, 1, 6, 7, and 2. In other words, all ports in the CDM group 1 are scheduled, and then, a port in the CDM group 2 is scheduled, as shown in Table 16-4:

TABLE 16-4

Example of a DMRS type 2

| Value | Number of co-scheduled CDM groups | UE rank | Ports | number of symbols |
|---|---|---|---|---|
| X | 1 | 3 | 0, 1, 6 | 2 |
| Y | 2 | 5 | 0, 1, 2, 6, 7 | 2 |

FDM-first scheduling: For the receive end, DMRS port is first scheduled across CDM groups. After a port in each CDM group is scheduled, scheduling continues to be performed across the CDM groups starting from the first CDM group. A main idea is to average quantities of DMRS ports scheduled in all CDM groups as far as possible. For example, when three ports are scheduled, for the type 2, one port is scheduled in each of the three CDM groups. This scheme has a characteristic of averaging a quantity of DMRS ports used in each CDM group during SU scheduling, so that power in each CDM group is more averaged. A sequence of port numbers provided below is only an example for better understanding. During specific implementation, a sequence of writing the port numbers is not limited. For example, 0, 2, 1, 3, and 4 may be written into 0, 1, 2, 3, and 4.

For the 1-symbol DMRS type 1, when two layers of data of the receive end are scheduled, scheduled ports may be 0 and 2. In other words, ports are preferentially scheduled across CDM groups. When three layers of data of the receive end are scheduled, scheduled ports may be 0, 1, and 2. In other words, one port in each of the CDM groups 1 and 2 is scheduled, and then, a port in the CDM group 1 is scheduled, as shown in Table 16-5:

TABLE 16-5

Example of a DMRS type 1

| Value | Number of co-scheduled CDM groups | UE rank | Ports | number of symbols |
|---|---|---|---|---|
| X | 2 | 2 | 0, 2 | 1 |
| Y | 2 | 3 | 0, 1, 2 | 1 |

For the 2-symbol DMRS type 1, when two layers of data of the receive end are scheduled, scheduled ports may be 0 and 2. In other words, scheduling is preferentially performed across CDM groups. When five layers of data of the receive end are scheduled, scheduled ports may be 0, 2, 1, 3, 4. In other words, the scheduled DMRS ports are allocated in the CDM groups as evenly as possible, as shown in Table 16-6:

TABLE 16-6

Example of a DMRS type 1

| Value | Number of co-scheduled CDM groups | UE rank | Ports | number of symbols |
|---|---|---|---|---|
| X | 2 | 2 | 0, 2 | 2 |
| Y | 2 | 5 | 0, 1, 2, 3, 4 | 2 |

For the 1-symbol DMRS type 2, when three layers of data of the receive end are scheduled, scheduled ports may be 0, 2, and 4. In other words, one DMRS port in each of the CDM groups 1, 2, and 3 is occupied. When four layers of data of the receive end are scheduled, scheduled ports may be 0, 2, 4, and 1. In other words, a port in each of the CDM groups 1, 2, and 3 is scheduled, and then, a port in the CDM group 1 is scheduled again, as shown in Table 16-7:

TABLE 16-7

Example of a DMRS type 2

| Value | Number of co-scheduled CDM groups | UE rank | Ports | number of symbols |
|---|---|---|---|---|
| X | 3 | 3 | 0, 2, 4 | 1 |
| Y | 3 | 4 | 0, 1, 2, 4 | 1 |

For the 2-symbol DMRS type 2, when three layers of data of the receive end are scheduled, scheduled ports may be 0, 2, and 4. When eight layers of data of the receive end are scheduled, scheduled ports may be 0, 1, 2, 3, 4, 5, 6, and 8, as shown in Table 16-8:

TABLE 16-8

Example of a DMRS type 1

| Value | Number of co-scheduled CDM groups | UE rank | Ports | number of symbols |
|---|---|---|---|---|
| X | 3 | 3 | 0, 2, 4 | 2 |
| Y | 3 | 8 | 0, 1, 2, 3, 4, 5, 6, 8 | 2 |

In addition, for the FDM-first scheduling scheme, during specific implementation, a number of CDM groups in FDM-first scheduling is limited to improve spectral efficiency of SU scheduling. For example, in three CDM groups for the DMRS type 2, when SU is limited, FDM-first scheduling may be performed on two of the CDM groups. In this case, for the type 2, when six layers (or four DMRS ports) are scheduled, scheduled ports may be 0, 1, 2, 3, 6, and 8. In other words, both the CDM groups 1 and 2 are scheduled. When eight layers are scheduled, scheduled ports may be 0, 1, 2, 3, 6, 7, 8, and 9. In other words, three ports are scheduled in each of the CDM groups 1 and 2. This scheme has an advantage that the CDM group 3 may be used to transmit data, thereby improving spectral efficiency, as shown in Table 16-9:

TABLE 16-9

Example of a DMRS type 2

| Value | Number of co-scheduled CDM groups | UE rank | Ports | number of symbols |
|---|---|---|---|---|
| X | 2 | 6 | 0, 1, 2, 3, 6, 8 | 2 |
| Y | 2 | 8 | 0, 1, 2, 3, 6, 7, 8, 9 | 2 |

Continuous port-number scheduling: For the receive end, DMRS ports are continuously scheduled in descending order of DMRS port numbers. This scheme has a characteristic of a simply designed table. For example, three layers correspond to DMRS port numbers 0 to 2, five layers correspond to DMRS port numbers 0 to 4, and eight layers correspond to DMRS port numbers 0 to 7.

During specific implementation, the foregoing scheduling rules may be combined or supplemented, or may exist at the same time. For example, for a table including both the 1-symbol and the 2-symbol DMRS type 1 (or type 2), the table may include statuses of CDM-first scheduling, FDM-first scheduling, continuous port-number scheduling, to increase flexibility of system scheduling.

In an implementation method, for a same number of symbols and a same quantity of scheduled layers, the table may include both statuses of CDM-first scheduling and FDM-first scheduling, to improve scheduling flexibility or spectral efficiency, as shown in Table 16-10:

TABLE 16-10

Example of a DMRS type 1

| Value | Number of co-scheduled CDM groups | UE rank | Ports | number of symbols |
|---|---|---|---|---|
| X | 1 | 2 | 0, 1 | 1 |
| Y | 2 | 2 | 0, 2 | 1 |

Alternatively, in an implementation, in the table, the continuous port-number scheduling rule may be used for a case in which a quantity of layers is greater than a particular quantity of scheduled layers, and the FDM or CDM-first scheduling rule may be used for a case in which a quantity of layers is less than the particular quantity of scheduled layers, as shown in Table 16-11:

TABLE 16-11

Example of a DMRS type 1

| Value | Number of co-scheduled CDM groups | UE rank | Ports | number of symbols |
|---|---|---|---|---|
| X | 3 | 3 | 0, 2, 4 | 2 |
| Y | 2 | 8 | 0-7 | 2 |

Alternatively, in the table, different scheduling rules or a combination of a plurality of rules may be used for a 1-symbol or 2-symbol FL DMRS configuration. For example, the FDM-first scheduling rule is used for the 1-symbol DMRS type 2, and the FDM-first scheduling rule is used for two CDM groups for the 2-symbol type 2, thereby improving spectral efficiency of SU scheduling in the case of the 2-symbol type 2, as shown in Table 16-12:

TABLE 16-12

Example of a DMRS type 2

| Value | Number of co-scheduled CDM groups | UE rank | Ports | number of symbols |
|---|---|---|---|---|
| X | 3 | 3 | 0, 2, 4 | 1 |
| Y | 2 | 8 | 0, 1, 2, 3, 6, 7, 8, 9 | 2 |

It should be noted that, the rules for SU scheduling that are provided in the foregoing embodiments do not limit specific port mapping. It may be understood that, for specific different port mapping orders, numbers of different scheduled DMRS ports may be obtained by using a same scheduling rule. For example, when ports in the CDM group 1 are {0, 1, 4, 5}, and ports in the CDM group 2 are {2, 3, 6, 7}, according to the FDM-first scheduling rule, six layers correspond to port numbers 0, 1, 2, 3, 4, and 6. When ports in the CDM group 1 are {0, 1, 4, 6}, and ports in the CDM group 2 are {2, 3, 5, 7}, according to the FDM-first scheduling rule, six layers correspond to port numbers 0, 1, 2, 3, 4, and 5. It may be understood that, in cases of different port mapping orders, the foregoing two port number scheduling technologies are the same in essence.

In summary, in the DMRS configuration information table provided in the embodiments of this application, CDM group information, or DMRS symbol information, or rate matching indication (RMI) information may be added for rate matching.

The following describes this in detail. Table 17-1 and Table 17-2 are DMRS port indication tables (DMRS port indication table) corresponding to different DMRS configurations (DMRS configuration types), where Table 17-1 corresponds to a DMRS type 1, and Table 17-2 corresponds to a DMRS type 2. Herein, Table 17-1 and Table 17-2 each are divided into two columns based on a codeword number, to reduce bit overheads. During specific implementation, a structure of the table may be designed in another manner, and this is only an example.

In this embodiment, it is assumed that specific DMRS port mapping rules of the DMRS type 1 and the DMRS type 2 are as follows:

for a 1-symbol DMRS type 1, ports included in a CDM group 1 are {0, 1}, and ports included in a CDM group 2 are {2, 3};

for a 2-symbol DMRS type 1, ports included in a CDM group 1 are {0, 1, 4, 5}, and ports included in a CDM group 2 are {2, 3, 6, 7};

for a 1-symbol DMRS type 2, ports included in a CDM group 1 are {0, 1}, ports included in a CDM group 2 are {2, 3}, and ports included in a CDM group 3 are {4, 5}; and for a 2-symbol DMRS type 2, ports included in a CDM group 1 are {0, 1, 6, 7}, ports included in a CDM group 2 are {2, 3, 8, 9}, and ports included in a CDM group 3 are {4, 5, 10, 11}.

During specific implementation, there may be different DMRS port mapping rules. This embodiment is only for ease of description. Specifically, for different mapping rules, a scheduling rule in a table remains unchanged.

It can be learned that, for each DMRS configuration, information about a number of symbols of a DMRS and RMI information may be added to a table, to perform DMRS rate matching.

Optionally, herein, the RMI information that may be used for DMRS rate matching may be a number of CDM groups occupied in a current system, or a status of a combination of CDM groups occupied in a current system, or a sequence number of an occupied CDM group. The number of co-scheduled CDM groups provided in Table 17-1 and Table 17-2 are only examples. For a method for obtaining the number of CDM groups or a method for obtaining a status of the combination of the occupied CDM groups, the method in the foregoing embodiments may be used. For a manner of obtaining a sequence number of an occupied CDM group, in one implementation method, when one CDM group is occupied, RMI in a corresponding table is "1", and it indicates that a CDM group 1 is occupied; when two CDM groups are occupied, RMI in a corresponding table is "1, 2", and it indicates that CDM groups 1 and 2 are occupied; or when three CDM groups are occupied, RMI in a corresponding table is "1, 2, 3", and it indicates that CDM groups 1, 2, and 3 are occupied. During specific implementation, a correspondence between a quantity of occupied CDM groups and sequence numbers of the CDM groups may change. This is only an example.

Optionally, the DMRS symbol information is added to the table. In an implementation method, only a part of the table may be used during specific scheduling, to reduce DCI overheads. For example, when a current maximum number of symbols of a DMRS in the system is 1, during specific scheduling, a status corresponding to only one symbol, in other words, a status corresponding to a number of symbols being 1, is configured in the table. When the system informs that a current maximum number of symbols of a DMRS is 2, all statuses in the table are configured. The table configuration method may use the solution provided in the foregoing embodiments, for example, a part, for example, the status corresponding to the number of symbols being 1, of a table is selected by using independent RRC signaling. Alternatively, a table configuration may be bound with signaling of a maximum number of symbols of a DMRS. During specific implementation, the method in the foregoing embodiments may be used, and details are not repeated herein. In another implementation method, the table may not include information about a symbol quantity of a DMRS, in other words, a number of symbols column. The DMRS symbol information is implicitly represented by using a value. For example, it may be predefined that in Table 17-1, values 0 to 10 correspond to information about the 1-symbol DMRS type 1, and values 11 to 34 correspond to information about 2-symbol DMRS type 1.

Optionally, a table may include a plurality of scheduling rules. For example, in Table 17-1, in a case of one codeword, a value 2 corresponds to that a current quantity of orthogonal ports (a quantity of layers) of the receive end is 2, where port numbers are 0 and 1, in other words, the CDM-first scheduling rule; and a value 35 corresponds to that a current quantity of orthogonal ports of the receive end is 2, where port numbers are 0 and 2, in other words, the FDM-first scheduling rule. During specific implementation, states corresponding to both the value 2 and the value 35 are reserved in the table, to satisfy scheduling flexibility. Alternatively, only a state corresponding to the value 35 is reserved and a state corresponding to the value 2 is removed, to ensure FDM-first scheduling for an SU. In this case, the receive end may implicitly learn, according to a port number scheduling rule, that a current state is an SU state. Alternatively, only a state corresponding to the value 2 is reserved and a state corresponding to the value 35 is removed, to perform scheduling according to the CDM-first rule, thereby improving spectral efficiency. Specifically, in Table 17-1, values 0 to 34 correspond to a solution satisfying a basic scheduling requirement, and values 35 to 38 correspond to different scheduling methods. In an implementation method, the table may not include values 35 to 38, to reduce overheads. Alternatively, one or more of values 35 to 38 may replace one or more of values 0 to 34, to implement a particular scheduling requirement. Alternatively, one or more of values 35 to 38 may be reserved in the table, to implement flexible scheduling. Similarly, in Table 17-2, in a case of two codewords, a value 24 corresponds to a CDM-first scheduling rule when there are six layers, a value 73 corresponds to a continuous DMRS-port-number scheduling scheme when there are six layers, and a value 74 corresponds to an FDM-first scheduling rule in two CDM groups when there are six layers. During specific implementation, any one or more of the three schemes may be reserved, to satisfy a requirement of flexible scheduling or reducing overheads. Specifically, in Table 17-2, values 0 to 70 correspond to a solution satisfying a basic scheduling requirement, and values 71 to 81 correspond to different scheduling methods. During specific implementation, the table may not include values 71 to 81, to reduce overheads. Alternatively, one or more of values 71 to 81 may replace one or more of values 0 to 70, for example, a state corresponding to the value 71 is reserved and a state corresponding to the value 2 is removed in a case of one codeword, to implement a particular scheduling requirement. Alternatively, one or more of values 71 to 81 may be reserved in the table, to implement flexible scheduling. It may be understood that, the scheduling schemes provided in Table 17-1 and Table 17-2 are only examples. During specific implementation, other scheduling schemes may be added to improve scheduling flexibility and satisfy a scheduling requirement.

Optionally, Table 17-1 and Table 17-2 provides a scheme in which DCI overheads are reduced based on a codeword number. During specific implementation, classification may not be performed based on the codeword number, for example, a plurality of columns may be divided based on a quantity of layers of orthogonal ports (a quantity of orthogonal DMRS ports) of the receive end, to reduce DCI overheads. Alternatively, states corresponding to one codeword and two codewords in Table 17-1 (or Table 17-2) are grouped into different tables, to correspond to different bit overheads. Alternatively, states corresponding to one codeword and two codewords in Table 17-1 (or Table 17-2) are encoded together. For example, values 0 to 38 in Table 17-1 correspond to a state in which a quantity of orthogonal layers of the receive end is less than or equal to 4, and values greater than or equal to 39 correspond to a state in a case of two codewords in Table 17-1 (a quantity of orthogonal layers of the receive end is greater than 4). For an implementation method, refer to Table 17-3 and Table 17-4. In specific implementation, a state indication sequence may be changed, or some items may be replaced or removed, to implement different scheduling requirements. Alternatively, it may be configured that some states in the table are used in specific scheduling to reduce overheads. For a specific implementation method, refer to the foregoing embodiments. In addition, the table may include indications of SU and MU states, as shown in content in parentheses in Table 17-3 and Table 17-4. It may be understood that, during specific implementation, indication information of the SU and MU states may not be included, and a possible implementation method is provided herein.

TABLE 17-1

Example of a DMRS port combination type 1

| | One Codeword (≤4 layers) | | | | Two Codewords (>4 layers) | | | |
|---|---|---|---|---|---|---|---|---|
| Value | RMI (number of co-scheduled CDM groups) | UE rank | Ports | number of symbols | Value | RMI (number of co-scheduled CDM groups) | UE rank | Ports | number of symbols |
| 0 | 1 | 1 | 0 | 1 | 0 | reserved | reserved | reserved | 1 |
| 1 | 1 | 1 | 1 | 1 | 1 | reserved | reserved | reserved | 1 |
| 2 | 1 | 2 | 0, 1 | 1 | 2 | reserved | reserved | reserved | 1 |
| 3 | 2 | 1 | 0 | 1 | 3 | reserved | reserved | reserved | 1 |
| 4 | 2 | 1 | 1 | 1 | 4 | reserved | reserved | reserved | 1 |
| 5 | 2 | 1 | 2 | 1 | 5 | reserved | reserved | reserved | 1 |
| 6 | 2 | 1 | 3 | 1 | 6 | reserved | reserved | reserved | 1 |
| 7 | 2 | 2 | 0, 1 | 1 | 7 | reserved | reserved | reserved | 1 |
| 8 | 2 | 2 | 2, 3 | 1 | 8 | reserved | reserved | reserved | 1 |
| 9 | 2 | 3 | 0-2 | 1 | 9 | reserved | reserved | reserved | 1 |
| 10 | 2 | 4 | 0-3 | 1 | 10 | reserved | reserved | reserved | 1 |
| 11 | 1 | 1 | 0 | 2 | 11 | 2 | 5 | 0-2, 4, 5 | 2 |
| 12 | 1 | 1 | 1 | 2 | 12 | 2 | 6 | 0-5 | 2 |
| 13 | 1 | 1 | 4 | 2 | 13 | 2 | 7 | 0-6 | 2 |
| 14 | 1 | 1 | 5 | 2 | 14 | 2 | 8 | 0-7 | 2 |
| 15 | 1 | 2 | 0, 1 | 2 | 15 | reserved | reserved | reserved | 2 |
| 16 | 1 | 2 | 4-5 | 2 | 16 | reserved | reserved | reserved | 2 |
| 17 | 1 | 3 | 0, 1, 4 | 2 | 17 | reserved | reserved | reserved | 2 |
| 18 | 1 | 4 | 0, 1, 4, 5 | 2 | 18 | reserved | reserved | reserved | 2 |
| 19 | 2 | 1 | 0 | 2 | 19 | reserved | reserved | reserved | 2 |
| 20 | 2 | 1 | 1 | 2 | 20 | reserved | reserved | reserved | 2 |
| 21 | 2 | 1 | 2 | 2 | 21 | reserved | reserved | reserved | 2 |
| 22 | 2 | 1 | 3 | 2 | 22 | reserved | reserved | reserved | 2 |
| 23 | 2 | 1 | 4 | 2 | 23 | reserved | reserved | reserved | 2 |
| 24 | 2 | 1 | 5 | 2 | 24 | reserved | reserved | reserved | 2 |
| 25 | 2 | 1 | 6 | 2 | 25 | reserved | reserved | reserved | 2 |
| 26 | 2 | 1 | 7 | 2 | 26 | reserved | reserved | reserved | 2 |
| 27 | 2 | 2 | 0, 1 | 2 | 27 | reserved | reserved | reserved | 2 |
| 28 | 2 | 2 | 2, 3 | 2 | 28 | reserved | reserved | reserved | 2 |
| 29 | 2 | 2 | 4, 5 | 2 | 29 | reserved | reserved | reserved | 2 |
| 30 | 2 | 2 | 6, 7 | 2 | 30 | reserved | reserved | reserved | 2 |
| 31 | 2 | 3 | 0, 1, 4 | 2 | 31 | reserved | reserved | reserved | 2 |
| 32 | 2 | 3 | 2, 3, 6 | 2 | 32 | reserved | reserved | reserved | 2 |
| 33 | 2 | 4 | 0, 1, 4, 5 | 2 | 33 | reserved | reserved | reserved | 2 |
| 34 | 2 | 4 | 2, 3, 6, 7 | 2 | 34 | reserved | reserved | reserved | 2 |
| 35 | 2 | 2 | 0, 2 | 1 | 35 | 2 | 5 | 0-4 | 2 |
| 36 | 2 | 2 | 0, 2 | 2 | 36 | 2 | 6 | 0-4, 6 | 2 |
| 37 | 2 | 3 | 0-2 | 2 | 37 | reserved | reserved | reserved | reserved |
| 38 | 2 | 4 | 0-3 | 2 | 38 | reserved | reserved | reserved | reserved |

TABLE 17-2

Example of a DMRS port combination type 2

| | One Codeword (≤4 layers) | | | | Two Codewords (>4 layers) | | | |
|---|---|---|---|---|---|---|---|---|
| Value | RMI (number of co-scheduled CDM groups) | UE rank | Ports | number of symbols | Value | RMI (number of co-scheduled CDM groups) | UE rank | Ports | number of symbols |
| 0 | 1 | 1 | 0 | 1 | 0 | 3 | 5 | 0-4 | 1 |
| 1 | 1 | 1 | 1 | 1 | 1 | 3 | 6 | 0-5 | 1 |
| 2 | 1 | 2 | 0, 1 | 1 | 2 | reserved | reserved | reserved | 1 |
| 3 | 2 | 1 | 0 | 1 | 3 | reserved | reserved | reserved | 1 |
| 4 | 2 | 1 | 1 | 1 | 4 | reserved | reserved | reserved | 1 |
| 5 | 2 | 1 | 2 | 1 | 5 | reserved | reserved | reserved | 1 |
| 6 | 2 | 1 | 3 | 1 | 6 | reserved | reserved | reserved | 1 |
| 7 | 2 | 2 | 0, 1 | 1 | 7 | reserved | reserved | reserved | 1 |
| 8 | 2 | 2 | 2, 3 | 1 | 8 | reserved | reserved | reserved | 1 |
| 9 | 2 | 3 | 0-2 | 1 | 9 | reserved | reserved | reserved | 1 |
| 10 | 2 | 4 | 0-3 | 1 | 10 | reserved | reserved | reserved | 1 |
| 11 | 3 | 1 | 0 | 1 | 11 | reserved | reserved | reserved | 1 |
| 12 | 3 | 1 | 1 | 1 | 12 | reserved | reserved | reserved | 1 |

TABLE 17-2-continued

Example of a DMRS port combination type 2

| | One Codeword (≤4 layers) | | | | Two Codewords (>4 layers) | | | |
|---|---|---|---|---|---|---|---|---|
| Value | RMI (number of co-scheduled CDM groups) | UE rank | Ports | number of symbols | Value | RMI (number of co-scheduled CDM groups) | UE rank | Ports | number of symbols |
| 13 | 3 | 1 | 2 | 1 | 13 | reserved | reserved | reserved | 1 |
| 14 | 3 | 1 | 3 | 1 | 14 | reserved | reserved | reserved | 1 |
| 15 | 3 | 1 | 4 | 1 | 15 | reserved | reserved | reserved | 1 |
| 16 | 3 | 1 | 5 | 1 | 16 | reserved | reserved | reserved | 1 |
| 17 | 3 | 2 | 0, 1 | 1 | 17 | reserved | reserved | reserved | 1 |
| 18 | 3 | 2 | 2, 3 | 1 | 18 | reserved | reserved | reserved | 1 |
| 19 | 3 | 2 | 4, 5 | 1 | 19 | reserved | reserved | reserved | 1 |
| 20 | 3 | 3 | 0-2 | 1 | 20 | reserved | reserved | reserved | 1 |
| 21 | 3 | 3 | 3-5 | 1 | 21 | reserved | reserved | reserved | 1 |
| 22 | 3 | 4 | 0-3 | 1 | 22 | reserved | reserved | reserved | 1 |
| 23 | 1 | 1 | 0 | 2 | 23 | 2 | 5 | 0-2, 6, 7 | 2 |
| 24 | 1 | 1 | 1 | 2 | 24 | 2 | 6 | 0-3, 6, 7 | 2 |
| 25 | 1 | 1 | 6 | 2 | 25 | 2 | 7 | 0-3, 6-8 | 2 |
| 26 | 1 | 1 | 7 | 2 | 26 | 2 | 8 | 0-4, 6-9 | 2 |
| 27 | 1 | 2 | 0, 1 | 2 | 27 | reserved | reserved | reserved | 2 |
| 28 | 1 | 2 | 6, 7 | 2 | 28 | reserved | reserved | reserved | 2 |
| 29 | 1 | 3 | 0, 1, 6 | 2 | 29 | reserved | reserved | reserved | 2 |
| 30 | 1 | 4 | 0, 1, 6, 7 | 2 | 30 | reserved | reserved | reserved | 2 |
| 31 | 2 | 1 | 0 | 2 | 31 | reserved | reserved | reserved | 2 |
| 32 | 2 | 1 | 1 | 2 | 32 | reserved | reserved | reserved | 2 |
| 33 | 2 | 1 | 2 | 2 | 33 | reserved | reserved | reserved | 2 |
| 34 | 2 | 1 | 3 | 2 | 34 | reserved | reserved | reserved | 2 |
| 35 | 2 | 1 | 6 | 2 | 35 | reserved | reserved | reserved | 2 |
| 36 | 2 | 1 | 7 | 2 | 36 | reserved | reserved | reserved | 2 |
| 37 | 2 | 1 | 8 | 2 | 37 | reserved | reserved | reserved | 2 |
| 38 | 2 | 1 | 9 | 2 | 38 | reserved | reserved | reserved | 2 |
| 39 | 2 | 2 | 0, 1 | 2 | 39 | reserved | reserved | reserved | 2 |
| 40 | 2 | 2 | 2, 3 | 2 | 40 | reserved | reserved | reserved | 2 |
| 41 | 2 | 2 | 6, 7 | 2 | 41 | reserved | reserved | reserved | 2 |
| 42 | 2 | 2 | 8, 9 | 2 | 42 | reserved | reserved | reserved | 2 |
| 43 | 2 | 3 | 0, 1, 6 | 2 | 43 | reserved | reserved | reserved | 2 |
| 44 | 2 | 3 | 2, 3, 8 | 2 | 44 | reserved | reserved | reserved | 2 |
| 45 | 2 | 4 | 0, 1, 6, 7 | 2 | 45 | reserved | reserved | reserved | 2 |
| 46 | 2 | 4 | 2, 3, 8, 9 | 2 | 46 | reserved | reserved | reserved | 2 |
| 47 | 3 | 1 | 0 | 2 | 47 | reserved | reserved | reserved | 2 |
| 48 | 3 | 1 | 1 | 2 | 48 | reserved | reserved | reserved | 2 |
| 49 | 3 | 1 | 2 | 2 | 49 | reserved | reserved | reserved | 2 |
| 50 | 3 | 1 | 3 | 2 | 50 | reserved | reserved | reserved | 2 |
| 51 | 3 | 1 | 4 | 2 | 51 | reserved | reserved | reserved | 2 |
| 52 | 3 | 1 | 5 | 2 | 52 | reserved | reserved | reserved | 2 |
| 53 | 3 | 1 | 6 | 2 | 53 | reserved | reserved | reserved | 2 |
| 54 | 3 | 1 | 7 | 2 | 54 | reserved | reserved | reserved | 2 |
| 55 | 3 | 1 | 8 | 2 | 55 | reserved | reserved | reserved | 2 |
| 56 | 3 | 1 | 9 | 2 | 56 | reserved | reserved | reserved | 2 |
| 57 | 3 | 1 | 10 | 2 | 57 | reserved | reserved | reserved | 2 |
| 58 | 3 | 1 | 11 | 2 | 58 | reserved | reserved | reserved | 2 |
| 59 | 3 | 2 | 0, 1 | 2 | 59 | reserved | reserved | reserved | 2 |
| 60 | 3 | 2 | 2, 3 | 2 | 60 | reserved | reserved | reserved | 2 |
| 61 | 3 | 2 | 4, 5 | 2 | 61 | reserved | reserved | reserved | 2 |
| 62 | 3 | 2 | 6, 7 | 2 | 62 | reserved | reserved | reserved | 2 |
| 63 | 3 | 2 | 8, 9 | 2 | 63 | reserved | reserved | reserved | 2 |
| 64 | 3 | 2 | 10, 11 | 2 | 64 | reserved | reserved | reserved | 2 |
| 65 | 3 | 3 | 0, 1, 6 | 2 | 65 | reserved | reserved | reserved | 2 |
| 66 | 3 | 3 | 2, 3, 8 | 2 | 66 | reserved | reserved | reserved | 2 |
| 67 | 3 | 3 | 4, 5, 10 | 2 | 67 | reserved | reserved | reserved | 2 |
| 68 | 3 | 4 | 0, 1, 6, 7 | 2 | 68 | reserved | reserved | reserved | 2 |
| 69 | 3 | 4 | 2, 3, 8, 9 | 2 | 69 | reserved | reserved | reserved | 2 |
| 70 | 3 | 4 | 4, 5, 10, 11 | 2 | 70 | reserved | reserved | reserved | 2 |
| 71 | 2 | 2 | 0, 2 | 1 | 71 | 3 | 5 | 0-4 | 2 |
| 72 | 3 | 3 | 0, 2, 4 | 1 | 72 | 2 | 5 | 0-3, 6 | 2 |
| 73 | 3 | 4 | 0-2, 4 | 1 | 73 | 3 | 6 | 0-5 | 2 |
| 74 | 2 | 2 | 0, 2 | 2 | 74 | 3 | 6 | 0-3, 6, 8 | 2 |
| 75 | 3 | 3 | 0, 2, 4 | 2 | 75 | 3 | 7 | 0-6 | 2 |
| 76 | 2 | 4 | 0, 1, 2, 3 | 2 | 76 | 3 | 8 | 0-6, 8 | 2 |
| 77 | 3 | 4 | 0, 1, 2, 4 | 2 | 77 | 3 | 8 | 0-7 | 2 |
| 78 | 3 | 3 | 2, 3, 7 | 2 | 78 | reserved | reserved | reserved | reserved |
| 79 | 3 | 3 | 8, 9, 4 | 2 | 79 | reserved | reserved | reserved | reserved |

TABLE 17-2-continued

Example of a DMRS port combination type 2

| | One Codeword (≤4 layers) | | | | | Two Codewords (>4 layers) | | | |
|---|---|---|---|---|---|---|---|---|---|
| Value | RMI (number of co-scheduled CDM groups) | UE rank | Ports | number of symbols | Value | RMI (number of co-scheduled CDM groups) | UE rank | Ports | number of symbols |
| 80 | 3 | 3 | 10, 11, 5 | 2 | 80 | reserved | reserved | reserved | reserved |
| 81 | 3 | 3 | 7, 9, 11 | 2 | 81 | reserved | reserved | reserved | reserved |

TABLE 17-3

Example of a DMRS port combination type 1

| Value | RMI (number of co-scheduled CDM groups) | UE rank | Ports | number of symbols |
|---|---|---|---|---|
| 0 | 1 | 1 | 0 | 1 |
| 1 | 1 | 1 | 1 | 1 |
| 2 | 1 | 2 | 0, 1 (SU) | 1 |
| 3 | 2 | 1 | 0 | 1 |
| 4 | 2 | 1 | 1 | 1 |
| 5 | 2 | 1 | 2 | 1 |
| 6 | 2 | 1 | 3 | 1 |
| 7 | 2 | 2 | 0, 1 | 1 |
| 8 | 2 | 2 | 2, 3 | 1 |
| 9 | 2 | 3 | 0-2 (SU) | 1 |
| 10 | 2 | 4 | 0-3 (SU) | 1 |
| 11 | 2 | 2 | 0, 2 (SU) | 1 |
| 12 | 1 | 1 | 0 | 2 |
| 13 | 1 | 1 | 1 | 2 |
| 14 | 1 | 1 | 4 | 2 |
| 15 | 1 | 1 | 5 | 2 |
| 16 | 1 | 2 | 0, 1 (SU/MU) | 2 |
| 17 | 1 | 2 | 4-5 | 2 |
| 18 | 1 | 3 | 0, 1, 4 (SU/MU) | 2 |
| 19 | 1 | 4 | 0, 1, 4, 5 (SU) | 2 |
| 20 | 2 | 1 | 0 | 2 |
| 21 | 2 | 1 | 1 | 2 |
| 22 | 2 | 1 | 2 | 2 |
| 23 | 2 | 1 | 3 | 2 |
| 24 | 2 | 1 | 4 | 2 |
| 25 | 2 | 1 | 5 | 2 |
| 26 | 2 | 1 | 6 | 2 |
| 27 | 2 | 1 | 7 | 2 |
| 28 | 2 | 2 | 0, 1 | 2 |
| 29 | 2 | 2 | 2, 3 | 2 |
| 30 | 2 | 2 | 4, 5 | 2 |
| 31 | 2 | 2 | 6, 7 | 2 |
| 32 | 2 | 3 | 0, 1, 4 | 2 |
| 33 | 2 | 3 | 2, 3, 6 | 2 |
| 34 | 2 | 4 | 0, 1, 4, 5 | 2 |
| 35 | 2 | 4 | 2, 3, 6, 7 | 2 |
| 36 | 2 | 5 | 0-2, 4, 5 (SU) | 2 |
| 37 | 2 | 6 | 0-5 (SU) | 2 |
| 38 | 2 | 7 | 0-6 | 2 |
| 39 | 2 | 8 | 0-7 | 2 |
| 40 | 2 | 5 | 0-4 (SU) | 2 |
| 41 | 2 | 6 | 0-4, 6 (SU) | 2 |
| 42 | 2 | 2 | 0, 2 (SU) | 2 |
| 43 | 2 | 3 | 0-2 (SU) | 2 |
| 44 | 2 | 4 | 0-3 (SU) | 2 |

TABLE 17-4

Example of a DMRS port combination type 2

| Value | RMI (number of co-scheduled CDM groups) | UE rank | Ports | number of symbols |
|---|---|---|---|---|
| 0 | 1 | 1 | 0 | 1 |
| 1 | 1 | 1 | 1 | 1 |
| 2 | 1 | 2 | 0, 1 (SU) | 1 |
| 3 | 2 | 1 | 0 | 1 |
| 4 | 2 | 1 | 1 | 1 |
| 5 | 2 | 1 | 2 | 1 |
| 6 | 2 | 1 | 3 | 1 |
| 7 | 2 | 2 | 0, 1 | 1 |
| 8 | 2 | 2 | 2, 3 | 1 |
| 9 | 2 | 3 | 0-2 (SU/MU) | 1 |
| 10 | 2 | 4 | 0-3 (SU) | 1 |
| 11 | 3 | 1 | 0 | 1 |
| 12 | 3 | 1 | 1 | 1 |
| 13 | 3 | 1 | 2 | 1 |
| 14 | 3 | 1 | 3 | 1 |
| 15 | 3 | 1 | 4 | 1 |
| 16 | 3 | 1 | 5 | 1 |
| 17 | 3 | 2 | 0, 1 | 1 |
| 18 | 3 | 2 | 2, 3 | 1 |
| 19 | 3 | 2 | 4, 5 | 1 |
| 20 | 3 | 3 | 0-2 | 1 |
| 21 | 3 | 3 | 3-5 | 1 |
| 22 | 3 | 4 | 0-3 | 1 |
| 23 | 3 | 5 | 0-4 | 1 |
| 24 | 3 | 6 | 0-5 | 1 |
| 25 | 2 | 2 | 0, 2 (SU) | 1 |
| 26 | 3 | 3 | 0, 2, 4 (SU) | 1 |
| 27 | 3 | 4 | 0-2, 4 (SU) | 1 |
| 28 | 1 | 1 | 0 | 2 |
| 29 | 1 | 1 | 1 | 2 |
| 30 | 1 | 1 | 6 | 2 |
| 31 | 1 | 1 | 7 | 2 |
| 32 | 1 | 2 | 0, 1 (SU/MU) | 2 |
| 33 | 1 | 2 | 6, 7 | 2 |
| 34 | 1 | 3 | 0, 1, 6 | 2 |
| 35 | 1 | 4 | 0, 1, 6, 7 (SU) | 2 |
| 36 | 2 | 1 | 0 | 2 |
| 37 | 2 | 1 | 1 | 2 |
| 38 | 2 | 1 | 2 | 2 |
| 39 | 2 | 1 | 3 | 2 |
| 40 | 2 | 1 | 6 | 2 |
| 41 | 2 | 1 | 7 | 2 |
| 42 | 2 | 1 | 8 | 2 |
| 43 | 2 | 1 | 9 | 2 |
| 44 | 2 | 2 | 0, 1 | 2 |
| 45 | 2 | 2 | 2, 3 | 2 |
| 46 | 2 | 2 | 6, 7 | 2 |
| 47 | 2 | 2 | 8, 9 | 2 |
| 48 | 2 | 3 | 0, 1, 6 | 2 |
| 49 | 2 | 3 | 2, 3, 8 | 2 |
| 50 | 2 | 4 | 0, 1, 6, 7 | 2 |
| 51 | 2 | 4 | 2, 3, 8, 9 | 2 |
| 52 | 3 | 1 | 0 | 2 |
| 53 | 3 | 1 | 1 | 2 |
| 54 | 3 | 1 | 2 | 2 |
| 55 | 3 | 1 | 3 | 2 |

TABLE 17-4-continued

Example of a DMRS port combination type 2

| Value | RMI (number of co-scheduled CDM groups) | UE rank | Ports | number of symbols |
|---|---|---|---|---|
| 56 | 3 | 1 | 4 | 2 |
| 57 | 3 | 1 | 5 | 2 |
| 58 | 3 | 1 | 6 | 2 |
| 59 | 3 | 1 | 7 | 2 |
| 60 | 3 | 1 | 8 | 2 |
| 61 | 3 | 1 | 9 | 2 |
| 62 | 3 | 1 | 10 | 2 |
| 63 | 3 | 1 | 11 | 2 |
| 64 | 3 | 2 | 0, 1 | 2 |
| 65 | 3 | 2 | 2, 3 | 2 |
| 66 | 3 | 2 | 4, 5 | 2 |
| 67 | 3 | 2 | 6, 7 | 2 |
| 68 | 3 | 2 | 8, 9 | 2 |
| 69 | 3 | 2 | 10, 11 | 2 |
| 70 | 3 | 3 | 0, 1, 6 | 2 |
| 71 | 3 | 3 | 2, 3, 8 | 2 |
| 72 | 3 | 3 | 4, 5, 10 | 2 |
| 73 | 3 | 4 | 0, 1, 6, 7 | 2 |
| 74 | 3 | 4 | 2, 3, 8, 9 | 2 |
| 75 | 3 | 4 | 4, 5, 10, 11 | 2 |
| 76 | 2 | 5 | 0-2, 6, 7 (SU) | 2 |
| 77 | 2 | 6 | 0-3, 6, 7 (SU) | 2 |
| 78 | 2 | 7 | 0-3, 6-8 (SU) | 2 |
| 79 | 2 | 8 | 0-4, 6-9 (SU) | 2 |
| 80 | 3 | 5 | 0-4 (SU) | 2 |
| 81 | 2 | 5 | 0-3, 6 (SU) | 2 |
| 82 | 3 | 6 | 0-5 (SU) | 2 |
| 83 | 3 | 6 | 0-3, 6, 8 (SU) | 2 |
| 84 | 3 | 7 | 0-6 (SU) | 2 |
| 85 | 3 | 8 | 0-6, 8 (SU) | 2 |
| 86 | 3 | 8 | 0-7 (SU) | 2 |
| 87 | 2 | 2 | 0, 2 (SU) | 2 |
| 88 | 3 | 3 | 0, 2, 4 (SU) | 2 |
| 89 | 2 | 4 | 0, 1, 2, 3 (SU) | 2 |
| 90 | 3 | 4 | 0, 1, 2, 4 (SU) | 2 |
| 91 | 3 | 3 | 2, 3, 7 (MU) | 2 |
| 92 | 3 | 3 | 8, 9, 4 (MU) | 2 |
| 93 | 3 | 3 | 10, 11, 5 (MU) | 2 |
| 94 | 3 | 3 | 7, 9, 11 (MU) | 2 |

In LTE, in a case of MU-MIMO, a maximum of four orthogonal ports are supported. These ports use a same RE resource. A benefit of such a design is that a DMRS rate matching (RM) problem can be effectively avoided in the case of MU-MIMO. Simply, rate matching means that the terminal needs to know REs on which no data transmission is performed on a time-frequency resource of the terminal, to keep off these REs during data demodulation and correctly decode data. For example, during downlink transmission, some REs on the time-frequency resource of the terminal may be occupied by a control channel or an RS. If the base station does not notify the terminal of information about locations of the REs, the terminal uses REs or control information on the locations as data and performs demodulation, leading to a decoding error.

In a single-user multiple-input multiple-output (SU-MIMO) scenario, the base station communicates with only one terminal, and transmits only information (an RS, control signaling, data, or the like) of the terminal on a time-frequency resource. In this case, the terminal can directly learn of locations of DMRS REs of the terminal based on the information of the terminal (for example, a port, a quantity of layers, or the like of the terminal), and avoid the REs during data decoding. Therefore, there is no DMRS rate matching problem in the SU scenario.

In a multi-user multiple-input multiple-output (MU-MIMO), the base station communicates with a plurality of terminals, orthogonality between terminals is ensured by using an orthogonal DMRS port, and orthogonality between ports may be ensured through time division multiplexing (TDM), frequency division multiplexing (FDM), or code division multiplexing (CDM). When TDM and FDM are used, orthogonal DMRS ports occupy different time-frequency resources. In this case, data of other DMRS ports cannot be transmitted on REs occupied by the DMRS ports. For example, a port 1 and a port 2 are orthogonal through FDM or TDM, and the port 1 occupies an RE 1. In this case, the base station does not transmit data of the port 2 on the RE 1, to prevent the data of the port 2 from causing noise interference to a DMRS of the port 1 and avoid affecting channel estimation precision. However, when the port 1 and port 2 are orthogonal through CDM, the foregoing problem does not exist. This is because although the DMRS of the port 1 and a DMRS of port 2 occupy a same RE, the two ports performs multiplexing in a code division multiplexing mode, thereby ensuring orthogonality between the DMRSs of the two ports.

During MU-MIMO, the terminal needs to know port information of another terminal that is co-scheduled, to learn of RE locations that are occupied by DMRSs on ports used by the another terminal and at which no data of the terminal is transmitted. If the terminal cannot learn of the information, the terminal uses a DMRS from another user as the data of the terminal for decoding, leading to a decoding error.

In LTE, a rate matching problem in MU-MIMO is resolved by ensuring that DMRSs of scheduled ports are multiplexed through CDM. In this case, DMRSs of all terminals are multiplexed on a same RE through CDM, thereby avoiding a DMRS rate matching problem. Such a design may be referred to as MU-MIMO transparent to a terminal. However, as described above, in LTE, to ensure this transparent design, MU-MIMO can support only a maximum of four orthogonal ports.

In an NR system, for example, 5G, to fully take the advantage of MU-MIMO, a design in which MU-MIMO supports a maximum of 12 orthogonal ports has been used in a standard. Considering that a DMRS pattern in an existing standard can support CDM multiplexing of only a maximum of four ports, the transparent solution in LTE is no longer applicable.

Figure 20:
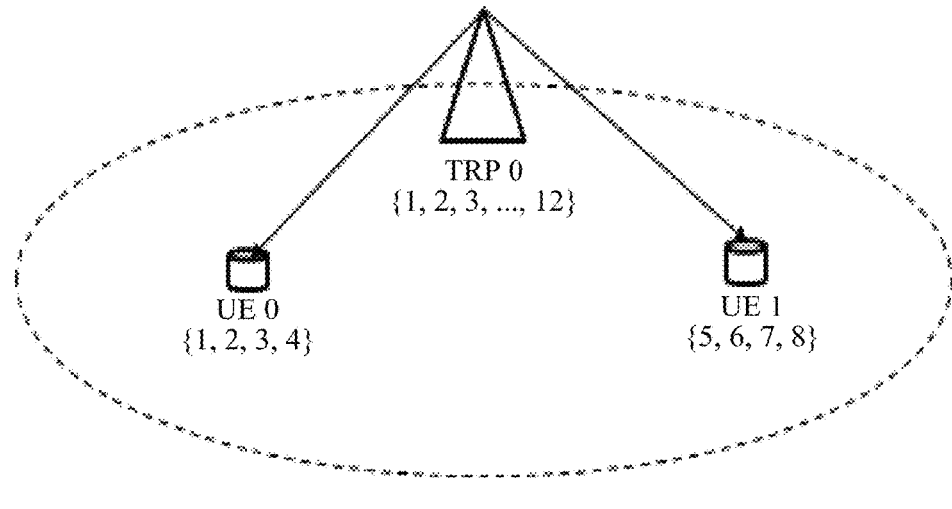
FIG. 20 is a schematic diagram of an MU-MIMO scenario in an LTE system.

Therefore, such a new MU-MIMO DMRS rate matching design is very important, and DMRS rate matching can be resolved in the following manners:

In a first manner, no data is transmitted in all subcarriers on a location of a resource unit, for example, a symbol, corresponding to a DMRS. Such a solution does not require a signaling indication, but causes a relatively great waste of spectrum resources. For example, in FIG. 20, UE 0 uses a port 1 to a port 4, UE 1 uses a port 5 to a port 8, and no data is transmitted on REs corresponding to locations of a port 9 to a port 12. This causes a great resource waste.

In a second manner, UE is directly notified of a port sequence number of another UE. When the another UE occupies relatively more ports, relatively high signaling overheads are caused. For example, when UE 0 uses ports 1 and 2, and UE 1 uses a port 5 to a port 8, the UE 0 needs to be notified of the ports 5 to 8 used by the UE 1, and the UE 1 needs to be notified of the ports 1 and 2 used by the UE 0. This manner requires particularly high signaling overheads.

Figure 34:
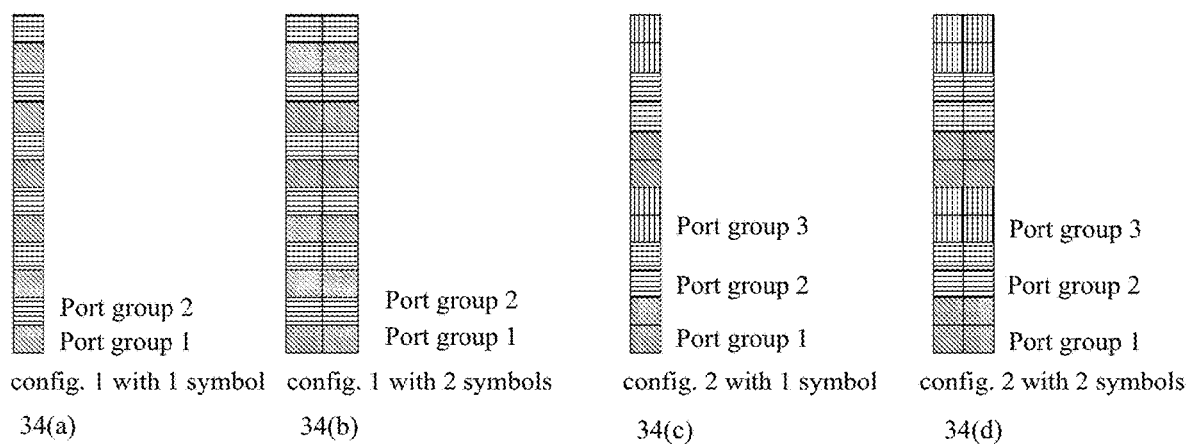
FIG. 34 is another schematic diagram of a correspondence between indication information and a pattern in a DMRS indicating and receiving method according to an embodiment of this application.

Specifically, a I/O bit map is required to indicate an absolute location of a DMRS port. For example, each DMRS port group in FIG. 34 is separately indicated by using one bit, for six port groups included in FIG. 20, six bits need to be used to indicate an actual sending layer quantity, and a port allocation rule is used for constraint, for example, to directly indicate a quantity of layers scheduled by a current base station. For FIG. 20, there is a possibility that one layer to 12 layers need to be separately indicated, and four bits are required for indication.

To implement more effective data transmission, this application provides a rate matching indication solution corresponding to a maximum supported port quantity, a DMRS pattern or a CDM port group quantity in the pattern, or a DMRS configuration type, to match a 5G DMRS transmission requirement.

The following describes a DMRS rate matching indicating and receiving method provided in this application.

Figure 21:
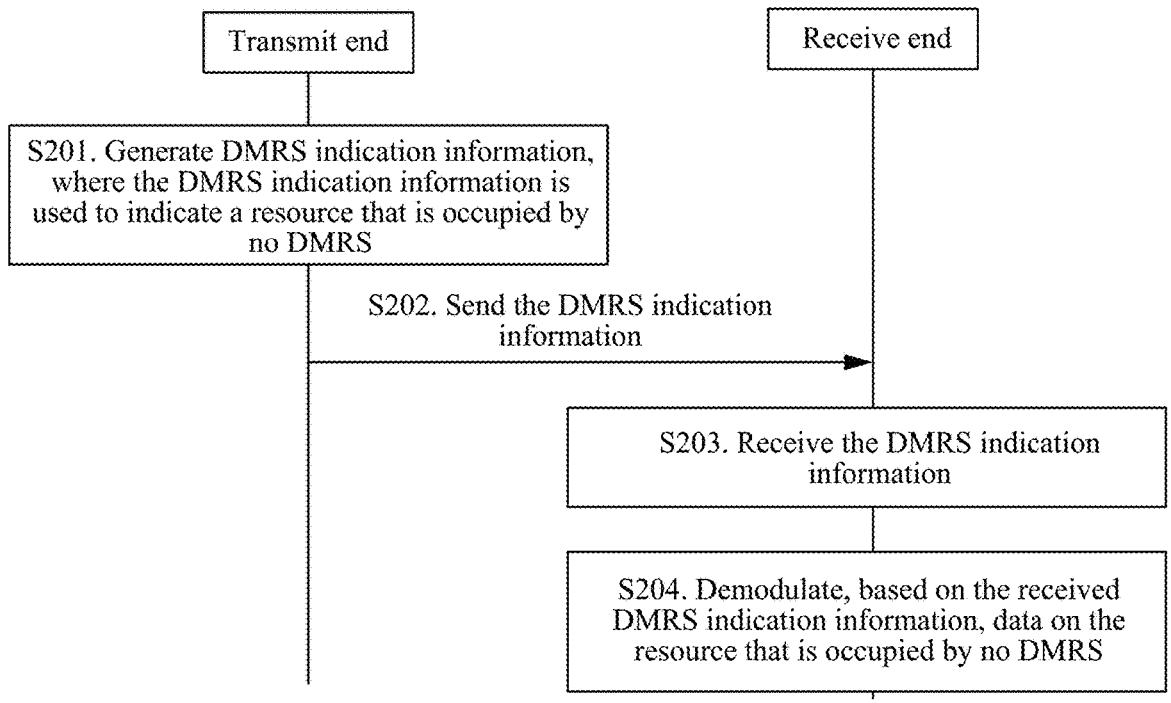
FIG. 21 is another schematic interaction flowchart of a DMRS indicating and receiving method according to an embodiment of this application.

FIG. 21 shows a demodulation reference signal rate matching indicating and receiving method provided in this application. The method may include the following steps.

S201. A transmit end generates demodulation reference signal (DMRS) indication information, where the DMRS indication information is used to indicate a resource that is not occupied by DMRS and that is in resources available for carrying a DMRS.

The DMRS indication information indicates a current quantized quantity of orthogonal transmission layers, a combination of currently used port group states, an orthogonal-transmission-layer quantity or a port group state that is not currently used by a receive end, or a resource unit that needs to be muted, to indicate the resource that is not occupied by DMRS and that is in the resources available for carrying a DMRS.

In an implementation, before the transmit end sends the DMRS indication information, the method further includes: sending DMRS transmission scheme indication information, to indicate the current DMRS transmission scheme, where different DMRS transmission schemes correspond to different maximum supported orthogonal-port quantities, or correspond to different DMRS patterns or different DMRS configuration types.

Specifically, different maximum supported port quantities, or DMRS patterns (or CDM port group quantities in DMRS patterns), or DMRS configuration types are indicated by using different DMRS indication information. For example, in an MU-MIMO scenario in which maximum supported orthogonal-port quantities are 4, 6, 8, and 12, or maximum supported non-orthogonal-port quantities are 8, 12, 16, and 24 respectively, all of these maximum supported port quantities having corresponding DMRS rate matching information, and at least two of these DMRS rate matching states are different.

The DMRS indication information is used to inform the receive end of a rate matching status, in other words, on a time-frequency resource, which resource units have not been occupied by DMRSs of other receive ends but are used for data transmission. The receive end may correctly decode data on these resource units during data demodulation.

In another implementation, the DMRS indication information is configured for different DMRS patterns or a quantity of DMRS port groups included in a DMRS pattern (for example, there may be two tables respectively corresponding to DMRS patterns that include two or three DMRS port groups). Usually, one DMRS pattern corresponds to one MU-MIMO scenario supporting a maximum supported orthogonal-port quantity. The DMRS pattern shows a quantity of orthogonal CDM port groups supported by the MU-MIMO scenario and a quantity of resource units included in each port group. Therefore, different indication information is configured for different DMRS patterns. Alternatively, the receive end may indication, on a time-frequency resource, which resource units have not been used for DMRS transmission, but are used for data transmission. The receive end may correctly decode data.

In still another implementation, the DMRS indication information may be further configured for a DMRS configuration type.

During specific implementation, for ease of description in this embodiment of this application, the DMRS indication information may be represented by using a value. During specific implementation, the DMRS indication information may be N bits, where N is related to a quantity M (CS/OCC/CS+OCC) of DMRS port groups included in a DMRS pattern. For different patterns or DMRS configuration types (type), values of N may be different. For example, for a DMRS configuration type 1 including two DMRS port groups (M=2), N may be 1 or 2; and for a DMRS configuration type 2 including three DMRS port groups (M=3), N may be 2 or 3.

As shown in the following Table 18, this is an example of the DMRS indication information. The DMRS indication information in this embodiment is mainly used for rate matching, and therefore, is represented as rate matching indication information. A specific form is not limited to the following forms, and may be a table, a digit, or a formula. The DMRS indication information has P states, where a value of P may be represented by using N bits (all signaling states), or more than N bits (increasing system scheduling flexibility or satisfying other design requirement), or less than N bits (quantizing to reduce signaling overheads). $M\_p$ is rate matching information (RMI) or a parameter set including DMRS rate matching information. The terminal may complete DMRS-related rate matching according to an indication of Mp. The rate matching information is represented by RMI in subsequent descriptions and drawings only for ease of description, and no limit is imposed on a meaning thereof. During specific implementation, the rate matching information may be indicated by using a quantized value of a quantity of orthogonal transmission layers, or may be indicated by using the foregoing methods such as using the port number or using the CDM group.

TABLE 18

| DMRS indication information (also referred to as rate matching indication information) (value) | Rate matching information, RMI |
|---|---|
| 0 | M_0 |
| ... | ... |
| P | M_P |

The rate matching indication information is related to the rate matching information. When the rate matching information may be represented by using a specific quantity of orthogonal transmission layers, the DMRS indication information is determined in the DMRS configuration information. The DMRS configuration information further includes indication information of a total quantity of orthogonal ports, and the indication information for the total quantity of orthogonal ports may indicate a quantity of all orthogonal ports that are possibly actually presented or a quantized value of a quantity of all orthogonal ports that are possibly actually presented. The quantized value of the quantity of all the orthogonal ports is information about a quantity of orthogonal DMRS layers, indication information of an orthogonal DMRS antenna port set, CDM group information of an orthogonal DMRS antenna port, or information generated based on a CDM group size.

During specific implementation, the quantized value of the quantity of orthogonal transmission layers may be about a quantity of DMRS layers, DMRS antenna port set information, or DMRS antenna port CDM group information. In the information about the quantity of DMRS layers, the quantity of DMRS layers may be an integer multiple of a quantity of DMRS antenna ports in a CDM group. For example, for a DMRS pattern including two DMRS antenna port groups, assuming that a port group 1 is {1, 2, 3, 4}, and a port group 2 is {5, 6, 7, 8}, the port group 1 and the port group 2 may be quantized into four layers and eight layers. In addition, in the information about the quantity of DMRS layers, the quantity of DMRS layers may alternatively be an integer multiple of a quantity of DMRS antenna ports having consecutive sequence numbers in ascending order in a CDM group. For example, CDM groups {1, 2, 5, 7} and {3, 4, 6, 8} may be quantized into two layers and four layers. All of the information can enable the receive end to identify which resource units are used for DMRS transmission at the receive end and which resource units are used for DMRS transmission at other receive ends that implement CDM multiplexing. Remaining resource units are used for data transmission related to the receive end. Therefore, the receive end demodulates data on a corresponding resource unit.

It should be understood that, content of the rate matching information may vary with a port mapping order in a DMRS pattern, for example, may include but is not limited to:

1. A muted state or a used state of a DMRS port group: The rate matching information indicates a state of each DMRS port group, and the content of the RMI is unrelated to a port mapping order. There is no specific limit on a numbering sequence in a CDM group. For example, ports may be numbered in ascending order from a smallest sequence number of a port in a port group.

2. Current quantity of orthogonal transmission layers of a system that are quantized through grading It is assumed that a DMRS port number is $p=y+v$, where y is a port number offset, it can be ensured that p is a minimum DMRS port value defined in NR, and $v=1, 2, \ldots$, and is a current quantity of orthogonal transmission layers (eight ports in LTE) on a PDSCH. v is quantized through grading, to reduce DCI signaling overheads for rate matching. During specific implementation, v may be quantized upward or downward.

2.1. A total current quantity of layers of the system that is quantized upward through grading (where the content of the rate matching information is related to a mapping order): which may be equal to a quantity of continuous port numbers or a maximum port sequence number in each CDM group (assuming that y=0 and only when port numbers in each CDM group are continuous and in ascending order or descending order). For example, when a mapping order of {1, 2, 3, 4}, {5, 6, 7, 8}, and {9, 10, 11, 12} changes, for a same DMRS pattern, the content of the RMI changes.

2.2. A total current quantity of orthogonal transmission layers of the system is quantized downward through grading: In this manner, the content of the rate matching information is unrelated to a mapping order in a DMRS pattern, and the content may be equal to a smallest port number in continuous port numbers in a CDM group, or may be a quantized value of a port number numbered from 1 (assuming that y=0, and ports are numbered from 1).

2.3. A quantity of continuous DMRS numbers when port numbers in a DMRS group are sorted in ascending order: For example, two DMRS port groups {1, 2, 5, 6} and {3, 4, 7, 8} may be quantized into two layers and four layers.

It should be noted that, a reason for using a quantized value of a quantity of orthogonal DMRS transmission layers is that, for example, if specific orthogonal-transmission-layer quantities {1, 2, 3, 4} need to be indicated, two bits are needed for indication. When the orthogonal-transmission-layer quantities {1, 2, 3, 4} are quantized into a value, for example, quantized upward into an orthogonal-transmission-layer quantity 4, or quantized downward into an orthogonal-transmission-layer quantity 1, or when the orthogonal-transmission-layer quantities {1, 2, 3, 4} are represented by 2 or 3, only one bit is required to indicate the quantized value of the quantity of orthogonal transmission layers. For example, 0 is used to represent a quantized value 4 of the orthogonal-transmission-layer quantity. Therefore, indication overheads can be reduced.

2.4. The DMRS group state information, the DMRS group sequence number or group number, or the DMRS group quantity: The number of CDM groups is a quantity of CDM groups occupied/scheduled (co-scheduled) in the system.

S202. The transmit end sends the DMRS indication information on a time-frequency resource.

During specific implementation, in this embodiment of this application, the DMRS indication information may be used to indicate different maximum supported port quantities or rate matching manners corresponding to different DMRS patterns. One manner is implicit indication, and another manner is indication by using explicit signaling.

In the implicit indication solution, the quantized value of the quantity of orthogonal transmission layers is configured in a DMRS configuration information table, and the indication information is indicated by using DMRS indication information (a value) in the DMRS configuration information table. The DMRS configuration information table may be similar to that in LTE. For example, the DMRS indication information is a quantity of antenna ports, a scrambling identification, and an indication of a quantity of orthogonal transmission layers (number of layers indication) in LTE. The DMRS configuration information table may further include at least one of a DMRS port quantity, a port index, sequence generation information, and a CDM type. Based on this, the quantized value of the quantity of orthogonal transmission layers is added. The DMRS configuration information table may be stored at both the transmit end and the receive end. The transmit end sends the indication information to the receive end. It should be understood that, the transmit end sends original DCI signaling in LTE (because the signaling in LTE is used, the DCI signaling may not be named as indication information, but may indicate a rate matching solution) to the receive end. The receive end obtains, by using the signaling, port information of the receive end and a total quantized quantity of transmission layers in a system, and calculates, with reference to the two pieces of information, a port used by another receive end. In other words, the receive end identifies which resource units are used for DMRS transmission at the receive end and which resource units are used for DMRS transmission at other receive ends that implement CDM multiplexing. Remaining resource units are used for data transmission related to the receive end. Therefore, the receive end demodulates data on a corresponding resource unit.

In the explicit signaling indication solution, a correspondence between the DMRS indication information and the rate matching information exists independently of a DMRS configuration information table in LTE. In other words, the correspondence between the DMRS indication information and the rate matching information is not implied in the DMRS configuration information table. Therefore, in addition to the DMRS configuration information table, the transmit end and the receive end further separately store a correspondence configuration table between the DMRS indication information and the rate matching information (or the information table may be configured through RRC). The correspondence configuration table exists independently of the DMRS configuration information table. The transmit end sends rate configuration indication information to the receive end by using implicit signaling. The receive end uses the DMRS indication information as an index, and searches the correspondence configuration table for corresponding rate matching information. The receive end combines the rate matching information with the DMRS configuration information table, to identify which resource units are occupied by the DMRS of the receive end, and which resource units are occupied by DMRSs of other receive ends that implement CDM multiplexing. Remaining resource units are used for data transmission related to the receive end. Therefore, the receive end demodulates data on a corresponding resource unit.

It should be noted that DMRS indication information having a same value may correspond to quantized values of different quantities of orthogonal transmission layers. Therefore, the correspondence between the DMRS indication information and the quantized value of the quantity of orthogonal transmission layers may alternatively be indicated through separate signaling. It should be understood that, in the explicit indication solution, the quantized quantity of orthogonal transmission layers is indicated by using the DMRS indication information. The receive end receives two pieces of signaling, where one piece of signaling is DMRS DCI signaling in LTE, and the other piece of signaling is signaling (which may also be referred to as rate matching signaling in this specification) used to transmit DMRS indication information of a current quantized quantity of orthogonal transmission layers or including DMRS indication information.

It may be understood that, regardless of the implicit indication solution or the explicit indication solution, the DMRS indication information may be sent to the receive end as independent signaling or may be carried in downlink signaling for sending. This is not limited herein.

The foregoing signaling for sending the DMRS indication information and indicating the correspondence between the DMRS indication information and the quantized value of the quantity of orthogonal transmission layers may be radio resource control (RRC) signaling, a media access control control element (MAC CE) or DCI signaling, or a combination of any two or more of the three pieces of signaling.

In an implementation, whether to send the DMRS indication information by using the signaling is determined based on a quantity of codewords. For example, in a case of one codeword, signaling is triggered to send the DMRS indication information, but in a case of two codewords, the signaling is not sent. This is because in an SU-MIMO scenario corresponding to the two codewords, when the transmit end, for example, a base station, communicates with only one receive end (a terminal), only information (RS, control signaling, data, or the like) of the terminal is transmitted on a time-frequency resource. In this case, the terminal can directly learn of locations of DMRS REs of the terminal based on the information of the terminal (for example, a port, a quantity of layers, or the like of the terminal), and avoid the REs during data decoding. Therefore, there is no DMRS rate matching problem in the SU scenario.

S203. A receive end receives the DMRS indication information.

S204. Obtain rate matching information based on the DMRS indication information, and demodulate data on a resource on which no DMRS is transmitted.

During specific implementation, if the implicit indication manner is used, after receiving the DMRS indication information, the receive end uses a value of the DMRS indication information as an index, to search the DMRS configuration information table for information such as the quantized value of the corresponding quantity of orthogonal transmission layers (further, to learn of information about the quantity of DMRS layers, the DMRS antenna port set information, the DMRS antenna port code division multiplexing CDM group information, or the like), a quantity of layers used by the receive end, and the DMRS port number. Then, the receive end identifies which resource units are used for DMRS transmission at the receive end and which resource units are used for DMRS transmission at other receive ends that implement CDM multiplexing. Remaining resource units are used for data transmission related to the receive end. Therefore, the receive end demodulates data on a corresponding resource unit. If the explicit indication manner is used, in addition to the DMRS configuration information table, when the transmit end and the receive end further separately store the correspondence configuration table (or the correspondence configuration table may be configured through RRC), the receive end uses the indication information as an index, to search the correspondence configuration table for a corresponding rate matching state. The receive end combines the rate matching information with the DMRS configuration information table, to identify which resource units are used by the receive end for DMRS transmission, and which resource units are used by other receive ends for DMRS transmission (where optionally, in an implementation method, the information may be directly obtained by using the rate matching information). The remaining resource units are used for data transmission related to the receive end. Therefore, the receive end demodulates data on a corresponding resource unit.

The DMRS indicating and receiving method provided in this application may be further applied to a non-coherent joint transmission (NC-JT) 2-PDCCH scenario. Specifically, two transmit ends using non-quasi co-location QCL groups each transmit data after muting a resource unit corresponding to a DMRS that is not of the transmit end. It may be understood as that, the transmit ends mutually mute a DMRS port group of the peer party. During specific implementation, it may be that a TRP mutes, by default, an RE location corresponding to a DMRS in a QCL group of a peer TRP. For a DMRS pattern type 1, two DMRS port groups are included. In an NC-JT scenario, two DMRS port groups may be non-QCL, and ports in each of the DMRS port groups are QCL. In this case, two TRPs may separately use one port group. Therefore, this solution can directly resolve the problem without extra signaling indication. For a DMRS pattern type 2, three DMRS port groups are included. In this case, one TRP may use one DMRS port group, and the other TRP may use two DMRS port groups. Therefore, the TPR using the two DMRS port groups needs to perform indication by using indication information, and the TPR using the DMRS port group may perform indication by using no indication information.

In a 1-PDCCH scenario, an independent indication manner may alternatively be used. For a specific procedure, still refer to the steps shown in FIG. 21.

It should be noted that in step S201, a non-coherent joint transmission transmit end generates DMRS indication information, where the DMRS indication information is generated based on DMRS ports in a QCL group available for a plurality of coordinating TRPs.

In step S202, the transmit end sends the DMRS indication information to a receive end. In the 1-PDCCH scenario, the DMRS indication information indicates a resource unit corresponding to a DMRS available for a plurality of coordinating TRPs. In the 2-PDCCH scenario, the rate matching information indicates a resource unit corresponding to a DMRS used by the transmit end.

Operations performed after the receive end receives the DMRS indication information are the same as S203 and S204 in the foregoing embodiment, and details are not described herein again.

If the technical solution is applied to an uplink transmission scenario, the transmit end may be a terminal, and the receive end may be a network device, for example, a base station. If the technical solution is applied to a downlink transmission scenario, the transmit end may be a network device, for example, a base station, and the receive end may be a terminal.

According to the DMRS rate matching indicating method provided in this application, the DMRS indication information corresponds to the maximum supported port quantity, the DMRS pattern, or the DMRS configuration type, so as to match a plurality of scenarios in NR, for example, an NC-JT scenario, a dynamic TDD scenario, or a flexible duplex scenario. The foregoing method can be applied to complex and variable scenarios in NR, and can also satisfy a requirement for transmitting more layers of data and reduce indication overheads.

It may be understood that, the DMRS port herein is all DMRS ports supported by the system. During actual implementation, whether all or some of the DMRS ports are used in one scheduling process is not limited in this application.

The following describes a specific implementation process of the DMRS rate matching indicating method and the DMRS rate matching receiving method provided in this application.

Embodiment 5

Embodiment 5 mainly describes that explicit signaling is designed to indicate DMRS indication information.

Figure 22:
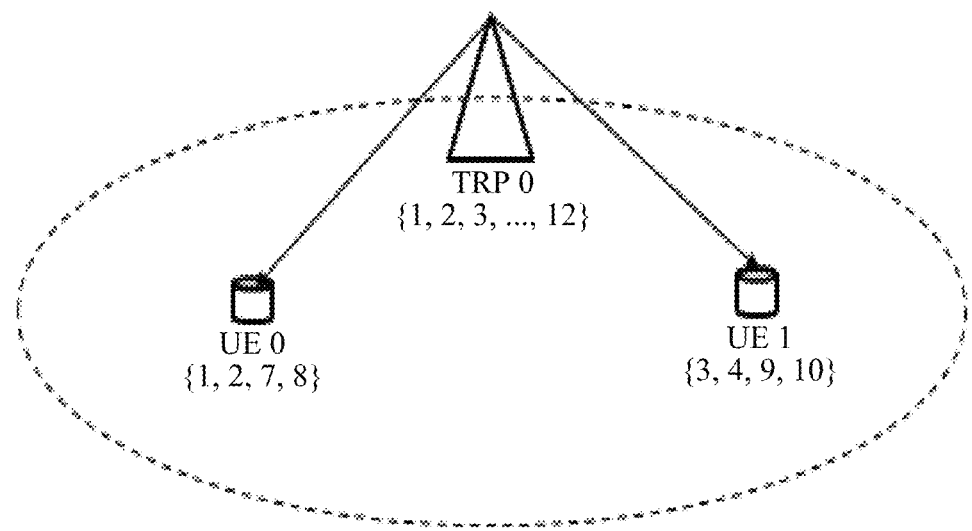
FIG. 22 is a schematic scenario diagram of a DMRS indicating and receiving method according to an embodiment of this application.

As shown in FIG. 22, a TRP 0 supports a maximum supported orthogonal-port quantity of 12, where ports allocated to a terminal 0 (UE 0) are ports 1, 2, 7, and 8, and ports allocated to a terminal 1 (UE 1) are ports 3, 4, 9, and 10.

Figure 23:
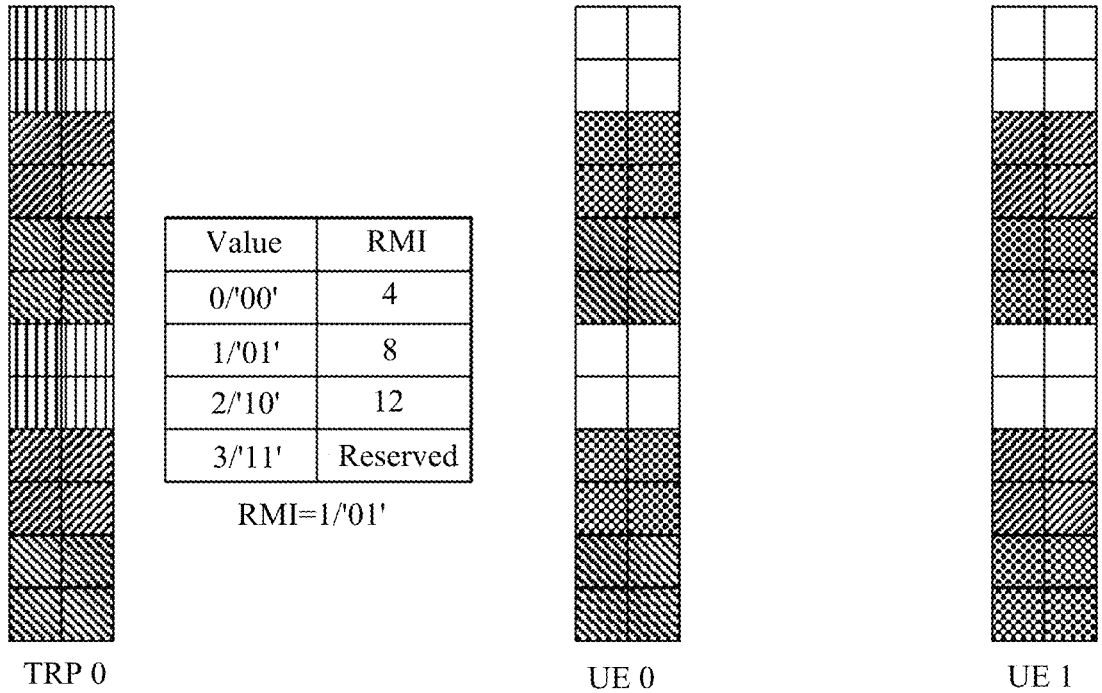
FIG. 23 is a schematic diagram of a correspondence between indication information and a pattern in a DMRS indicating and receiving method according to an embodiment of this application.
Figure 23:

In this scenario, the UE 0 and the UE 1 use a plurality of DMRS ports. FIG. 23 is a schematic diagram of a mapping rule of 12 DMRS ports, where each shaded box indicates an RE to which one DMRS port group is mapped, and n=0. The 12 DMRS ports are grouped into three DMRS port groups: a DMRS port group 1, a DMRS port group 2, and a DMRS port group 3.

Each DMRS port group includes four DMRS ports. A same time-frequency resource is multiplexed through CDM for DMRSs corresponding to the DMRS ports in each DMRS port group. A mapping rule of the three DMRS port groups is as follows:

A time-frequency resource mapped by the DMRS port group 1 includes, in frequency domain, the $12n^{th}$, the $(12n+1)^{th}$, the $(12n+6)^{th}$, and the $(12n+7)^{th}$ subcarriers on a resource unit.

A time-frequency resource mapped by the DMRS port group 2 includes, in frequency domain, the $(12n+2)^{th}$, the $(12n+3)^{th}$, the $(12n+8)^{th}$, and the $(12n+9)^{th}$ subcarriers on a resource unit.

A time-frequency resource mapped by the DMRS port group 3 includes, in frequency domain, the $(12n+4)^{th}$, the $(12n+5)^{th}$, the $(12n+10)^{th}$, and the $(12n+11)^{th}$ subcarriers on a resource unit.

n may be any one or more integers greater than or equal to 0 and less than $\lfloor M/12 \rfloor$. In the following descriptions, that a resource unit includes M subcarriers in frequency domain is used as an example for description, where M is an integer greater than or equal to 1. For example, if the resource unit is one RB pair (in other words, two RBs in time domain), M=12; or if the resource unit is two RBs in frequency domain, M=24. Each CDM group occupies two consecutive symbols in time domain.

It is assumed that the DMRS port group 1 includes DMRS ports {1, 2, 7, 8}, the DMRS port group 2 includes DMRS ports {3, 4, 9, 10}, and the DMRS port group 3 includes DMRS ports {5, 6, 11, 12}. This is only an example herein, and a specific DMRS port mapping manner is not limited. It should be noted that, when the DMRS port mapping manner changes, rate matching information also changes. According to the method described in this solution, a person in the related art can simply obtain a rate matching solution satisfying the foregoing rate matching design principle. During specific implementation, if the DMRS port mapping manner changes, the rate matching information also changes. In this case, it indicates that a quantized value of a quantity of orthogonal transmission layers in the rate matching information also changes. Therefore, a correspondence between the DMRS indication information and the quantized value of the quantity of orthogonal transmission layers may be indicated by using a piece of signaling.

A value of the DMRS indication information may be expressed in two manners: One is a decimal system, and the other is a binary system.

When the value is 0 (in decimal system) or 00 (in binary system), a quantized value (shown as RMI in the figure) that is of a quantity of orthogonal transmission layers and that corresponds to the value is 4, and it indicates that the current quantized layer quantity is 4. When the value is 1 or 01, it indicates that RMI=8. When the value is 2 or 10, correspondingly, RMI=12. When the value is 3 or 11, it indicates that RMI is reserved (a reserved value). During specific implementation, the value may be null or in another state, for example, a transmission state that corresponds to the second and the third port groups (or the first and the third port groups) and in which a quantized layer quantity is 4. In this case, it is assumed that a base station performs scheduling in a sequence of port group numbers.

In this case, when the DMRS indication information is indicated in binary system, two bits may be used for indication.

Table 4 shows an SU/MU MIMO DMRS configuration information table supporting a maximum of 12 orthogonal ports, where the table is similar to a DMRS DCI signaling table in LTE, and is applicable to only transparent MU-MIMO. A receive end obtains, by using the table, information such as a DMRS port and a quantity of orthogonal transmission layers of the receive end. In addition, the receive end may further learn, based on RMI indicated by the received DMRS indication information (a specific value), of a current quantized quantity of orthogonal transmission layers, a combination of currently used port group states, a quantity of orthogonal transmission layers that are not currently used by or a port group state that is not currently used by a receive end, or a resource unit that needs to be muted, so as to learn of the resource that is not occupied by DMRS and that is in resources available for carrying a DMRS, thereby obtaining DMRS port information of another matched terminal and completing rate matching.

When the value of the DMRS indication information received by UE 0 is 1 (in decimal system) or 01 (in binary system), it indicates that the quantized value of the current quantity of orthogonal transmission layers is 8, thereby knowing that both the DMRS port group 1 and the DMRS port group 2 are occupied. The UE 0 obtains port information of the UE 0 with reference to Table 4, and knows that the DMRS port group 1 includes a DMRS port of the UE 0 but the DMRS port group 2 does not include the DMRS port of the UE 0, so that the UE 0 learns that the DMRS port group 2 is used by another terminal, and does not transmit data of the UE 0. Likewise, the UE 1 learns, through indication, that the quantized value of the quantity of orthogonal transmission layers is 4, and obtains port information of the UE 1 with reference to Table 4, to learn that the DMRS port group 1 and the DMRS port group 2 are occupied. So that the UE 1 learns that data of the UE 1 is not transmitted on a location of the DMRS port group 1 that is not used by the UE 1. In addition, the UE 0 and the UE 1 learn, by using the rate matching information, that data can be transmitted on a location of the DMRS port group 3.

The foregoing descriptions are merely examples. For different DMRS patterns and different port mapping manners, values of the RMI and representations of the DCI information tables may be different. For example, the RMI in the foregoing examples is a current quantized layer quantity, or may be a sequence number of a DMRS port group.

A system in FIG. 22 supports a maximum supported port quantity of 12. In another implementation, a TRP may further support another maximum supported port quantity, for example, 4, 6, or 8. The maximum supported port quantity supported by the TRP may be indicated by using explicit signaling such as RRC, a MAC CE, or DCI, or may be bound with another configuration parameter, for example, a frequency, a carrier spacing, or a frame structure, corresponding to a scenario.

Figure 24:
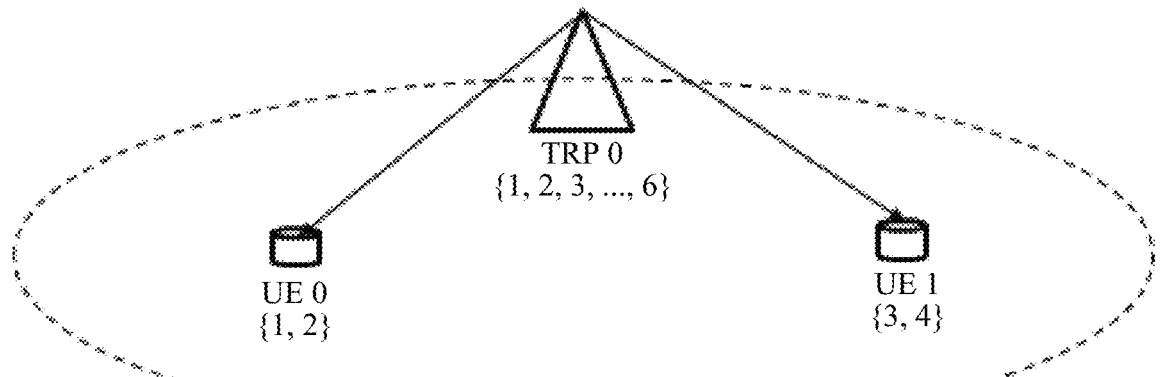
FIG. 24 is another schematic scenario diagram of a DMRS indicating and receiving method according to an embodiment of this application.

As shown in FIG. 24, a TRP 0 supports a maximum supported port quantity of 6, where ports allocated to a terminal 0 (the UE 0) are ports 1 and 2, and ports allocated to a terminal 1 (the UE 1) are ports 3 and 4.

Figure 25:
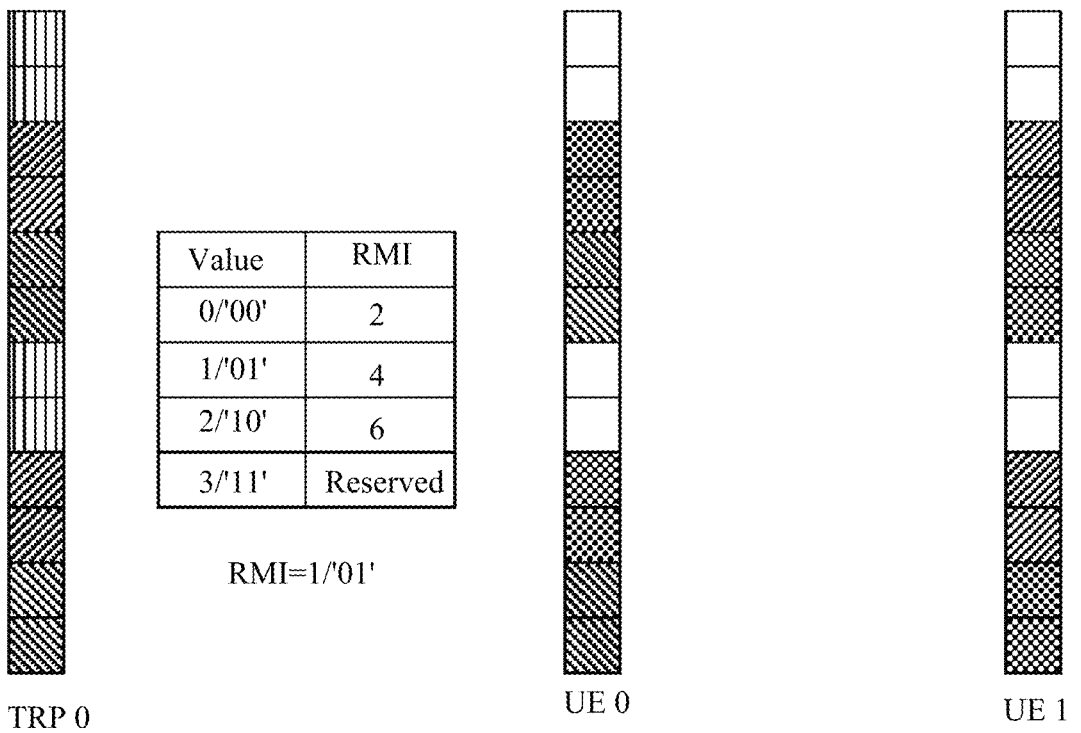
FIG. 25 is another schematic diagram of a correspondence between indication information and a pattern in a DMRS indicating and receiving method according to an embodiment of this application.
Figure 25:
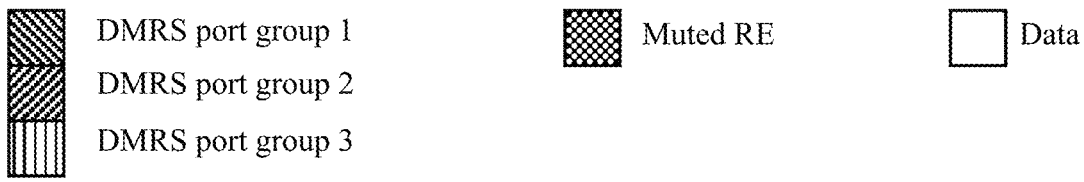

In this scenario, a DMRS port used by the UE 0 and the UE 1 is multiplexed in a plurality of manners. FIG. 25 is a schematic diagram of a mapping rule of six DMRS ports, where each shaded box indicates an RE to which one DMRS port group is mapped, and n=0. The six DMRS ports are grouped into three DMRS port groups: a DMRS port group 1, a DMRS port group 2, and a DMRS port group 3.

A time-frequency resource mapped by the DMRS port group 1 includes at least one of the $12n^{th}$, the $(12n+1)^{th}$, the $(12n+6)^{th}$, the $(12n+7)^{th}$ subcarriers on a resource unit.

A time-frequency resource mapped by the DMRS port group 2 includes at least one of the $(12n+2)^{th}$, the $(12n+3)^{th}$, the $(12n+8)^{th}$, and the $(12n+9)^{th}$ subcarriers on a resource unit.

A time-frequency resource mapped by the DMRS port group 3 includes at least one of the $(12n+4)^{th}$, the $(12n+5)^{th}$, the $(12n+10)^{th}$, and the $(12n+11)^{th}$ subcarriers on a resource unit.

n may be any one or more integers greater than or equal to 0 and less than $\lfloor M/12 \rfloor$. Three CDM groups occupy one symbol in time domain.

When the value is 0 (in decimal system) or 00 (in binary system), a quantized value (shown as RMI in the figure) that is of a quantity of orthogonal transmission layers and that corresponds to the value is 2, and it indicates that the current quantized layer quantity is 4. When the value is 1 or 01, it indicates that RMI=8. When the value is 2 or 10, correspondingly, RMI=6. When the value is 3 or 11, it indicates that RMI is reserved (a reserved value).

In this case, when the DMRS indication information is indicated in binary system, two bits may be used for indication.

Likewise, the receive end may further learn, based on RMI indicated by the received DMRS indication information (a specific value of the value), of a current quantized quantity of orthogonal transmission layers, a combination of currently used port group states, a quantity of orthogonal transmission layers that are not currently used by or a port group state that is not currently used by a receive end, or a resource unit that needs to be muted, so as to learn of the resource that is not occupied by DMRS and that is in resources available for carrying a DMRS, thereby obtaining DMRS port information of another matched terminal and completing rate matching. Further, with reference to the SU/MU MIMO DMRS signaling table supporting six orthogonal DMRS ports in Table 2, DMRS port information of another matched terminal may be obtained. For example, when the value of the DMRS indication information received by the UE 0 is 1 (in decimal system) or 01 (in binary system), it indicates that the quantized value of the current quantity of orthogonal transmission layers is 4. Assuming that the DMRS port group 1 includes DMRS ports {1, 2}, the DMRS port group 2 includes DMRS ports {3, 4}, and the DMRS port group 3 includes DMRS ports {5, 6}, based on the rate matching information, it can be learned that the DMRS port group 1 and the DMRS port group 2 are used and the DMRS port group 3 is not used. In this case, the terminal may learn of a port group location of another terminal with reference to the DMRS port information of the terminal.

Figure 26:
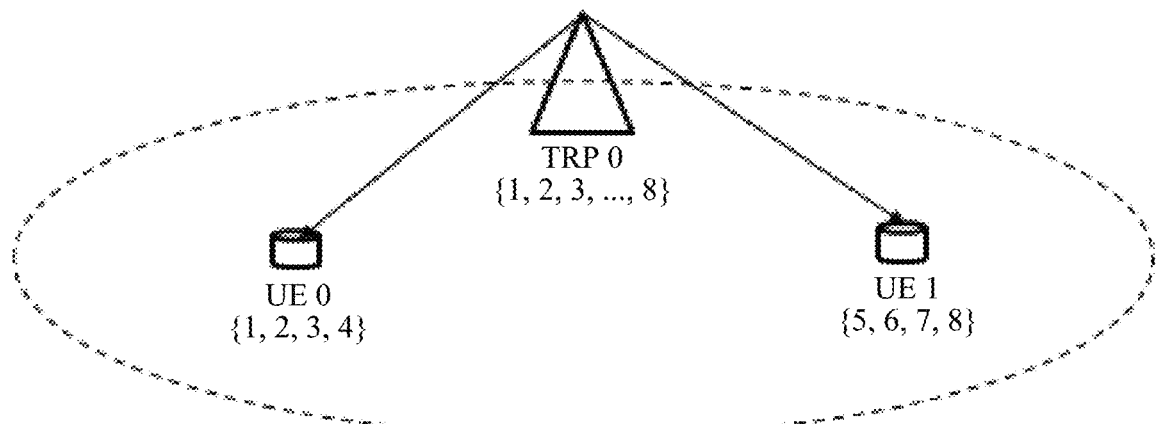
FIG. 26 is another schematic scenario diagram of a DMRS indicating and receiving method according to an embodiment of this application.

As shown in FIG. 26, a TRP 0 supports a maximum supported port quantity of 8, where ports allocated to a terminal 0 (the UE 0) are ports 1, 2, 3, and 4, and ports allocated to a terminal 1 (the UE 1) are ports 5, 6, 7, and 8.

Figure 27:
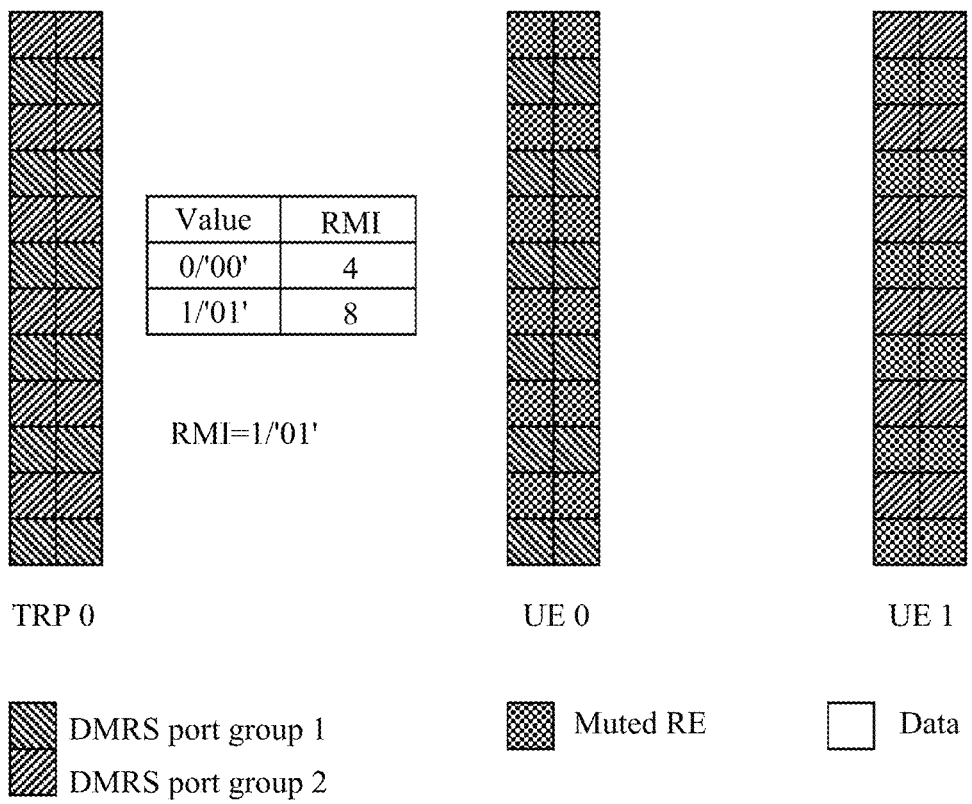
FIG. 27 is another schematic diagram of a correspondence between indication information and a pattern in a DMRS indicating and receiving method according to an embodiment of this application.

In this scenario, a DMRS port used by the UE 0 and the UE 1 may be multiplexed in a plurality of manners. FIG. 27 is a schematic diagram of a mapping rule of eight DMRS ports, where each shaded box indicates an RE to which one DMRS port group is mapped, and n=0. The eight DMRS ports are grouped into two DMRS port groups: a DMRS port group 1 and a DMRS port group 2, and each DMRS port group includes four DMRS ports.

A same time-frequency resource is multiplexed through CDM for DMRSs corresponding to the DMRS ports in each DMRS port group. A mapping rule of the two DMRS port groups is as follows:

A time-frequency resource mapped by each DMRS port group is mapped to two consecutive symbols in time domain.

A time-frequency resource mapped by the DMRS port group 1 includes at least one of the $12n^{th}$, the $(12n+2)^{th}$, the $(12n+4)^{th}$, the $(12n+6)^{th}$, the $(12n+8)^{th}$, and the $(12n+10)^{th}$ subcarriers on a resource unit.

A time-frequency resource mapped by the DMRS port group 2 includes at least one of the $(12n+1)^{th}$, the $(12n+3)^{th}$, the $(12n+5)^{th}$, the $(12n+7)^{th}$, the $(12n+9)^{th}$, and the $(12n+11)^{th}$ subcarriers on a resource unit.

n may be any one or more integers greater than or equal to 0 and less than $\lfloor M/12 \rfloor$.

When the value is 0 (in decimal system) or 00 (in binary system), a quantized value (shown as RMI in the figure) that is of a quantity of orthogonal transmission layers and that corresponds to the value is 4, and it indicates that the current quantized layer quantity is 4. When the value is 1 or 01, it indicates that RMI=8. In addition, the value may represent a combination of two CDM groups. For example, when the value is 0 (in decimal system) or 00 (in binary system), it indicates that the DMRS port group 1 is used. When the value is 1 or 01, both the DMRS port group 1 and the DMRS port group 2 are used.

In this case, when the DMRS indication information is indicated in binary system, one bit may be used for indication.

Likewise, the receive end may further learn, based on RMI indicated by the received DMRS indication information (a specific value of the value), of a current quantized quantity of orthogonal transmission layers, a combination of currently used port group states, a quantity of orthogonal transmission layers that are not currently used by or a port group state that is not currently used by a receive end, or a resource unit that needs to be muted, so as to learn of the resource that is not occupied by DMRS and that is in resources available for carrying a DMRS, thereby obtaining DMRS port information of another matched terminal and performing rate matching. The following uses a port group state combination as an example. For a solution of a quantized parameter layer quantity, refer to the foregoing examples. For example, when the value of the DMRS indication information received by the UE 0 is 1 (in decimal system) or 01 (in binary system), it indicates that both the DMRS port group 1 and the DMRS port group 2 are occupied. The UE 0 learns, based on the DMRS port information obtained by the UE 0, that a DMRS port group used by the UE 0, so that the UE 0 knows that the other port group is used by another UE, and does not transmit data of the UE 0, thereby performing rate matching.

Figure 29:
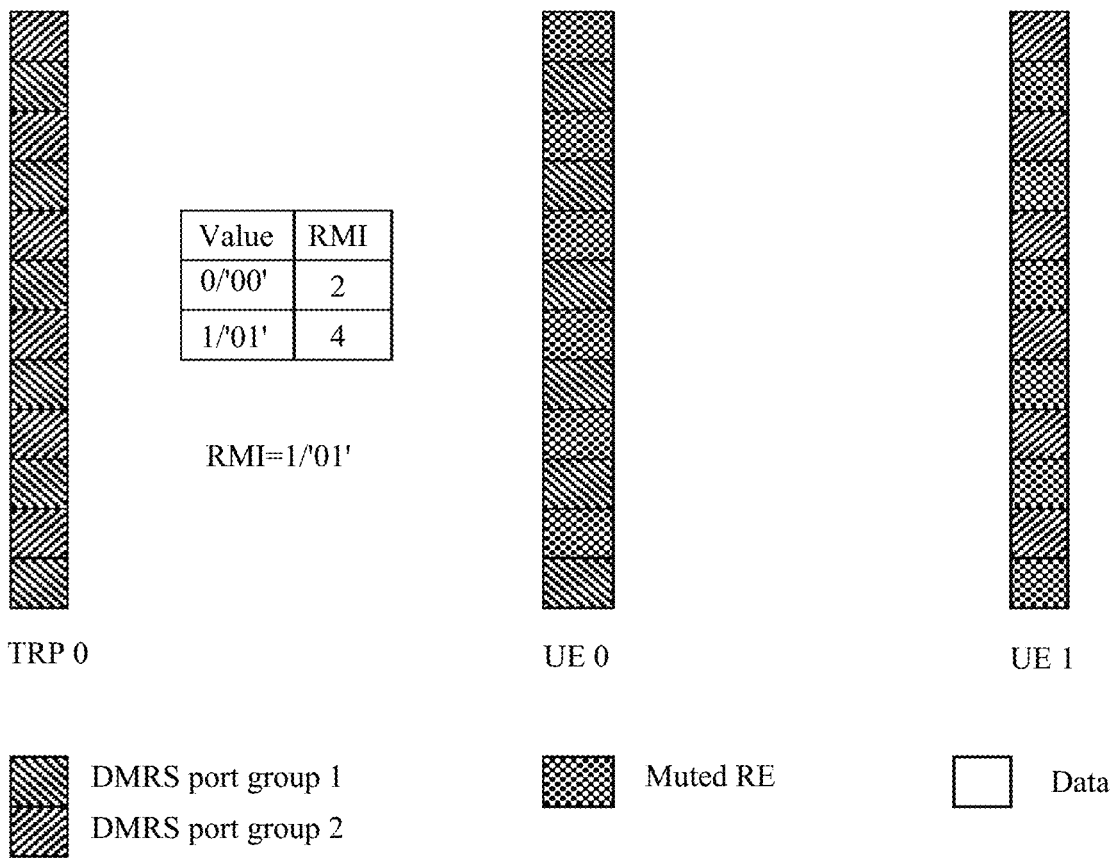
FIG. 29 is another schematic diagram of a correspondence between indication information and a pattern in a DMRS indicating and receiving method according to an embodiment of this application.

As shown in FIG. 28, a TRP 0 supports a maximum supported port quantity of 4, where ports allocated to a terminal 0 (the UE 0) are ports 1 and 2, and ports allocated to a terminal 1 (the UE 1) are ports 3 and 4. In this scenario, a DMRS port used by the UE 0 and the UE 1 may have a plurality of CDM multiplexing modes. FIG. 29 is a schematic diagram of a mapping rule of four DMRS ports, where each shaded box indicates an RE to which one DMRS port group is mapped, and n=0. Four DMRS ports are grouped into two DMRS port groups: a DMRS port group 1 and a DMRS port group 2, and each DMRS port group includes two DMRS ports.

A same time-frequency resource is multiplexed through CDM for DMRSs corresponding to the DMRS ports in each DMRS port group. A mapping rule of the two DMRS port groups is as follows:

A time-frequency resource mapped by each DMRS port group is mapped to one symbol in time domain.

A time-frequency resource mapped by the DMRS port group 1 includes the $2n^{th}$ subcarrier on a resource unit.

A time-frequency resource mapped by the DMRS port group 2 includes the $(2n+1)^{th}$ subcarrier on a resource unit.

n may be any one or more integers greater than or equal to 0 and less than $\lfloor M/12 \rfloor$.

It is assumed that the DMRS port group 1 includes DMRS port {1, 3}, and the DMRS port group 2 includes DMRS port {2, 4}. In this case, when the value is 0 (in decimal system) or 00 (in binary system), a quantized value (shown as RMI in the figure) that is of a quantity of orthogonal transmission layers and that corresponds to the value is 2, and it indicates that the current quantized layer quantity is 4. When the value is 1 or 01, it indicates that RMI=8.

In this case, when the DMRS indication information is indicated in binary system, one bit may be used for indication.

Likewise, the receive end may further learn, based on RMI indicated by the received DMRS indication information (a specific value of the value), of a current quantized quantity of orthogonal transmission layers, a combination of currently used port group states, a quantity of orthogonal transmission layers that are not currently used by or a port group state that is not currently used by a receive end, or a resource unit that needs to be muted, so as to obtain DMRS port information of another matched terminal, thereby performing rate matching. For example, when the value of the indication information received by the UE 0 is 1 (in decimal system) or 01 (in binary system), it indicates that the quantized value of the current quantity of orthogonal transmission layers is 4. In this case, the terminal learns, by using the rate matching information, that both the DMRS port group 1 and the DMRS port group 2 are occupied, and may learn, with reference to a DMRS port used by the terminal, of a DMRS port group used by another terminal, thereby performing rate matching. It should be noted that, in the solutions in FIG. 27 and FIG. 29, when the quantity of orthogonal transmission layers can also be quantized into 1 and 2 based on a scheduling sequence of the base station, for example, first FDM scheduling and then CDM scheduling, the rate matching information in this embodiment may correspond to a DMRS pattern configuration (type) or a quantity of port groups included in a DMRS pattern, thereby reducing storage overheads of the receive end.

When the TRP supports maximum supported port quantities 4, 6, 8, 12, and the like, for different DMRS patterns and DMRS port mapping manners, maximum supported orthogonal-transmission-layer quantities may be different. A conclusive rule is as follows:

The quantized quantity of orthogonal transmission layers may be obtained in the following manner. A rule is provided only herein. During specific implementation, a value may be directly stored without a selection process.

It is assumed that all DMRS ports are quantized from 1. In this case, in each DMRS port group, when port numbers are sorted in ascending order, a quantized layer quantity may be as follows:

for example, a port group 1 {1, 2, 3, 4} and a port group 2 {5, 6, 7, 8} are quantized into 4 and 8;

for example, a port group 1 {1, 3, 5, 7} and a port group 2 {2, 4, 6, 8} are quantized into 1 and 2;

for example, a port group 1 {1, 2, 5, 7} and a port group 2 {3, 4, 6, 8} are quantized into 2 and 4;

for example, a port group 1 {1, 2, 5, 6} and a port group 2 {3, 4, 6, 7} are quantized into 2 and 4;

for example, a port group 1 {1, 2, 3, 4}, a port group 2 {5, 6, 7, 8}, and a port group 2 {9, 10, 11, 12} are quantized into 4, 8, and 12;

for example, a port group 1 {1, 4, 7, 10}, a port group 2 {2, 5, 8, 11}, and a port group 2 {3, 6, 9, 12} are quantized into 1, 2 and 3;

for example, a port group 1 {1, 2, 7, 8}, a port group 2 {3, 4, 9, 10}, and a port group 2 {5, 6, 11, 12} are quantized into 2, 4, and 6; and for example, a port group 1 {1, 2, 7, 10}, a port group 2 {3, 4, 8, 11}, and a port group 2 {5, 6, 9, 12} are quantized into 2, 4, and 6.

According to the foregoing embodiments, designing a corresponding DMRS configuration information table for each maximum supported orthogonal-port quantity can satisfy requirements for different scenarios in an NR system.

Embodiment 6

Different signaling is designed for different DMRS patterns for indication. For different DMRS port mapping manners, content in a table may be different, and may be a quantized current orthogonal-transmission-layer quantity, or may be a status of a DMRS port group.

FIG. 30(a) to FIG. 30(e) show a DMRS pattern in which a mapping order is first CDM mapping and then FDM mapping.

For each DMRS pattern, overheads of corresponding indication information are different. For example:

For a pattern that is shown in FIG. 30(a) and that supports four orthogonal ports, one bit is required to indicate RMI. When a value of an RM indication is 0 or 00, it indicates that rate matching information (RMI) is 2, in other words, a quantized value of a current quantity of orthogonal transmission layers is 2. When a value is 1 or 01, it indicates that rate matching information RMI is 4.

For a pattern that is shown in FIG. 30(b) and that supports eight orthogonal ports, one bit is required to indicate RM. When a value of an RM indication is 0 or 00, it indicates that rate matching RMI is 4. When a value is 1 or 01, it indicates that rate matching RMI is 8.

For a pattern that is shown in FIG. 30(c) and that supports six orthogonal ports, two bits are needed to indicate RMI. When a value of an RM indication is 0 or 00, it indicates that rate matching indication (RMI) is 2. When a value is 1 or 01, it indicates that rate matching indication (RMI) is 4. When a value is 2 or 10, it indicates that rate matching indication (RMI) is 6.

For a pattern that is shown in FIG. 30(d) and that supports 12 orthogonal ports, two bits are needed to indicate RMI. When a value of an RM indication is 0 or 00, it indicates that rate matching indication (RMI) is 4. When a value is 1 or 01, it indicates that rate matching indication (RMI) is 8. When a value is 2 or 10, it indicates that rate matching indication (RMI) is 12.

For a pattern that is shown in FIG. 30(e) and that supports 12 orthogonal ports, two bits are needed to indicate RMI. When a value of an RM indication is 0 or 00, it indicates that rate matching indication (RMI) is 2. When a value is 1 or 01, it indicates that rate matching indication (RMI) is 4. When a value is 2 or 10, it indicates that rate matching indication (RMI) is 6.

FIG. 31(a) to FIG. 31(d) show a DMRS pattern in which a mapping order is first FDM mapping and then CDM mapping.

For each DMRS pattern, overheads of corresponding indication information are different. For example:

For a pattern that is shown in FIG. 31(a) and that supports four orthogonal ports, one bit is required to indicate RMI. When a value of an RM indication is 0 or 00, it indicates that rate matching indication (RMI) is 1. When a value is 1 or 01, it indicates that rate matching indication (RMI) is 2.

For a pattern that is shown in FIG. 31(b) and that supports eight orthogonal ports, one bit is required to indicate RMI. When a value of an RM indication is 0 or 00, it indicates that rate matching indication (RMI) is 1. When a value is 1 or 01, it indicates that rate matching indication (RMI) is 2.

For a pattern that is shown in FIG. 31(c) and that supports six orthogonal ports, two bits are needed to indicate RMI. When a value of an RM indication is 0 or 00, it indicates that rate matching indication (RMI) is 1. When a value is 1 or 01, it indicates that rate matching indication (RMI) is 2. When a value is 2 or 10, it indicates that rate matching indication (RMI) is 3. When a value of an RM indication is 3 or 11, it indicates that rate matching indication (RMI) is reserved.

For a pattern that is shown in FIG. 31(d) and that supports 12 orthogonal ports, two bits are needed to indicate RMI. When a value of an RM indication is 0 or 00, it indicates that rate matching indication (RMI) is 1. When a value is 1 or 01, it indicates that rate matching RMI is 2. When a value is 2 or 10, it indicates that rate matching indication (RMI) is 3. When a value is 3 or 11, it indicates that rate matching indication (RMI) is reserved.

In addition, in this port mapping solution, a plurality of DMRS patterns may correspond to a same RM table. For example, FIG. 31(a) and FIG. 31(b) may correspond to a same rate matching table, for example, a table in FIG. 31(a), and FIG. 31(c) and FIG. 31(d) may correspond to a same rate matching table, for example, a table in FIG. 31(c). In addition, the table may correspond to a DMRS type or a quantity of port groups in a DMRS pattern. The method has an advantage of reducing storage overheads of a terminal.

FIG. 32(a) to FIG. 32(d) show a mapping order that is a hybrid CDM-FDM port mapping manner.

For each DMRS pattern, overheads of corresponding indication information are different. For example:

For a pattern that is shown in FIG. 32(a) and that supports four orthogonal ports, one bit is required to indicate RMI. When a value of an RM indication is 0 or 00, it indicates that rate matching indication (RMI) is 2. When a value is 1 or 01, it indicates that rate matching indication (RMI) is 4.

For a pattern that is shown in FIG. 32(b) and that supports eight orthogonal ports, one bit is required to indicate information RMI. When a value of an RM indication is 0 or 00, it indicates that rate matching indication (RMI) is 2. When a value is 1 or 01, it indicates that rate matching indication (RMI) is 4.

For a pattern that is shown in FIG. 32(c) and that supports six orthogonal ports, two bits are needed to indicate information RMI. When a value of an RM indication is 0 or 00, it indicates that rate matching indication (RMI) is 2. When a value is 1 or 01, it indicates that rate matching indication (RMI) is 4. When a value is 2 or 10, it indicates that rate matching indication (RMI) is 6. When a value is 3 or 11, it indicates that a value of rate matching indication (RMI) is reserved.

For a pattern that is shown in FIG. 32(d) and that supports 12 orthogonal ports, two bits are needed to indicate RMI. When a value of an RM indication is 0 or 00, it indicates that rate matching indication (RMI) is 2. When a value is 1 or 01, it indicates that rate matching RMI is 4. When a value is 2 or 10, it indicates that rate matching indication (RMI) is 6. When a value of an RM indication is 3 or 11, it indicates that rate matching indication (RMI) is reserved.

In addition, in this port mapping solution, a plurality of DMRS patterns may correspond to a same RM table. For example, FIG. 32(a) and FIG. 32(b) may correspond to a same rate matching table, for example, a table in FIG. 32(a), and FIG. 32(c) and FIG. 32(d) may correspond to a same rate matching table, for example, a table in FIG. 32(c). In addition, the table may correspond to a DMRS type or a quantity of port groups in a DMRS pattern. The method has an advantage of reducing storage overheads of the terminal.

FIG. 33(a) to FIG. 33(d) show a use status of a port group in a DMRS pattern.

For each DMRS pattern, overheads of corresponding DMRS indication information are different. For example:

For a pattern that is shown in FIG. 33(a) and that supports four orthogonal ports, one bit is required to indicate RMI. When a value of an RM indication is 0 or 00, it indicates that rate matching indication (RMI) is 1. In other words, a DMRS port group 1 is occupied. When a value is 1 or 01, it indicates that rate matching indication (RMI) is 2. In this case, it indicates that both DMRS port groups 1 and 2 are occupied.

For a pattern that is shown in FIG. 33(b) and that supports eight orthogonal ports, one bit is required to indicate RMI. When a value of an RM indication is 0 or 00, it indicates that rate matching indication (RMI) is 1. In other words, a DMRS port group 1 is occupied. When a value is 1 or 01, it indicates that rate matching indication (RMI) is 2. In this case, it indicates that both DMRS port groups 1 and 2 are occupied.

Optionally, FIG. 33(a) and FIG. 33(b) may correspond to a same rate matching table, for example, a table in FIG. 33(a). In this case, the table may correspond to a DMRS type or a quantity of port groups in a DMRS pattern. The method has an advantage of reducing storage overheads of a terminal.

For a pattern that is shown in FIG. 33(c) and that supports six orthogonal ports, two bits are needed to indicate RMI. When a value of an RM indication is 0 or 00, it indicates that rate matching indication (RMI) is 1. In this case, it indicates that a DMRS port group 1 is occupied. When a value is 1 or 01, it indicates that rate matching indication (RMI) is 2. In this case, it indicates that both DMRS port groups 1 and 2 are occupied. When a value is 2 or 10, it indicates that rate matching indication (RMI) is 3. In this case, it indicates that DMRS port groups 1, 2, and 3 are all occupied. When a value is 3 or 11, it indicates that rate matching indication (RMI) is 4. In this case, it indicates that both DMRS port groups 2 and 3 are occupied. It should be noted that, during specific implementation, RMI=4 may alternatively be pre-defined as a state in which both DMRS port groups 1 and 3 are occupied or reserved.

For a pattern that is shown in FIG. 33(d) and that supports 12 orthogonal ports, two bits are needed to indicate RMI. When a value of an RM indication is 0 or 00, it indicates that rate matching indication (RMI) is 1. In this case, it indicates that a DMRS port group 1 is occupied. When a value is 1 or 01, it indicates that rate matching indication (RMI) is 2. In this case, it indicates that both DMRS port groups 1 and 2 are occupied. When a value is 2 or 10, it indicates that rate matching indication (RMI) is 3. In this case, it indicates that DMRS port groups 1, 2, and 3 are all occupied. When a value is 3 or 11, it indicates that rate matching indication (RMI) is 4. In this case, it indicates that both DMRS port groups 2 and 3 are occupied. It should be noted that, during specific implementation, RMI=4 may alternatively be pre-defined as a state in which both DMRS port groups 1 and 3 are occupied or reserved.

Optionally, FIG. 33(c) and FIG. 33(d) may correspond to a same rate matching table. In this case, the table may correspond to a DMRS type or a quantity of port groups in a DMRS pattern. The method has an advantage of reducing storage overheads of a terminal.

It should be noted that, a CDM combination in this solution is only an example. During a specific implementation process, the CDM combination may be removed or added, or may be replaced with another DMRS state combination.

It should be noted that, in an actual implementation process, the value may directly correspond to a state combination in which a port group is occupied, without being indicated by using RMI. For example, for FIG. 33(a), the state combination may be described as Table 19-1.

TABLE 19-1

| Value | Description |
| --- | --- |
| 0/00 | A DMRS port group 1 is occupied. |
| 1/01 | A DMRS port group 1 and a DMRS port group 2 are occupied. |

In addition, optionally, an SU state may be added to a table, for example, Table 19-2.

TABLE 19-2

| Value | Description |
| --- | --- |
| 0/00 | SU or layer 0 being occupied |
| ... | ... |

Herein, the layer 0 is mainly used to notify the terminal of a current SU state, but a specific expression form is not limited.

According to the embodiments shown in FIG. 30 to FIG. 33, for each pattern or a type of DMRS configuration (type) or DMRS patterns having a same quantity of port groups, corresponding DMRS indication information may be designed to satisfy requirements for different scenarios in an NR system. For example, the DMRS indication information is not only applied to a pattern in an ultra-reliable and low latency communication (URLLC) scenario but also applied to a pattern in Enhanced Mobile Broadband (eMBB). For other different patterns, a design of a table is re-considered.

Embodiment 7

Ranked indication may be performed on the DMRS configuration information and the DMRS indication information by using a combination of RRC, a MAC-CE, and DCI. For example, parameter setting may be configured by using RRC, and include information about a quantized quantity of orthogonal transmission layers or CDM group state information for DMRS rate matching, and DCI signaling is used to select a parameter set to notify a terminal. The foregoing plurality of methods for quantizing an orthogonal-transmission-layer quantity may be placed into the parameter set, where the parameter set may include other information, for example, a ZP-CSI-RS, a start location and an end location of a PDSCH, or the like. Herein the table is only provided as an example, and a specific table form, size, and description form are not limited. During specific implementation, the parameter set may be configured by using RRC, where the parameter set may include rate matching information related to a DMRS, as shown in Table 20.

TABLE 20

| Value | Description |
| --- | --- |
| 0/00 | Parameter set 1 |
| 1/01 | Parameter set 2 |
| 2/10 | Parameter set 3 |

TABLE 20-continued

| Value | Description |
|---|---|
| 3/11 | Parameter set 4 |
| ... | ... |

Embodiment 8

In this embodiment, information related to a total quantity of orthogonal transmission layers or a total quantity of orthogonal ports (in this specification, the total quantity of orthogonal transmission layers and the total quantity of orthogonal ports are the same) is designed in a DMRS configuration information table. The information related to the total quantity of orthogonal ports is reflected by using a piece of indication information. The indication information may indicate a quantity of all orthogonal ports that are possibly actually presented or a quantized value of a quantity of all orthogonal ports that are possibly actually presented. The quantized value of the quantity of all the orthogonal ports may be information about a quantity of orthogonal DMRS layers, orthogonal DMRS antenna port set indication information, orthogonal DMRS antenna port CDM group information, or information generated based on a CDM group size.

For four patterns in FIG. 34(a), FIG. 34(b), FIG. 34(c), and FIG. 34(d) of FIG. 34, compared with the DMRS configuration information tables in Table 1 to Table 4, in this embodiment, a feature of indication information of the total quantity of orthogonal transmission layers is added. For example, the column of total or total layer number in information tables shown in Table 21 to Table 24 is the indication information of the total quantity of orthogonal transmission layers.

TABLE 21

Port combinations for 1-symbol pattern in config. 1

| | One Codeword (≤4 layers): Codeword 0 enabled, Codeword 1 disabled | | | | Two Codewords (>4 layers): Codeword 0 enabled, Codeword 1 enabled | | |
|---|---|---|---|---|---|---|---|
| Value | Quantized layer num | Port index | Value | Quantized layer num | UE rank | Port index |
| 0 | 2 | 1 | 0 | 0 | reserved | reserved | reserved |
| 1 | 2 | 1 | 1 | 1 | reserved | reserved | reserved |
| 2 | 2 | 2 | 0-1 | 2 | reserved | reserved | reserved |
| 3 | 4 | 1 | 0 | 3 | reserved | reserved | reserved |
| 4 | 4 | 1 | 1 | 4 | reserved | reserved | reserved |
| 5 | 4 | 1 | 2 | 5 | reserved | reserved | reserved |
| 6 | 4 | 1 | 3 | 6 | reserved | reserved | reserved |
| 7 | 4 | 2 | 0-1 | 7 | reserved | reserved | reserved |
| 8 | 4 | 2 | 2-3 | 8 | reserved | reserved | reserved |
| 9 | 4 | 3 | 0-2 | 9 | reserved | reserved | reserved |
| 10 | 4 | 4 | 0-3 | 10 | reserved | reserved | reserved |

TABLE 22

Port combinations for 2-symbol pattern in config. 1

| | One Codeword (≤4 layers): Codeword 0 enabled, Codeword 1 disabled | | | | Two Codewords (>4 layers): Codeword 0 enabled, Codeword 1 enabled | | |
|---|---|---|---|---|---|---|---|
| Value | Quantized layer num | Port index | Value | Quantized layer num | UE rank | Port index |
| 0 | 4 | 1 | 0 | 0 | 8 | 5 | 0-4 |
| 1 | 4 | 1 | 1 | 1 | 8 | 6 | 0-5 |
| 2 | 4 | 1 | 2 | 2 | 8 | 7 | 0-6 |
| 3 | 4 | 1 | 3 | 3 | 8 | 8 | 0-7 |
| 4 | 4 | 2 | 0-1 | 4 | reserved | reserved | reserved |
| 5 | 4 | 2 | 2-3 | 5 | reserved | reserved | reserved |
| 6 | 4 | 3 | 0-2 | 6 | reserved | reserved | reserved |
| 7 | 4 | 4 | 0-3 | 7 | reserved | reserved | reserved |
| 8 | 8 | 1 | 0 | 8 | reserved | reserved | reserved |
| 9 | 8 | 1 | 1 | 9 | reserved | reserved | reserved |
| 10 | 8 | 1 | 2 | 10 | reserved | reserved | reserved |
| 11 | 8 | 1 | 3 | 11 | reserved | reserved | reserved |
| 12 | 8 | 1 | 4 | 12 | reserved | reserved | reserved |
| 13 | 8 | 1 | 5 | 13 | reserved | reserved | reserved |
| 14 | 8 | 1 | 6 | 14 | reserved | reserved | reserved |
| 15 | 8 | 1 | 7 | 15 | reserved | reserved | reserved |
| 16 | 8 | 2 | 0-1 | 16 | reserved | reserved | reserved |
| 17 | 8 | 2 | 2-3 | 17 | reserved | reserved | reserved |
| 18 | 8 | 2 | 4-5 | 18 | reserved | reserved | reserved |
| 19 | 8 | 2 | 6-7 | 19 | reserved | reserved | reserved |
| 20 | 8 | 3 | 0-2 | 20 | reserved | reserved | reserved |
| 21 | 8 | 3 | 3-5 | 21 | reserved | reserved | reserved |
| 22 | 8 | 4 | 0-3 | 22 | reserved | reserved | reserved |
| 23 | 8 | 4 | 4-7 | 23 | reserved | reserved | reserved |

TABLE 23

Port combinations for 1-symbol pattern in config. 2

| | One Codeword (≤4 layers): Codeword 0 enabled, Codeword 1 disabled | | | | Two Codewords (>4 layers): Codeword 0 enabled, Codeword 1 enabled | | |
|---|---|---|---|---|---|---|---|
| Value | Quantized layer num | Port index | Value | Quantized layer num | UE rank | Port index |
| 0 | 2 | 1 | 0 | 0 | 6 | 5 | 0-4 |
| 1 | 2 | 1 | 1 | 1 | 6 | 6 | 0-5 |
| 2 | 2 | 2 | 0-1 | 2 | 8 | 7 | 0-6 |
| 3 | 4 | 1 | 0 | 3 | 8 | 8 | 0-7 |
| 4 | 4 | 1 | 1 | 4 | reserved | reserved | reserved |
| 5 | 4 | 1 | 2 | 5 | reserved | reserved | reserved |
| 6 | 4 | 1 | 3 | 6 | reserved | reserved | reserved |
| 7 | 4 | 2 | 0-1 | 7 | reserved | reserved | reserved |
| 8 | 4 | 2 | 2-3 | 8 | reserved | reserved | reserved |
| 9 | 4 | 3 | 0-2 | 9 | reserved | reserved | reserved |
| 10 | 4 | 4 | 0-3 | 10 | reserved | reserved | reserved |
| 11 | 6 | 1 | 0 | 11 | reserved | reserved | reserved |
| 12 | 6 | 1 | 1 | 12 | reserved | reserved | reserved |
| 13 | 6 | 1 | 2 | 13 | reserved | reserved | reserved |
| 14 | 6 | 1 | 3 | 14 | reserved | reserved | reserved |
| 15 | 6 | 1 | 4 | 15 | reserved | reserved | reserved |
| 16 | 6 | 1 | 5 | 16 | reserved | reserved | reserved |
| 17 | 6 | 2 | 0-1 | 17 | reserved | reserved | reserved |
| 18 | 6 | 2 | 2-3 | 18 | reserved | reserved | reserved |
| 19 | 6 | 2 | 4-5 | 19 | reserved | reserved | reserved |
| 20 | 6 | 3 | 0-2 | 20 | reserved | reserved | reserved |
| 21 | 6 | 3 | 3-5 | 21 | reserved | reserved | reserved |
| 22 | 6 | 4 | 0-3 | 22 | reserved | reserved | reserved |

TABLE 24

Port combinations for 2-symbol pattern in config. 2

| | One Codeword (≤4 layers): Codeword 0 enabled, Codeword 1 disabled | | | Two Codewords (>4 layers): Codeword 0 enabled, Codeword 1 enabled | | |
|---|---|---|---|---|---|---|
| Value | Quantized layer num | Port index | Value | Quantized layer num | UE rank | Port index |
| 0 | 4 | 1 | 0 | 0 | 8 | 5 | 0-4 |
| 1 | 4 | 1 | 1 | 1 | 8 | 6 | 0-5 |
| 2 | 4 | 1 | 2 | 2 | 8 | 7 | 0-6 |
| 3 | 4 | 1 | 3 | 3 | 8 | 8 | 0-7 |
| 4 | 4 | 2 | 0-1 | 4 | reserved | reserved | reserved |
| 5 | 4 | 2 | 2-3 | 5 | reserved | reserved | reserved |
| 6 | 4 | 3 | 0-2 | 6 | reserved | reserved | reserved |
| 7 | 4 | 4 | 0-3 | 7 | reserved | reserved | reserved |
| 8 | 8 | 1 | 0 | 8 | reserved | reserved | reserved |
| 9 | 8 | 1 | 1 | 9 | reserved | reserved | reserved |
| 10 | 8 | 1 | 2 | 10 | reserved | reserved | reserved |
| 11 | 8 | 1 | 3 | 11 | reserved | reserved | reserved |
| 12 | 8 | 1 | 4 | 12 | reserved | reserved | reserved |
| 13 | 8 | 1 | 5 | 13 | reserved | reserved | reserved |
| 14 | 8 | 1 | 6 | 14 | reserved | reserved | reserved |
| 15 | 8 | 1 | 7 | 15 | reserved | reserved | reserved |
| 16 | 8 | 2 | 0-1 | 16 | reserved | reserved | reserved |
| 17 | 8 | 2 | 2-3 | 17 | reserved | reserved | reserved |
| 18 | 8 | 2 | 4-5 | 18 | reserved | reserved | reserved |
| 19 | 8 | 2 | 6-7 | 19 | reserved | reserved | reserved |
| 20 | 8 | 3 | 0-2 | 20 | reserved | reserved | reserved |
| 21 | 8 | 3 | 3-5 | 21 | reserved | reserved | reserved |
| 22 | 8 | 4 | 0-3 | 22 | reserved | reserved | reserved |
| 23 | 8 | 4 | 4-7 | 23 | reserved | reserved | reserved |
| 28 | 12 | 1 | 0 | 28 | reserved | reserved | reserved |
| 29 | 12 | 1 | 1 | 29 | reserved | reserved | reserved |
| 30 | 12 | 1 | 2 | 30 | reserved | reserved | reserved |
| 31 | 12 | 1 | 3 | 31 | reserved | reserved | reserved |
| 32 | 12 | 1 | 4 | 32 | reserved | reserved | reserved |
| 33 | 12 | 1 | 5 | 33 | reserved | reserved | reserved |
| 34 | 12 | 1 | 6 | 34 | reserved | reserved | reserved |
| 35 | 12 | 1 | 7 | 35 | reserved | reserved | reserved |
| 36 | 12 | 1 | 8 | 36 | reserved | reserved | reserved |
| 37 | 12 | 1 | 9 | 37 | reserved | reserved | reserved |
| 38 | 12 | 1 | 10 | 38 | reserved | reserved | reserved |
| 39 | 12 | 1 | 11 | 39 | reserved | reserved | reserved |
| 40 | 12 | 2 | 0-1 | 40 | reserved | reserved | reserved |
| 41 | 12 | 2 | 2-3 | 41 | reserved | reserved | reserved |
| 42 | 12 | 2 | 4-5 | 42 | reserved | reserved | reserved |
| 43 | 12 | 2 | 6-7 | 43 | reserved | reserved | reserved |
| 44 | 12 | 2 | 8-9 | 44 | reserved | reserved | reserved |
| 45 | 12 | 2 | 10-11 | 45 | reserved | reserved | reserved |
| 46 | 12 | 3 | 0-2 | 46 | reserved | reserved | reserved |
| 47 | 12 | 3 | 3-5 | 47 | reserved | reserved | reserved |
| 48 | 12 | 3 | 6-8 | 48 | reserved | reserved | reserved |
| 49 | 12 | 3 | 9-11 | 49 | reserved | reserved | reserved |
| 50 | 12 | 4 | 0-3 | 50 | reserved | reserved | reserved |
| 51 | 12 | 4 | 4-7 | 51 | reserved | reserved | reserved |
| 52 | 12 | 4 | 8-11 | 52 | reserved | reserved | reserved |

In this embodiment, all total quantities of orthogonal transmission layers that are possibly presented are considered, and this embodiment may be adapted to all scenarios, and may be used by a plurality of terminals for MU matching to perform rate matching.

Based on the content of the DMRS configuration information tables provided in the foregoing embodiment, in this embodiment, the feature of the total quantity of orthogonal transmission layers, in other words, information about a quantized layer quantity, is added. A terminal may implicitly obtain RMI information with reference to the information.

In this embodiment, all total quantities of orthogonal transmission layers that are possibly presented are considered, and this embodiment may be adapted to all scenarios. The quantized layer num is a quantized value of a possible quantity of orthogonal transmission layers, and is indicated by using a value the same as that of DMRS indication information (a value) in a DMRS configuration information table. The DMRS configuration information table may be similar to that in LTE. For example, the DMRS indication information is a quantity of antenna ports, a scrambling identification, and an indication of a quantity of orthogonal transmission layers (number of layers indication) that are in LTE. The DMRS configuration information table may further include at least one of a DMRS port quantity, a port index, sequence generation information, and a CDM type. Based on this, the quantized value of the quantity of orthogonal transmission layers is added. The DMRS configuration information table may be stored at both a transmit end and a receive end. When the transmit end needs to indicate a rate matching solution to the receive end, the transmit end needs to send only a piece of indication information to the receive end. After receiving the indication information, the receive end uses the indication information as an index, to search the DMRS configuration information table for the quantized value of the corresponding quantity of orthogonal transmission layers, and also learn of information about a quantity of DMRS layers, information about a DMRS antenna port set, code division multiplexing CDM group information of a DMRS antenna port, or the like. Then, the receive end identifies which resource units are used for DMRS transmission at the receive end and which resource units are used for DMRS transmission at other receive ends that implement CDM multiplexing. Remaining resource units are used for data transmission related to the receive end. Therefore, the receive end demodulates data on a corresponding resource unit.

In another implementation, the indication information in this embodiment of this application indicates a state of a DMRS port group that is not used by the receive end. Specifically, DCI may be used for indication.

For configurations shown in FIG. 34(*a*) and FIG. 34(*b*), indication is performed by using the following Table 25:

TABLE 25

| Value | MU | Description |
|---|---|---|
| 0 | | Non-mute |
| 1 | MU | All-mute |

Table 25 may be configured at the transmit end and the receive end according to a protocol, or may be sent by the transmit end to the receive end by using RRC signaling.

Different from the foregoing embodiment, in Table 25, a value does not correspond to a quantized value of a quantity of orthogonal transmission layers, but indicates a status of a DMRS port group that is not used by the receive end. For example, when the value is 0, regardless of SU or MU matching, it indicates that the state of the DMRS port group that is not used by the receive end is non-mute. When the value is 1, it indicates that the state of the DMRS port group that is not used by the receive end is all-mute. After receiving the indication information (the value), the receive end can determine the state of the DMRS port group that is not used by the receive end, thereby completing rate matching. It should be noted that the column of MU in Table 25 is only an example, and may be omitted during specific implementation.

For configurations shown in FIG. 34(*c*) and FIG. 34(*d*), in an implementation, whether a status of a DMRS port group that is not used by the receive end is indicated, as shown in the following Table 26, where a larger set and a smaller set may be determined based on a relative relationship between port groups that are not used by the receive end. For example, in a scenario of three port groups, when a terminal uses one port group, a larger port group and a smaller port group may be determined based on a relative relationship between (values of) maximum (or smallest) port numbers in the remaining two port groups. During specific implementation, a comparison process may not be included, and the larger and smaller port groups are directly prestored.

TABLE 26

| Value | SU/MU | Description |
| --- | --- | --- |
| 0 | SU | Non-mute |
| 1 | MU | Mute smaller set |
| 2 | MU | Mute larger set |
| 3 | MU | All-mute |

In another implementation, specific DMRS port groups that are not used by the receive end are indicated. For example, when the receive end uses a port group 1, it indicates that the port group 1 is not muted when the value is 0, it indicates that another receive end performing MU matching uses a port group 2 when the value is 1, it indicates that another receive end performing MU matching uses a port group 3 when the value is 2, and it indicates that another receive end performing MU matching uses a port group 2 and a port group 3 when the value is 3 During specific implementation, a sequence number of a port group may not be defined. A port number in a port group is used to indicate the port group. For example, the port group 2 includes ports {5, 6, 7, 8}. In this case, the port group 2 may be directly replaced with {5, 6, 7, 8} in the table, specifically as shown in Table 27.

TABLE 27

| Value | SU/MU | Description |
| --- | --- | --- |
| 0 | SU | Non-mute |
| 1 | MU | Port group 2 |
| 2 | MU | Port group 3 |
| 3 | MU | All port groups, or port group 2 and port group 3 |

In still another implementation, a multi-level indication of RRC+DCI is used as follows:

The DMRS rate matching information may be indicated by using a multi-level indication of RRC+DCI or a multi-level indication of RRC+MAC CE+DCI.

With a plurality of parameter sets including the DMRS rate matching information may be configured in RRC signaling, where the DMRS rate matching information is dynamically selected by using DCI signaling.

For example, two parameter sets are configured in the RRC signaling, and 1-bit DCI signaling is used for dynamic selection. Alternatively, four parameter sets are configured in the RRC signaling, and 2-bit DCI signaling is used for dynamic selection. Details are shown in Table 28-1 and Table 28-2.

TABLE 28-1

One bit case

| Value of 'RE mapping' field | Description |
| --- | --- |
| 0/'00' | Parameter set 1 configured by higher layers |
| 1/'01' | Parameter set 2 configured by higher layers |

TABLE 28-2

Two bits case

| Value of 'RE mapping' field | Description |
| --- | --- |
| 0/'00' | Parameter set 1 configured by higher layers |
| 1/'01' | Parameter set 2 configured by higher layers |
| 3/'10' | Parameter set 3 configured by higher layers |
| 4/'11' | Parameter set 4 configured by higher layers |

The parameter set includes the DMRS rate matching information, and the rate matching information may be expressed in a plurality of forms. For example:

The rate matching information may be four states provided in the foregoing solution, and specifically, four states corresponding to values 0, 1, 2, and 3.

The rate matching information may be state information indicating whether each CDM group is occupied. For example, CDM groups may be numbered as, for example, a DMRS CDM group 1, a DMRS CDM group 2, and a DMRS CDM group 3. During specific implementation, a state in which a CDM group is numbered may not exist, and a number of a corresponding DMRS CDM port group may be indicated by indicating a port number in a CDM group.

The rate matching information may be a specific location of a ZP DMRS, which corresponds to locations of a plurality of CDM groups (for example, a bitmap is used, where two bits for config. 1, and three bits for config. 2).

The rate matching information may be a rate matching pattern, directly indicating which REs on a DMRS symbol need to be muted. In this case, there is no concept of a CDM group.

In another implementation, in the DMRS configuration information table, the CDM group information is used to implement DMRS rate matching.

In an implementation, the RMI may be represented as the CDM group state information, for example, the column of "State of CDM group" in Table 8-1 and Table 8-2. The following provides descriptions by using an example of a specific DMRS pattern, where a port number of the specific DMRS port is only used as an example. For different port mapping orders, a DMRS port number (port index) in the following embodiment may change. This is not limited herein.

With reference to FIG. 34 (a port group in FIG. 34 is a CDM port group), for an FL DMRS configuration type 1 corresponding to Table 8-1, a state 1 (State of CDM group=1) represents that a CDM port group 1 (a part with oblique lines in FIG. 34(a) and FIG. 34(b)) is occupied, and a state 2 represents that CDM groups 1 and 2 (a part with oblique lines and a part with horizontal lines in FIG. 34(a) and FIG. 34(b)) are occupied.

For a DMRS type 2 corresponding to Table 8-2, a state 1 corresponds to that a CDM group 1 (a part with oblique lines in FIG. 34(c) and FIG. 34(d)) is occupied, a state 2 represents that CDM groups 1 and 2 (a part with oblique lines and a part with horizontal lines in FIG. 34(c) and FIG. 34(d)) are occupied, and a state 3 represents that CDM groups 1, 2, and 3 (a part with oblique lines, a part with horizontal lines, and a part with vertical lines in FIG. 34(c) and FIG. 34(d)) are occupied.

The foregoing provides only an example of a CDM group occupation state. During specific implementation, each state may be replaced with another CDM group occupation state. In addition, during specific implementation, a CDM group state (for example, State of CDM group=1, 2, and 3 in the tables) specifically indicated in Table 8-1 and Table 8-2 may be replaced with a number of an occupied CDM group (for example, a CDM group 1), or may be directly represented as all port numbers in a CDM group (for example, a CDM group 1 may be represented as port numbers 0 and 1 or 0, 1, 4, and 6) or at least one DMRS port number in an occupied CDM group (for example, a CDM group 1 may be represented as a port number 0 or port numbers 0 and 1). In addition, when the CDM group state is represented as all port numbers in a CDM group, the column of number of symbols may be omitted in Table 8-1 and Table 8-2, and a 1-symbol or 2-symbol FL DMRS pattern may be implicitly indicated by directly indicating all the port numbers in the CDM group. For example, for a 1-symbol type 1, the CDM group 1 is represented as 0 and 1, and for a 2-symbol type 1, the CDM group 1 is represented as 0, 1, 4, and 6. The receive end may implicitly obtain information about the 1-symbol DMRS or the 2-symbol DMRS based on the port numbers in the CDM group.

In another implementation, RMI information in the table may indicate a quantity of occupied CDM groups. In other words, the "State of CDM group" in Table 8-1 and Table 8-2 may be replaced with "number of CDM groups" or "number of co-scheduled CDM groups". Specific literal expression is not limited.

Table 29-1 provides an addition method corresponding to the DMRS type 1, where "number of co-scheduled CDM groups" indicates that one or two CDM groups in type 1 are occupied. In an implementation method, the number of CDM groups may be implemented based on a specific scheduling order, for example, obtained based on the current quantized quantity of orthogonal ports in the foregoing embodiment. In an implementation method, information about the number of CDM groups may directly correspond to a particular CDM group sequence number, or may be based on a specific scheduling rule. For example, for the DMRS type 1, one CDM group may correspond to that a CDM group 1 is occupied, and two CDM groups may be understood as that a CDM group 1 and a CDM group 2 are occupied. For the DMRS type 2, one CDM group may correspond to that a CDM group 1 is occupied, two CDM groups may be understood as that a CDM group 1 and a CDM group 2 are occupied, and three CDM groups may be understood as that CDM groups 1, 2, and 3 are occupied. In another implementation method, the number of CDM groups may not be bound with a CDM group sequence number. For example, for the DMRS type 1, one CDM group indicates that only one CDM group is used in the system, and the CDM group may be a CDM group 1 or a CDM group 2. The receive end may obtain a sequence number of the occupied CDM group based on a specific DMRS port number of the receive end. Two CDM groups indicate that the two CDM groups are both occupied. The receive end may use one or two of the CDM groups. If the receive end uses the CDM group 2, it can be deduced that the CDM group 1 is occupied by another receive end, thereby performing rate matching.

TABLE 29-1

Example of a DMRS port combination type 1

| | One Codeword (≤4 layers): Codeword 0 enabled, Codeword 1 disabled | | | | | Two Codewords (>4 layers): Codeword 0 enabled, Codeword 1 enabled | | | |
|---|---|---|---|---|---|---|---|---|---|
| Value | Number of co-scheduled CDM groups | UE rank | Ports | number of symbols | Value | Number of co-scheduled CDM groups | UE rank | Ports | number of symbols |
| 0 | 1 | 1 | 0 | 1 | 0 | reserved | reserved | reserved | 1 |
| 1 | 1 | 1 | 1 | 1 | 1 | reserved | reserved | reserved | 1 |
| 2 | 1 | 2 | 0-1 | 1 | 2 | reserved | reserved | reserved | 1 |
| 3 | 2 | 1 | 0 | 1 | 3 | reserved | reserved | reserved | 1 |
| 4 | 2 | 1 | 1 | 1 | 4 | reserved | reserved | reserved | 1 |
| 5 | 2 | 1 | 2 | 1 | 5 | reserved | reserved | reserved | 1 |
| 6 | 2 | 1 | 3 | 1 | 6 | reserved | reserved | reserved | 1 |
| 7 | 2 | 2 | 0-1 | 1 | 7 | reserved | reserved | reserved | 1 |
| 8 | 2 | 2 | 2-3 | 1 | 8 | reserved | reserved | reserved | 1 |
| 9 | 2 | 3 | 0-2 | 1 | 9 | reserved | reserved | reserved | 1 |
| 10 | 2 | 4 | 0-3 | 1 | 10 | reserved | reserved | reserved | 1 |
| 11 | 1 | 1 | 0 | 2 | 11 | 2 | 5 | 0-4 | 2 |
| 12 | 1 | 1 | 1 | 2 | 12 | 2 | 6 | 0-5 | 2 |
| 13 | 1 | 1 | 4 | 2 | 13 | 2 | 7 | 0-6 | 2 |
| 14 | 1 | 1 | 6 | 2 | 14 | 2 | 8 | 0-7 | 2 |
| 15 | 1 | 2 | 0-1 | 2 | 15 | reserved | reserved | reserved | 2 |
| 16 | 1 | 2 | 4, 6 | 2 | 16 | reserved | reserved | reserved | 2 |
| 17 | 1 | 3 | 0-1, 4 | 2 | 17 | reserved | reserved | reserved | 2 |
| 18 | 1 | 4 | 0-1, 4, 6 | 2 | 18 | reserved | reserved | reserved | 2 |
| 19 | 2 | 1 | 0 | 2 | 19 | reserved | reserved | reserved | 2 |
| 20 | 2 | 1 | 1 | 2 | 20 | reserved | reserved | reserved | 2 |
| 21 | 2 | 1 | 2 | 2 | 21 | reserved | reserved | reserved | 2 |
| 22 | 2 | 1 | 3 | 2 | 22 | reserved | reserved | reserved | 2 |
| 23 | 2 | 1 | 4 | 2 | 23 | reserved | reserved | reserved | 2 |
| 24 | 2 | 1 | 5 | 2 | 24 | reserved | reserved | reserved | 2 |
| 25 | 2 | 1 | 6 | 2 | 25 | reserved | reserved | reserved | 2 |
| 26 | 2 | 1 | 7 | 2 | 26 | reserved | reserved | reserved | 2 |
| 27 | 2 | 2 | 0-1 | 2 | 27 | reserved | reserved | reserved | 2 |

TABLE 29-1-continued

Example of a DMRS port combination type 1

| | One Codeword (≤4 layers): Codeword 0 enabled, Codeword 1 disabled | | | | | Two Codewords (>4 layers): Codeword 0 enabled, Codeword 1 enabled | | | |
|---|---|---|---|---|---|---|---|---|---|
| Value | Number of co-scheduled CDM groups | UE rank | Ports | number of symbols | Value | Number of co-scheduled CDM groups | UE rank | Ports | number of symbols |
| 28 | 2 | 2 | 2-3 | 2 | 28 | reserved | reserved | reserved | 2 |
| 29 | 2 | 2 | 4, 6 | 2 | 29 | reserved | reserved | reserved | 2 |
| 30 | 2 | 2 | 5, 7 | 2 | 30 | reserved | reserved | reserved | 2 |
| 31 | 2 | 3 | 0-1, 4 | 2 | 31 | reserved | reserved | reserved | 2 |
| 32 | 2 | 3 | 2-3, 5 | 2 | 32 | reserved | reserved | reserved | 2 |
| 33 | 2 | 4 | 0-1, 4, 6 | 2 | 33 | reserved | reserved | reserved | 2 |
| 34 | 2 | 4 | 2-3, 5, 7 | 2 | 34 | reserved | reserved | reserved | 2 |

In addition, in another implementation, a number of CDM groups added to the table may not include a number of CDM groups used by the receive end, in other words, a number of CDM groups that is indicated in the table and currently used in the system and that does not include a number of CDM groups used by the receive end, or may be understood as (a total number of CDM groups occupied in the system—a number of CDM groups used by the receive end). For example, for the type 1, when the system has a total of two CDM groups scheduled, and the receive end uses two CDM groups, a number of CDM groups that are not used by the receive end is 0. When the system has a total of two CDM groups scheduled, and the receive end uses one CDM group, a number of CDM groups that are not used by the receive end is 1. When the system has only one CDM group scheduled, and the receive end uses one CDM group, a number of CDM groups that are not used by the receive end is 0. In this solution, the number of CDM groups may be replaced with the number of co-scheduled CDM groups in Table D-1. For a specific table, a person skilled in the art may directly derive the table based on the foregoing principle.

In addition, power boosting information may be further added to the foregoing DMRS configuration information table. For example, a column is added to Table 29-1 to provide a specific power boosting value for each state. The specific values may be 0 dB and 3 dB for the type 1, and may be 0 dB, 1.77 dB, and 4.77 dB for the type 2. In the table, the specific power boosting value may be directly obtained, through deduction, based on a number of CDM groups occupied for a current state and port information of the receive end, where the power boosting value may have a one-to-one correspondence with the state.

A specific principle is that, for the DMRS type 1, when the receive end uses one CDM port group, and the system currently has only one CDM port group occupied, a power boosting value is 0 dB. When the receive end uses two CDM port groups, and the system currently has two CDM port groups occupied, a power boosting value is 0 dB. When the receive end uses one CDM port group, and the system currently has two CDM port groups occupied, a power boosting value is 3 dB. Table 29-2 provides an example of a corresponding DMRS type 1, and specific port scheduling and a specific number of symbols are not limited.

TABLE 29-2

Example of a DMRS port combination type 1

| | One Codeword (≤4 layers): Codeword 0 enabled, Codeword 1 disabled | | | | | Two |
|---|---|---|---|---|---|---|
| Value | Number of co-scheduled CDM groups | UE rank | Ports | number of symbols | Power boosting value | code-words ... |
| X1 | 1 | 1 | 0 | 1 or 2 | 0 dB | ... |
| X2 | 2 | 1 | 0 | 1 or 2 | 3 dB | ... |
| X3 | 2 | 3 | 0, 1, 2 | 1 or 2 | 0 dB | ... |

For the DMRS type 2, when the receive end uses one CDM port group, and the system currently has only one CDM port group occupied, a power boosting value is 0 dB. When the receive end uses two CDM port groups, and the system currently has two CDM port groups occupied, a power boosting value is 0 dB. When the receive end uses one CDM port group, and the system currently has two CDM port groups occupied, a power boosting value is 1.77 dB. When the receive end uses one CDM port group, and the system currently has three CDM port groups occupied, a power boosting value is 4.77 dB. Herein, in a case of an MU, one receive end is limited to invoke only a maximum of four ports in one CDM group. In other words, in the case of the MU, one receive end can occupy only a maximum of one CDM group. Table 29-3 provides an example of a corresponding DMRS type 2, and specific port scheduling and a specific number of symbols are not limited.

TABLE 29-3

Example of a DMRS port combination type 2

| | One Codeword (≤4 layers): Codeword 0 enabled, Codeword 1 disabled | | | | | Two |
|---|---|---|---|---|---|---|
| Value | Number of co-scheduled CDM groups | UE rank | Ports | number of symbols | Power boosting value | code-words ... |
| X1 | 1 | 1 | 0 | 1 or 2 | 0 dB | ... |
| X2 | 2 | 4 | 0, 1, 2, 3 | 1 or 2 | 0 dB | ... |
| X3 | 2 | 2 | 0, 1 | 1 or 2 | 1.77 dB | ... |
| X4 | 3 | 2 | 0, 1 | 1 or 2 | 4.77 dB | ... |

Embodiment 9

This embodiment is used to resolve a DMRS rate matching problem in a non-coherent joint transmission (NC-JT 2 PDCCH) scenario.

Figure 35:
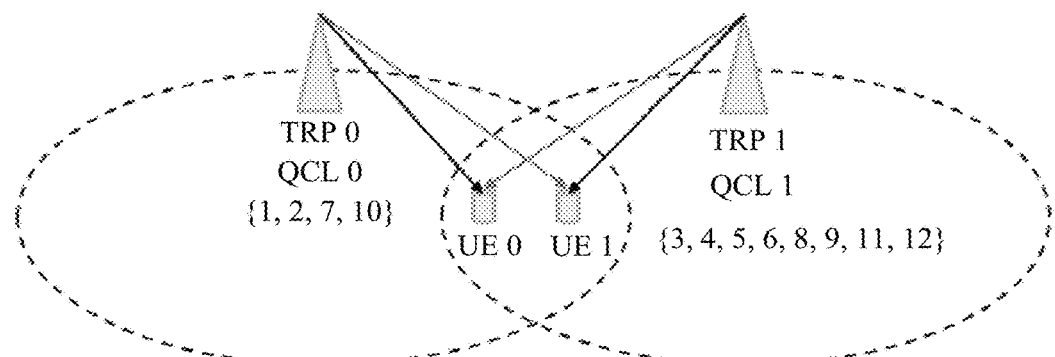
FIG. 35 is another schematic application scenario diagram of a DMRS indicating and receiving method according to an embodiment of this application.

As shown in FIG. 35, in such a multi-TRP, NC-JT, and 2-PDCCH scenario, 12 ports are supported, where a TRP 0 uses {1, 2, 7, 10}, and a TRP 1 uses {3, 4, 5, 6, 8, 9, 11, 12}.

Figure 36:
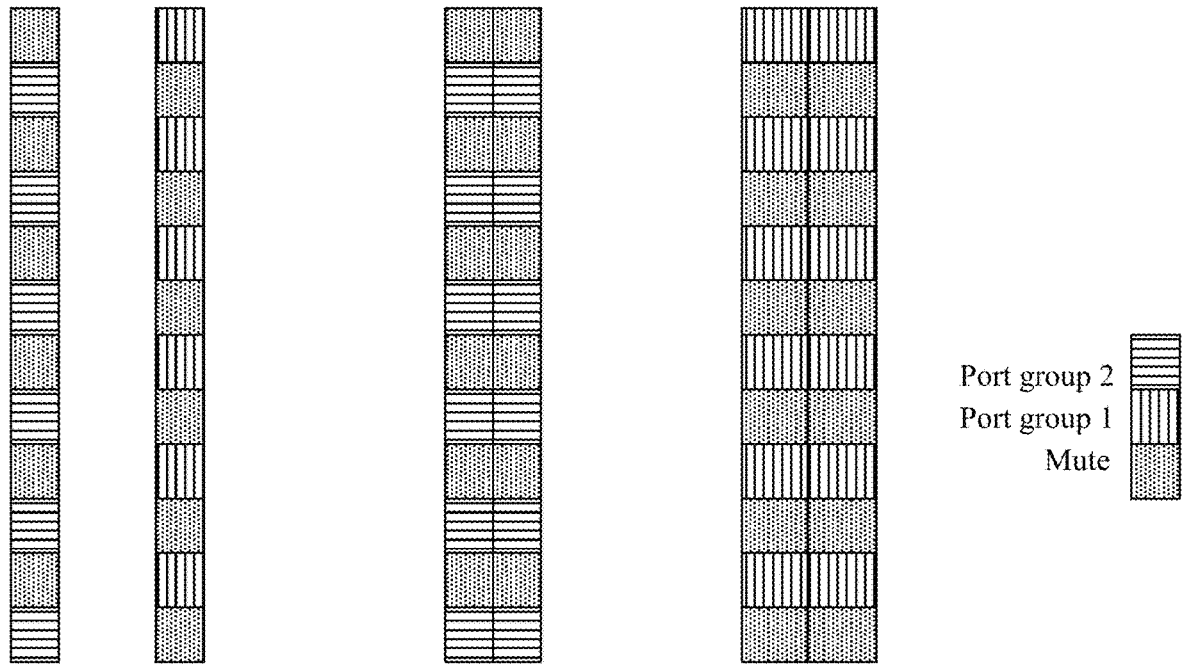
FIG. 36 is another schematic diagram of a correspondence between indication information and a pattern in a DMRS indicating and receiving method according to an embodiment of this application.

This embodiment provides a solution that is a protocol-default solution: A TRP defaults that an RE location corresponding to a DMRS that is in one or more QCL groups and that is not used by the TRP is muted. For example, for a DMRS pattern shown in FIG. 36, to be specific, two DMRS port groups, two TRPs each mute a time-frequency resource location corresponding to a DMRS port group that is not used by the TRP. Therefore, this solution can directly resolve the problem without extra signaling indication.

Figure 37:
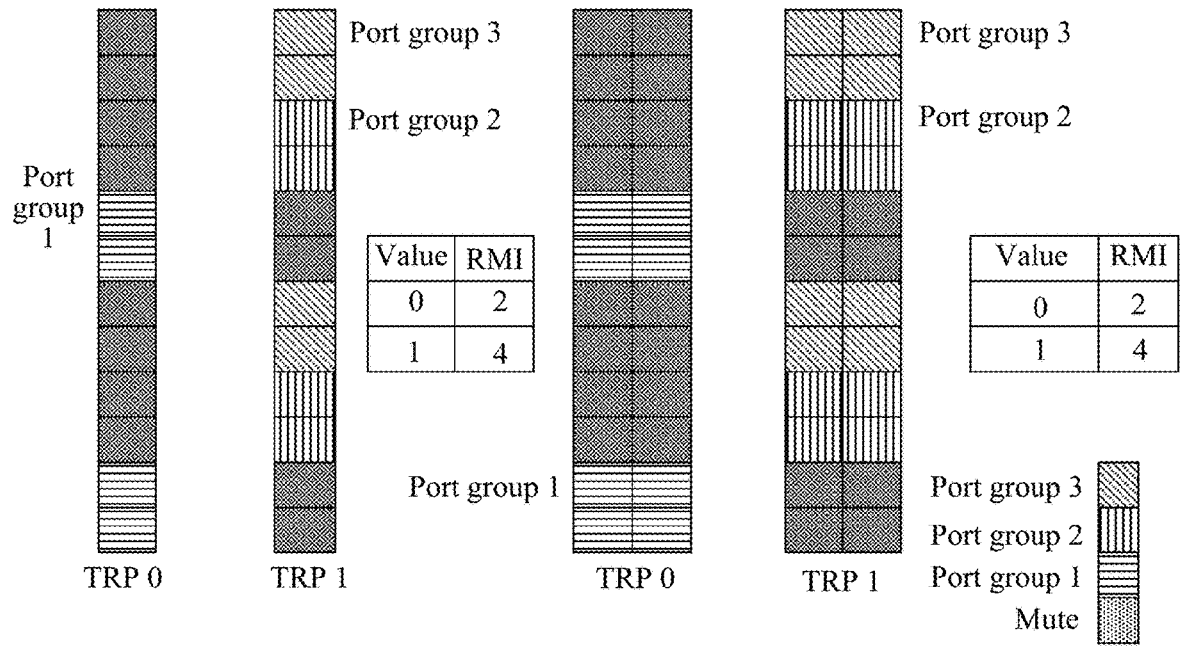
FIG. 37 is another schematic diagram of a correspondence between indication information and a pattern in a DMRS indicating and receiving method according to an embodiment of this application.

Another solution is an independent indication solution, as shown in FIG. 37. A TRP mutes, by default, an RE location corresponding to a DMRS that is in one or more QCL groups and that is not used by the TRP. In addition, for a TRP having a plurality of port groups, the TRP sends an RM signaling to UE, where the rate matching signaling may be applicable based on the solution that is previously described. It should be noted that, in this case, the rate matching signaling is generated based on a DMRS port available for the current TRP, a maximum supported layer quantity, or a DMRS pattern corresponding to a DMRS port available for the TRP. The UE completes rate matching based on the rate matching signaling previously received by the UE. The solution may be the solution used in the foregoing embodiment. Herein, only one DMRS pattern is used as an example. For different DMRS patterns, corresponding RM signaling may be used.

For example, in FIG. 37, a TRP 0 can use only a DMRS port group 1, and a TRP 1 may use DMRS port groups 2 and 3. In this case, the TRP 0 mutes time-frequency resources corresponding to the DMRS port groups 2 and 3, and the TRP 1 mutes a time-frequency resource corresponding to the DMRS port group 1. In addition, a terminal receives rate matching signaling from the TRP 1, where the signaling indicates a total quantized quantity of orthogonal transmission layers of the port groups 2 and 3, in other words, a quantized quantity of orthogonal transmission layers of DMRS ports available for the TRP 1. In this case, the TRP 0 may not have rate matching signaling, or rate matching signaling may be used to send a state representing an SU. The terminal receives the rate matching signaling of the TRP 1, completes rate matching, and demodulates data sent by the TRP 1.

It should be noted that in this embodiment, the indication information may also be used to indicate a DMRS port group that is not used by a receive end. For example, when the TRP 0 enters an NC-JT mode, no signaling is required for indication, or original signaling is used for indication. For the TRP 1, the following table is used for indication. When a value is 0, it indicates that a DMRS port group that is not used by the TRP 1 is muted. When a value is 1, DMRS port groups that are not used by the TRP 1 are all muted. Details are shown in Table 30.

TABLE 30

| Value | Description |
|---|---|
| 0 | non-mute |
| 1 | all-mute |

Embodiment 10

Embodiment 10 is applicable to a dynamic TDD scenario or a flexible duplex scenario.

Figure 38:
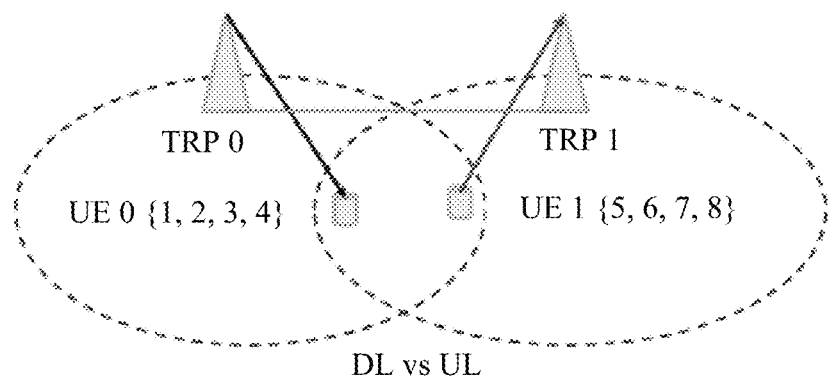
FIG. 38 is a schematic scenario diagram of a DMRS indicating and receiving method according to an embodiment of this application.

As shown in FIG. 38, in the dynamic TDD scenario, 12 ports are supported, where a TRP 0 uses DMRS ports {1, 2, 3, 4} and a TRP 1 uses DMRS ports {5, 6, 7, 8}.

Figure 39:
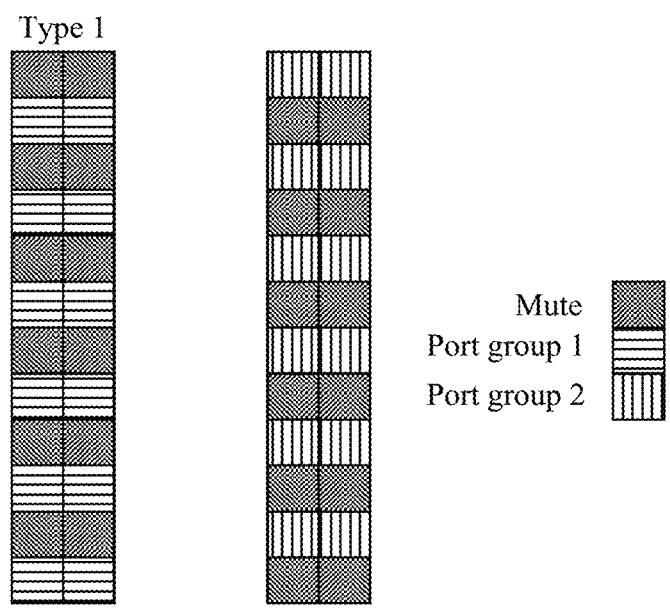
FIG. 39 is another schematic diagram of a correspondence between indication information and a pattern in a DMRS indicating and receiving method according to an embodiment of this application.

This embodiment provides a solution that is a protocol-default solution: A TRP defaults that an RE location corresponding to a DMRS that is in one or more QCL groups and that is not used by the TRP is muted. For example, for a DMRS pattern, to be specific, two DMRS port groups, shown in FIG. 39, a TRP 0 and a TRP 1 each use one DMRS port group, and mute a time-frequency resource location corresponding to a DMRS port group that is not used by the TRP. Therefore, this solution can directly resolve the problem without extra signaling indication.

Figure 40:
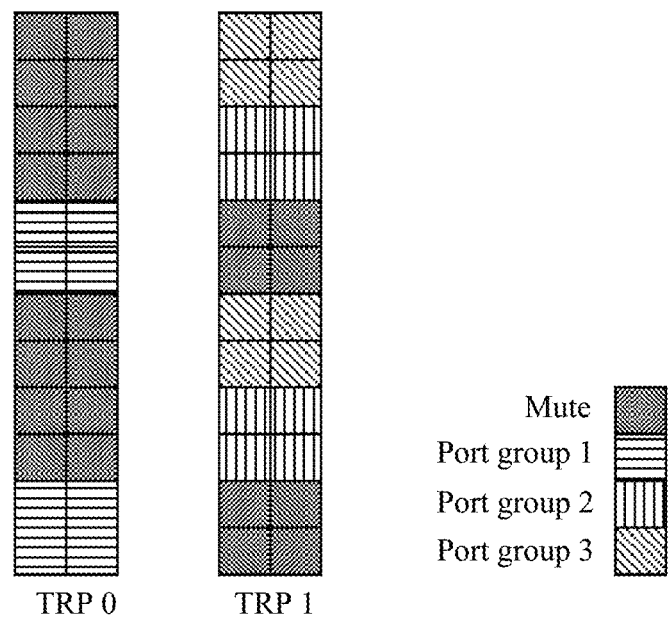
FIG. 40 is another schematic diagram of a correspondence between indication information and a pattern in a DMRS indicating and receiving method according to an embodiment of this application.

Another solution is an independent indication solution, as shown in FIG. 40. A TRP mutes, by default, an RE location corresponding to a DMRS that is in one or more QCL groups and that is not used by the TRP. In addition, for a TRP having a plurality of port groups, the TRP sends an RM signaling to UE, where the rate matching signaling may be applicable based on the solution that is previously described. It should be noted that, in this case, the rate matching signaling may be generated based on a DMRS port available for the current TRP or a DMRS pattern corresponding to an available DMRS port. The UE completes rate matching based on the rate matching signaling previously received by the UE. The solution may be the solution used in the foregoing embodiment. Herein, only one DMRS pattern is used as an example. For different DMRS patterns, corresponding RM signaling may be used.

For example, in FIG. 40, a TRP 0 can use only a DMRS port group 1, and a TRP 1 may use DMRS port groups 2 and 3. In this case, the TRP 0 mutes locations corresponding to the DMRS port groups 2 and 3, and the TRP 1 mutes a location corresponding to the DMRS port group 1. In addition, a terminal receives rate matching signaling from the TRP 1, where the signaling indicates a quantized quantity of orthogonal transmission layers of the DMRS port groups 2 and 3, in other words, a quantized quantity of orthogonal transmission layers of the TRP 1. In this case, the TRP 0 may not have rate matching signaling, or rate matching signaling may be used to send a state representing an SU. The terminal receives the rate matching signaling of the TRP 1, completes rate matching, and demodulates data sent by the TRP 1.

It should be noted that in this embodiment, the indication information may also be used to indicate a DMRS port group that is not used by a receive end. For example, when the TRP 0 enters an NC-JT mode, no signaling is required for indication, or original signaling is used for indication. For the TRP 1, the following table is used for indication. When a value is 0, it indicates that a DMRS port group that is not used by the TRP 1 is muted. When a value is 1, DMRS port groups that are not used by the TRP 1 are all muted. Details are shown in Table 31.

TABLE 31

| Value | Description |
|---|---|
| 0 | non-mute |
| 1 | all-mute |

The foregoing describes the solutions provided in the embodiments of this application mainly from the perspective of interaction between network elements. It may be understood that to implement the foregoing functions, the foregoing various network elements such as the base station or the terminal include hardware structures and/or software modules corresponding to the various functions. A person of ordinary skill in the art should be easily aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed on the base station or the terminal according to the examples of the methods. For example, various functional modules may be divided based on the corresponding functions, or two or more functions may be integrated into one processing module. The integrated module may be implemented in a form of hardware, or may be implemented in a form of a software functional module. It should be noted that, in this embodiment of this application, module division is an example, and is merely a logical function division. During actual implementation, another division manner may be used. The following descriptions are made by using an example in which function modules are divided corresponding to functions.

Figure 41:
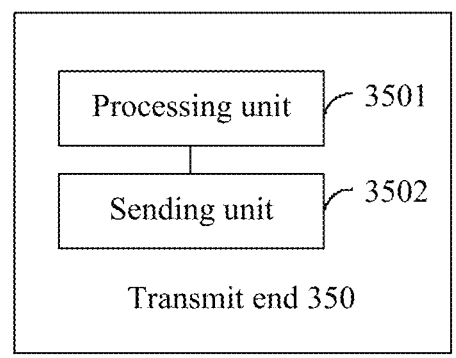
FIG. 41 is a schematic block diagram of a transmit end according to an embodiment of this application.

FIG. 41 is a schematic structural diagram of a transmit end 350. The transmit end 350 may be the base station 100 or the terminal 200 in the foregoing descriptions. The transmit end 350 may include a processing unit 3501 and a sending unit 3502. The processing unit 3501 may be configured to: perform S101 in FIG. 6, to be specific, selecting DMRS configuration information from a plurality of groups of DMRS configuration information tables, and obtaining DMRS indication information based on the DMRS configuration information; or perform S201 in FIG. 21, to be specific, generating demodulation reference signal DMRS indication information, where the DMRS indication information corresponds to a maximum supported port quantity, a DMRS pattern, or a DMRS configuration type; and/or configured to support another process in the technology described in this specification. The sending unit 3502 may be configured to perform S102 in FIG. 6 or S202 in FIG. 21 of sending, by the transmit end, DMRS related information or the DMRS indication information on a time-frequency resource; and/or configured to support another process in the technology described in this specification. All related content of the steps in the foregoing method embodiments may be referred for the functional descriptions of the corresponding functional modules. Details are not described herein again.

Figure 42:
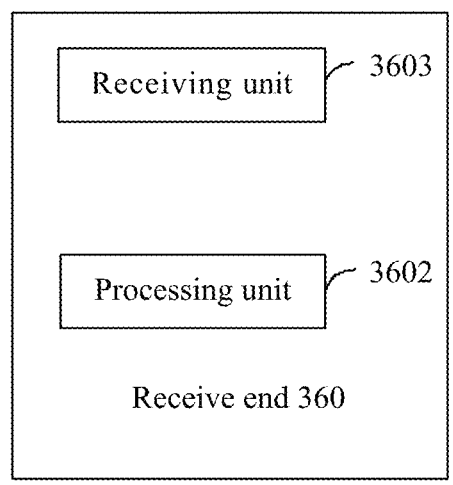
FIG. 42 is a schematic block diagram of a receive end according to an embodiment of this application.

FIG. 42 is a schematic structural diagram of a receive end 360. The receive end 360 may include a processing unit 3602 and a receiving unit 3603. The receive end 360 may be the terminal 200 or the base station 100 in the foregoing descriptions. The receiving unit 3603 is configured to: perform S103 in FIG. 6 of receiving, by the receive end, DMRS indication information, or perform S203 in FIG. 21 of receiving, by the receive end, the DMRS indication information; and/or perform an action of receiving any information by the receive end in the embodiments of this application. The processing unit 3602 may be configured to: perform S104 in FIG. 6, to be specific, performing channel estimation or assisting data demodulation based on the received DMRS indication information, or perform S204 in FIG. 21, to be specific, obtaining rate matching information based on the DMRS indication information, and demodulating data on a resource on which no DMRS is transmitted based on the DMRS indication information, and demodulating data on a resource on which no DMRS is transmitted; and/or configured to support another process in the technology described in this specification. All related content of the steps in the foregoing method embodiments may be referred for the functional descriptions of the corresponding functional modules. Details are not described herein again. For example, in a specific implementation process, it may be understood as that the receive end 360 first obtains a symbol carried on each RE (for example, obtains a symbol carried on each OFDM symbol and each subcarrier), for example, but not limited to, through inverse fast Fourier transform (IFFT), and then obtains a DMRS from the obtained symbol based on a time-frequency resource on which the DMRS is located.

In this embodiment of this application, the transmit end 350 and the receive end 360 are presented in forms of functional modules divided based on functions, or presented in forms of functional modules divided through integration. Herein, the "module" may refer to an application-specific integrated circuit (ASIC), a processor and a memory executing one or more software or firmware programs, an integrated logic circuit, and/or another component that can provide the foregoing functions, where the processor and the memory may be integrated together or may exist independently.

Figure 43:
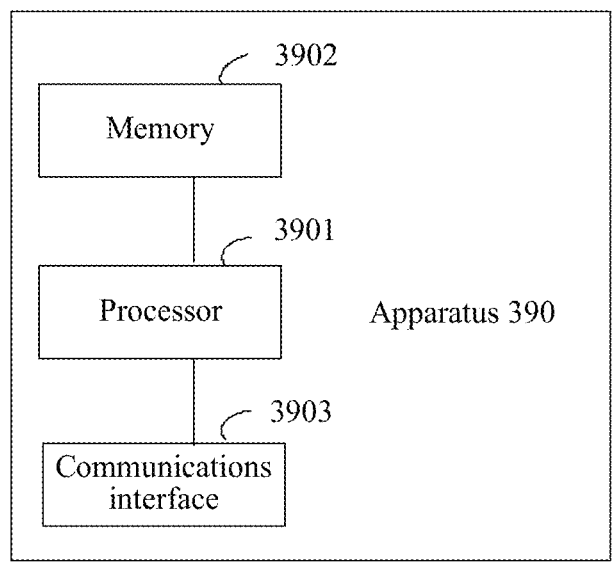
FIG. 43 is a schematic diagram of a transmit end or a receive end according to an embodiment of this application.

In a simple embodiment, a person skilled in the art may be aware that either the transmit end 350 or the receive end 360 is implemented in a structure shown in FIG. 43.

As shown in FIG. 43, an apparatus 390 may include a memory 3902, a processor 3901, and a communications interface 3903. The memory 3902 is configured to store a computer executable instruction. When the apparatus 390 runs, the processor 3901 executes the computer executable instruction stored in the memory 3902, so that the apparatus 390 performs the DMRS indication method and the DMRS receiving method provided in the embodiments of this application. For the DMRS indication method and the DMRS receiving method, refer to the foregoing descriptions and related descriptions in the accompanying drawings, and details are not described herein again. The communications interface 3903 may be a transceiver.

Optionally, the apparatus 390 may be a field-programmable gate array (field-programmable gate array, FPGA), an application-specific integrated circuit (application-specific integrated circuit, ASIC), a system on chip (SoC), a central processor unit (CPU), a network processor (NP), a digital signal processor (DSP), or a micro controller unit (MCU), or a programmable logic device (PLD) or another integrated chip may be used.

An embodiment of this application further provides a storage medium. The storage medium may include the memory 3902.

According to a first aspect of the embodiments of the present invention, a data sending method is provided. The method is used for sending a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. The plurality of DMRS ports are allocated to at least two transmit-end devices, and DMRS ports allocated to each transmit-end device belong to a same port group. The method includes the following designs.

In a possible design, each transmit-end device maps a codeword to a data stream corresponding to a DMRS port allocated to the transmit-end device; and each transmit-end device sends, to the receive-end device, the data stream corresponding to the DMRS port allocated to the transmit-end device.

In a possible design, the at least two transmit-end devices are at least two antenna panels of a same transmit-end device; the mapping, by each transmit-end device, a codeword to a data stream corresponding to a DMRS port allocated to the transmit-end device is specifically: mapping, by the same transmit-end device for each antenna panel, a codeword to a data stream corresponding to a DMRS port allocated to the antenna panel; and the sending, by each transmit-end device to the receive-end device, the data stream corresponding to the DMRS port allocated to the transmit-end device is specifically: sending, by each antenna panel to the receive-end device, the data stream corresponding to the DMRS port allocated to the antenna panel.

In a possible design, before the mapping, by each transmit-end device, a codeword to a data stream corresponding to a DMRS port allocated to the transmit-end device, the method further includes: sending, by one of the at least two transmit-end devices, indication information to the receive-end device, where the indication information is used to indicate the plurality of DMRS ports allocated to the receive-end device.

In a possible design, before the mapping, by each transmit-end device, a codeword to a data stream corresponding to a DMRS port allocated to the transmit-end device, the method further includes: sending, by the same transmit-end device, indication information to the receive-end device, where the indication information is used to indicate the plurality of DMRS ports allocated to the receive-end device.

In various aspects and possible designs of this embodiment of the present invention, a quantity of the plurality of data streams (in other words, a quantity of the plurality of DMRS ports) is less than or equal to 4, but may not be limited thereto. For example, the technical solution provided in this embodiment of the present invention may be applied to a scenario in which a quantity of data streams is less than or equal to 4, but is not applied to a scenario in which a quantity of data streams is greater than 4. Further, in the scenario in which the quantity of data streams is less than or equal to 4, the technical solution provided in this embodiment of the present invention may be applied to a scenario in which the quantity of data streams is 3 and/or 4 (in other words, the quantity of the plurality of data streams is 3 and/or 4), but is not applied to a scenario in which the quantity of the plurality of data streams is 4. Certainly, the technical solution provided in this embodiment of the present invention may not be limited to the foregoing scenarios.

According to a second aspect of the embodiments of the present invention, a data receiving method is provided. The method includes: receiving a plurality of data streams through a plurality of DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship; and restoring, by a receive-end device for each of the at least two port groups, a codeword based on a data stream corresponding to a DMRS port that is in the plurality of DMRS ports and that is in the port group.

In a possible design, before the receiving a plurality of data streams, the method further includes: receiving indication information, where the indication information is used to indicate the plurality of DMRS ports.

In a possible design, a quantity of the plurality of data streams (in other words, a quantity of the plurality of DMRS ports) is less than or equal to 4, but may not be limited thereto. For example, the technical solution provided in this embodiment of the present invention may be applied to a scenario in which a quantity of data streams is less than or equal to 4, but is not applied to a scenario in which a quantity of data streams is greater than 4. Further, in the scenario in which the quantity of data streams is less than or equal to 4, the technical solution provided in this embodiment of the present invention may be applied to a scenario in which the quantity of data streams is 3 and/or 4 (in other words, the quantity of the plurality of data streams is 3 and/or 4), but is not applied to a scenario in which the quantity of the plurality of data streams is 4. Certainly, the technical solution provided in this embodiment of the present invention may not be limited to the foregoing scenarios.

According to a third aspect of the embodiments of the present invention, a data receiving method is provided. The method includes: receiving a plurality of data streams through a plurality of DMRS ports, where the plurality of DMRS ports belong to a same port group, and DMRS ports in the port group satisfy a quasi co-location QCL relationship; and restoring a codeword based on the plurality of data streams.

In a possible design, before the receiving a plurality of data streams, the method further includes: receiving indication information, where the indication information is used to indicate the plurality of DMRS ports.

In a possible design, a quantity of the plurality of data streams is less than or equal to 4.

In the foregoing various aspects and possible designs, the indication information is downlink control information DCI.

The data stream is also referred to as a data layer.

According to a fourth aspect of the embodiments of the present invention, a transmit-end device is provided. The transmit-end device is configured to send, together with at least one other transmit-end device, a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. The plurality of DMRS ports are allocated to the transmit-end device and the at least one other transmit-end device, DMRS ports allocated to the transmit-end device and each of the at least one other transmit-end device belong to a same port group. The transmit-end device includes: a mapping module, configured to map a codeword to a data stream corresponding to a DMRS port allocated to the transmit-end device; and a transmitting module, configured to send, to the receive-end device, the data stream corresponding to the DMRS port allocated to the transmit-end device.

In a possible design, the transmit-end device and the at least one other transmit-end device are at least two antenna panels of a same transmit-end device; the mapping module is disposed in the same transmit-end device, and the mapping module is specifically configured to map, for each antenna panel, a codeword to a data stream corresponding to a DMRS port allocated to the antenna panel; and the transmitting module is disposed in the same transmit-end device, and the transmitting module is specifically configured to: send, by each antenna panel to the receive-end device, the data stream corresponding to the DMRS port allocated to the antenna panel.

In a possible design, the transmitting module is further configured to send indication information to the receive-end device, where the indication information is used to indicate the plurality of DMRS ports allocated to the receive-end device.

In a possible design, a quantity of the plurality of data streams is less than or equal to 4.

According to a fifth aspect of the embodiments of the present invention, a receive-end device is provided. The receive-end device includes: a receiving module, configured to receive a plurality of data streams through a plurality of DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship; and a restoration module, configured to restore, for each of the at least two port groups, a codeword based on a data stream corresponding to a DMRS port that is in the plurality of DMRS ports and that is in the port group.

In a possible design, the receiving module is further configured to receive indication information, where the indication information is used to indicate the plurality of DMRS ports.

In a possible design, a quantity of the plurality of data streams is less than or equal to 4.

According to a sixth aspect of the embodiments of the present invention, a receive-end device is provided. The receive-end device includes: a receiving module, configured to receive a plurality of data streams through a plurality of DMRS ports, where the plurality of DMRS ports belong to a same port group, and DMRS ports in the port group satisfy a quasi co-location QCL relationship; and a restoration module, configured to restore a codeword based on the plurality of data streams.

In a possible design, the receiving module is further configured to receive indication information, where the indication information is used to indicate the plurality of DMRS ports.

In a possible design, a quantity of the plurality of data streams is less than or equal to 4.

In the foregoing various aspects and designs of the embodiments of the present invention, the indication information may be downlink control information DCI.

According to a seventh aspect of the embodiments of the present invention, a data sending method is provided. The method is used for sending a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. The plurality of DMRS ports are allocated to a same transmit-end device. For each port group, the method includes: mapping, by the transmit-end device, a codeword to a data stream corresponding to a DMRS port that is in the plurality of DMRS ports and that is in the port group; and sending, by the transmit-end device, the data stream to the receive-end device.

In a possible design, the method further includes: sending, by the transmit-end device, indication information to the receive-end device, where the indication information is used to indicate the plurality of DMRS ports allocated to the receive-end device.

In a possible design, a quantity of the plurality of data streams is less than or equal to 4.

According to an eighth aspect of the embodiments of the present invention, a transmit-end device is provided. The transmit-end device is configured to send a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. The plurality of DMRS ports are allocated to the transmit-end device. The transmit-end device includes: a mapping module, configured to map, for each port group, a codeword to a data stream corresponding to a DMRS port that is in the plurality of DMRS ports and that is in the port group; and a transmitting module, configured to send the data stream to the receive-end device.

In a possible design, the method further includes: the transmitting module is further configured to send indication information to the receive-end device, where the indication information is used to indicate the plurality of DMRS ports allocated to the receive-end device.

In a possible design, a quantity of the plurality of data streams is less than or equal to 4.

To sum up, the embodiments of the present invention provide a data sending method. The method is used for sending a plurality of data streams to a receive-end device through a plurality of demodulation reference signal DMRS ports, where the plurality of DMRS ports belong to at least two port groups, DMRS ports in each port group satisfy a quasi co-location QCL relationship, and any DMRS port in each port group and any DMRS port in any other port group satisfy a non-quasi co-location Non-QCL relationship. For each port group, the method includes: mapping a codeword into a data stream corresponding to a DMRS port that is in the plurality of DMRS ports and that is in the port group; and sending the data stream to the receive-end device.

In a possible design, the method further includes: sending indication information to the receive-end device, where the indication information is used to indicate the plurality of DMRS ports allocated to the receive-end device.

In a possible design, a quantity of the plurality of data streams is less than or equal to 4.

In a possible design, the plurality of DMRS ports may be allocated to a same transmit-end device; or may be allocated to a plurality of antenna panels of a same transmit-end device, where DMRS ports allocated to each antenna panel belong to a same port group; or may be allocated to a plurality of transmit-end devices serving a same receive-end device (for example, based on a coordinated multi-point (CoMP) related technology), where DMRS ports allocated to each transmit-end device belong to a same port group. In addition, the DMRS ports may alternatively be allocated to one or more transmit-end devices in another manner, for example, but not limited to, various feasible combinations of the foregoing several manners.

Correspondingly, an embodiment of the present invention further provides a data receiving method, including: receiving a plurality of data streams through a plurality of DMRS ports, where the plurality of DMRS ports belong to a same port group or at least two port groups, DMRS ports in each port group satisfy a quasi co-location QCL relationship, and any DMRS port in each port group and any DMRS port in any other port group satisfy a non-quasi co-location Non-QCL relationship; and restoring, by a receive-end device for the same port group or each of the at least two port groups, a codeword based on a data stream corresponding to a DMRS port that is in the plurality of DMRS ports and that is in the port group.

In a possible design, before the receiving a plurality of data streams, the method further includes: receiving indication information, where the indication information is used to indicate the plurality of DMRS ports.

A quantity of the plurality of data streams is less than or equal to 4.

It is easily understood that, on a side of the receive-end device, the receive-end device may not need to be concerned about whether the plurality of DMRS ports come from a same transmit-end device, a plurality of antenna panels of a same transmit-end device, or a plurality of transmit-end devices.

Quasi co-location (QCL) is usually used to describe similar large-scale fading, similar spatial directions (for example, but not limited to, beam directions), and the like. Therefore, non-quasi co-location (Non-QCL) is usually used to describe different large-scale fading, different spatial directions, and the like. Related content of the QCL and the non-QCL has been clearly described in the prior art, and therefore, is not described herein.

During actual transmission, an information bit is usually divided in a form of a transport block (TB), and a transport block may be a codeword (CW). For content related to the TB and the CW, refer to the prior art.

Usually, DMRS ports supported by a system may be grouped into a plurality of port groups, DMRS ports in each port group satisfy a QCL relationship, and any DMRS port in each port group and any DMRS port in any other port group satisfy a non-QCL relationship. When a plurality of transmit-end devices serve a same receive-end device, DMRS ports allocated to each transmit-end device come from a same port group. For example, DMRS ports 0 to 9 may be grouped into two port groups, namely, a port group 1 and a port group 2, where the DMRS ports 0 to 4 belong to the port group 1, and the DMRS ports 5 to 9 belong to the port group 2. When DMRS ports are allocated to a transmit-end device, any quantity of DMRS ports in the port group 1 may be allocated to the transmit-end device, or any quantity of DMRS ports in the port group 2 may be allocated to the transmit-end device. In addition, regardless of whether a receive-end device is served by a plurality of transmit-end devices or a single transmit-end device, DMRS ports allocated to a same transmit-end device may come from a same port group or from different port groups. For example, when the DMRS ports come from a same port group, the port 1 and the port 2 in the port group 1 may be allocated to the transmit-end device. When the DMRS ports come from different port groups, the ports 2 and 3 in the port group 1 and the ports 8 and 9 in the port group 2 may be allocated to the transmit-end device. It is easily understood that, when DMRS ports allocated to a same transmit-end device come from different port groups, wireless transmission performed by the transmit-end device through the DMRS ports in the different port groups has a non-QCL characteristic, for example, has different large-scale fading, different spatial directions, or the like. When DMRS ports allocated to a same transmit-end device come from a same port group, wireless transmission performed by the transmit-end device through the DMRS ports in the same port group has a QCL characteristic, for example, has similar large-scale fading, similar spatial directions, or the like.

For related content of grouping DMRS ports into a plurality of port groups, refer to the prior art. For example, a grouping status may be preset in the transmit-end device and the receive-end device before delivery, or the transmit-end device may notify the receive-end device of a grouping status of DMRS ports. For example, but not limited to that, the transmit-end device notifies the receive-end device of the grouping status by using a Radio Resource Control (RRC) message, for example, but not limited to, periodically or when the receive-end device accesses a communications network. When DMRS ports are grouped into a plurality of port groups, a DMRS port may be allocated to the transmit-end device based on a grouping status and a specific requirement (for example, various application scenarios, such as CoMP).

The plurality of transmit-end devices may be a plurality of transmit-end devices, or may be a plurality of antenna panels of a same transmit-end device. The transmit-end device may be, for example, but not limited to, a base station. The receive-end device may be, for example, but not limited to, a terminal.

For the process of mapping the codeword to the data stream and the process of restoring the codeword from the data stream, refer to the prior art.

When the plurality of transmit-end devices serve a same receive-end device, the indication information may be sent by one of the plurality of transmit-end devices. In this case, the transmit-end device sending the indication information may be referred to as a serving device, and other transmit-end devices may be referred to as coordinating devices.

The data stream may also be referred to as a data layer, and usually, may be obtained by performing layer mapping on a codeword. For a specific process, refer to the prior art.

The steps in the foregoing method may be performed by one or more processors, or may be performed by one or more processors executing a program.

Functions of the modules of the transmit-end device and the receive-end device may be performed by one or more processors, or may be performed by one or more processors executing a program.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the appended claims, and is considered as covering any and all modifications, variations, combinations, or equivalents within the scope of this application. Obviously, a person skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. A demodulation reference signal (DMRS) receiving method carried out by a receive end, the method comprising:
   receiving a DMRS indication information that indicates a code division multiplexing (CDM) group information of an antenna port, wherein the CDM group information comprises a number of CDM groups; and
   assisting in demodulating a data based on the DMRS indication information,
   wherein the number of CDM groups is a number of CDM groups that have a possibility of being occupied or co-scheduled in a system and that are not used for transmitting data; and
   wherein a value is assigned for the number of CDM groups as follows:
      a value of 1 for the number of CDM groups indicates that a CDM group 1 is occupied or co-scheduled;
      a value of 2 for the number of CDM groups indicates that a CDM group 1 and a CDM group 2 are occupied or co-scheduled; and
      a value of 3 for the number of CDM groups indicates that a CDM group 1, a CDM group 2, and a CDM group 3 are occupied or co-scheduled.

2. The method according to claim 1, wherein a DMRS configuration information corresponding to a current DMRS transmission scheme is determined from a plurality of groups of DMRS configuration information, and the DMRS indication information is obtained based on the DMRS configuration information, wherein each group of DMRS configuration information comprises a plurality of pieces of DMRS configuration information.

3. The method according to claim 1, wherein a DMRS configuration information comprises a DMRS symbol information.

4. The method according to claim 3, wherein in the DMRS configuration information, specific DMRS port mapping rules of a DMRS type 1 and a DMRS type 2 are as follows:
   for a 1-symbol DMRS type 1, ports comprised in a CDM group 1 are {0, 1}, and ports comprised in a CDM group 2 are {2, 3};
   for a 2-symbol DMRS type 1, ports comprised in the CDM group 1 are {0, 1, 4, 5}, and ports comprised in the CDM group 2 are {2, 3, 6, 7};
   for a 1-symbol DMRS type 2, ports comprised in the CDM group 1 are {0, 1}, ports comprised in the CDM group 2 are {2, 3}, and ports comprised in the CDM group 3 are {4, 5}; and
   for a 2-symbol DMRS type 2, ports comprised in the CDM group 1 are {0, 1, 6, 7}, ports comprised in the CDM group 2 are {2, 3, 8, 9}, and ports comprised in the CDM group 3 are {4, 5, 10, 11}.

5. The method according to claim 4, wherein in the DMRS configuration information corresponding to the DMRS type 1, a correspondence between a number of CDM groups, a port, and a number of symbols satisfies a correspondence shown by one or more rows in the following table:

| One Codeword (≤4 Layers) | | | | | Two Codewords (>4 Layers) | | | | |
|---|---|---|---|---|---|---|---|---|---|
| Value | RMI (number of co-scheduled CDM groups) | UE Rank | Port | number of symbols | Value (value) | RMI (number of co-scheduled CDM groups) | UE Rank | ports | number of symbols |
| 0 | 1 | 1 | 0 | 1 | 0 | Reserved | reserved | reserved | 1 |
| 1 | 1 | 1 | 1 | 1 | 1 | Reserved | reserved | reserved | 1 |
| 2 | 1 | 2 | 0, 1 | 1 | 2 | Reserved | reserved | reserved | 1 |
| 3 | 2 | 1 | 0 | 1 | 3 | Reserved | reserved | reserved | 1 |
| 4 | 2 | 1 | 1 | 1 | 4 | Reserved | reserved | reserved | 1 |
| 5 | 2 | 1 | 2 | 1 | 5 | Reserved | reserved | reserved | 1 |
| 6 | 2 | 1 | 3 | 1 | 6 | Reserved | reserved | reserved | 1 |
| 7 | 2 | 2 | 0, 1 | 1 | 7 | Reserved | reserved | reserved | 1 |
| 8 | 2 | 2 | 2, 3 | 1 | 8 | Reserved | reserved | reserved | 1 |
| 9 | 2 | 3 | 0-2 | 1 | 9 | Reserved | reserved | reserved | 1 |
| 10 | 2 | 4 | 0-3 | 1 | 10 | Reserved | reserved | reserved | 1 |
| 11 | 1 | 1 | 0 | 2 | 11 | 2 | 5 | 0-2, 4, 5 | 2 |
| 12 | 1 | 1 | 1 | 2 | 12 | 2 | 6 | 0-5 | 2 |
| 13 | 1 | 1 | 4 | 2 | 13 | 2 | 7 | 0-6 | 2 |
| 14 | 1 | 1 | 5 | 2 | 14 | 2 | 8 | 0-7 | 2 |

-continued

| One Codeword (≤4 Layers) | | | | Two Codewords (>4 Layers) | | | | |
|---|---|---|---|---|---|---|---|---|
| Value | RMI (number of co-scheduled CDM groups) | UE Rank | Port | number of symbols | Value (value) | RMI (number of co-scheduled CDM groups) | UE Rank | ports | number of symbols |
| 15 | 1 | 2 | 0, 1 | 2 | 15 | Reserved | reserved | reserved | 2 |
| 16 | 1 | 2 | 4-5 | 2 | 16 | Reserved | reserved | reserved | 2 |
| 17 | 1 | 3 | 0, 1, 4 | 2 | 17 | Reserved | reserved | reserved | 2 |
| 18 | 1 | 4 | 0, 1, 4, 5 | 2 | 18 | Reserved | reserved | reserved | 2 |
| 19 | 2 | 1 | 0 | 2 | 19 | Reserved | reserved | reserved | 2 |
| 20 | 2 | 1 | 1 | 2 | 20 | Reserved | reserved | reserved | 2 |
| 21 | 2 | 1 | 2 | 2 | 21 | Reserved | reserved | reserved | 2 |
| 22 | 2 | 1 | 3 | 2 | 22 | Reserved | reserved | reserved | 2 |
| 23 | 2 | 1 | 4 | 2 | 23 | Reserved | reserved | reserved | 2 |
| 24 | 2 | 1 | 5 | 2 | 24 | Reserved | reserved | reserved | 2 |
| 25 | 2 | 1 | 6 | 2 | 25 | Reserved | reserved | reserved | 2 |
| 26 | 2 | 1 | 7 | 2 | 26 | Reserved | reserved | reserved | 2 |
| 27 | 2 | 2 | 0, 1 | 2 | 27 | Reserved | reserved | reserved | 2 |
| 28 | 2 | 2 | 2, 3 | 2 | 28 | Reserved | reserve | reserved | 2 |
| 29 | 2 | 2 | 4, 5 | 2 | 29 | Reserved | reserved | reserved | 2 |
| 30 | 2 | 2 | 6, 7 | 2 | 30 | Reserved | reserved | reserved | 2 |
| 31 | 2 | 3 | 0, 1, 4 | 2 | 31 | Reserved | reserved | reserved | 2 |
| 32 | 2 | 3 | 2, 3, 6 | 2 | 32 | Reserved | reserved | reserved | 2 |
| 33 | 2 | 4 | 0, 1, 4, 5 | 2 | 33 | Reserved | reserved | reserved | 2 |
| 34 | 2 | 4 | 2, 3, 6, 7 | 2 | 34 | Reserved | reserved | reserved | 2 |
| 35 | 2 | 2 | 0, 2 | 1 | 35 | 2 | 5 | 0-4 | 2 |
| 36 | 2 | 2 | 0, 2 | 2 | 36 | 2 | 6 | 0-4, 6 | 2 |
| 37 | 2 | 3 | 0-2 | 2 | 37 | Reserved | reserved | reserved | reserved |
| 38 | 2 | 4 | 0-3 | 2 | 38 | Reserved | reserved | reserved | reserved. |

6. The method according to claim 4, wherein in the DMRS configuration information corresponding to the DMRS type 2, a correspondence between a number of CDM groups, a port, and a number of symbols satisfies a correspondence shown by one or more rows in the following table:

| One Codeword (≤4 Layers) | | | | | Two Codewords (>4 Layers) | | | | |
|---|---|---|---|---|---|---|---|---|---|
| Value | RMI (number of co-scheduled CDM groups) | UE rank | ports | number of symbols | Value | RMI (number of co-scheduled CDM groups) | UE rank | ports | number of symbols |
| 0 | 1 | 1 | 0 | 1 | 0 | 3 | 5 | 0-4 | 1 |
| 1 | 1 | 1 | 1 | 1 | 1 | 3 | 6 | 0-5 | 1 |
| 2 | 1 | 2 | 0, 1 | 1 | 2 | Reserved | reserved | reserved | 1 |
| 3 | 2 | 1 | 0 | 1 | 3 | Reserved | reserved | reserved | 1 |
| 4 | 2 | 1 | 1 | 1 | 4 | Reserved | reserved | reserved | 1 |
| 5 | 2 | 1 | 2 | 1 | 5 | Reserved | reserved | reserved | 1 |
| 6 | 2 | 1 | 3 | 1 | 6 | Reserved | reserved | reserved | 1 |
| 7 | 2 | 2 | 0, 1 | 1 | 7 | Reserved | reserved | reserved | 1 |
| 8 | 2 | 2 | 2, 3 | 1 | 8 | Reserved | reserved | reserved | 1 |
| 9 | 2 | 3 | 0-2 | 1 | 9 | Reserved | reserved | reserved | 1 |
| 10 | 2 | 4 | 0-3 | 1 | 10 | Reserved | reserved | reserved | 1 |
| 11 | 3 | 1 | 0 | 1 | 11 | Reserved | reserved | reserved | 1 |
| 12 | 3 | 1 | 1 | 1 | 12 | Reserved | reserved | reserved | 1 |
| 13 | 3 | 1 | 2 | 1 | 13 | Reserved | reserved | reserved | 1 |
| 14 | 3 | 1 | 3 | 1 | 14 | Reserved | reserved | reserved | 1 |
| 15 | 3 | 1 | 4 | 1 | 15 | Reserved | reserved | reserved | 1 |
| 16 | 3 | 1 | 5 | 1 | 16 | Reserved | reserved | reserved | 1 |
| 17 | 3 | 2 | 0, 1 | 1 | 17 | Reserved | reserved | reserved | 1 |
| 18 | 3 | 2 | 2, 3 | 1 | 18 | Reserved | reserved | reserved | 1 |
| 19 | 3 | 2 | 4, 5 | 1 | 19 | Reserved | reserved | reserved | 1 |
| 20 | 3 | 3 | 0-2 | 1 | 20 | Reserved | reserved | reserved | 1 |
| 21 | 3 | 3 | 3-5 | 1 | 21 | Reserved | reserved | reserved | 1 |
| 22 | 3 | 4 | 0-3 | 1 | 22 | Reserved | reserved | reserved | 1 |
| 23 | 1 | 1 | 0 | 2 | 23 | 2 | 5 | 0-2, 6, 7 | 2 |
| 24 | 1 | 1 | 1 | 2 | 24 | 2 | 6 | 0-3, 6, 7 | 2 |
| 25 | 1 | 1 | 6 | 2 | 25 | 2 | 7 | 0-3, 6-8 | 2 |
| 26 | 1 | 1 | 7 | 2 | 26 | 2 | 8 | 0-3, 6-9 | 2 |
| 27 | 1 | 2 | 0, 1 | 2 | 27 | Reserved | reserved | reserved | 2 |
| 28 | 1 | 2 | 6, 7 | 2 | 28 | Reserved | reserved | reserved | 2 |
| 29 | 1 | 3 | 0, 1, 6 | 2 | 29 | Reserved | reserved | reserved | 2 |
| 30 | 1 | 4 | 0, 1, 6, 7 | 2 | 30 | Reserved | reserved | reserved | 2 |

| One Codeword (≤4 Layers) | | | | Two Codewords (>4 Layers) | | | | |
|---|---|---|---|---|---|---|---|---|
| Value | RMI (number of co-scheduled CDM groups) | UE rank | ports | number of symbols | Value | RMI (number of co-scheduled CDM groups) | UE rank | ports | number of symbols |
| 31 | 2 | 1 | 0 | 2 | 31 | Reserved | reserved | reserved | 2 |
| 32 | 2 | 1 | 1 | 2 | 32 | Reserved | reserved | reserved | 2 |
| 33 | 2 | 1 | 2 | 2 | 33 | Reserved | reserved | reserved | 2 |
| 34 | 2 | 1 | 3 | 2 | 34 | Reserved | reserved | reserved | 2 |
| 35 | 2 | 1 | 6 | 2 | 35 | Reserved | reserved | reserved | 2 |
| 36 | 2 | 1 | 7 | 2 | 36 | Reserved | reserved | reserved | 2 |
| 37 | 2 | 1 | 8 | 2 | 37 | Reserved | reserved | reserved | 2 |
| 38 | 2 | 1 | 9 | 2 | 38 | Reserved | reserved | reserved | 2 |
| 39 | 2 | 2 | 0, 1 | 2 | 39 | Reserved | reserved | reserved | 2 |
| 40 | 2 | 2 | 2, 3 | 2 | 40 | Reserved | reserved | reserved | 2 |
| 41 | 2 | 2 | 6, 7 | 2 | 41 | Reserved | reserved | reserved | 2 |
| 42 | 2 | 2 | 8, 9 | 2 | 42 | Reserved | reserved | reserved | 2 |
| 43 | 2 | 3 | 0, 1, 6 | 2 | 43 | Reserved | reserved | reserved | 2 |
| 44 | 2 | 3 | 2, 3, 8 | 2 | 44 | Reserved | reserved | reserved | 2 |
| 45 | 2 | 4 | 0, 1, 6, 7 | 2 | 45 | Reserved | reserved | reserved | 2 |
| 46 | 2 | 4 | 2, 3, 8, 9 | 2 | 46 | Reserved | reserved | reserved | 2 |
| 47 | 3 | 1 | 0 | 2 | 47 | Reserved | reserved | reserved | 2 |
| 48 | 3 | 1 | 1 | 2 | 48 | Reserved | reserved | reserved | 2 |
| 49 | 3 | 1 | 2 | 2 | 49 | Reserved | reserved | reserved | 2 |
| 50 | 3 | 1 | 3 | 2 | 50 | Reserved | reserved | reserved | 2 |
| 51 | 3 | 1 | 4 | 2 | 51 | Reserved | reserved | reserved | 2 |
| 52 | 3 | 1 | 5 | 2 | 52 | Reserved | reserved | reserved | 2 |
| 53 | 3 | 1 | 6 | 2 | 53 | Reserved | reserved | reserved | 2 |
| 54 | 3 | 1 | 7 | 2 | 54 | Reserved | reserved | reserved | 2 |
| 55 | 3 | 1 | 8 | 2 | 55 | Reserved | reserved | reserved | 2 |
| 56 | 3 | 1 | 9 | 2 | 56 | Reserved | reserved | reserved | 2 |
| 57 | 3 | 1 | 10 | 2 | 57 | Reserved | reserved | reserved | 2 |
| 58 | 3 | 1 | 11 | 2 | 58 | Reserved | reserved | reserved | 2 |
| 59 | 3 | 2 | 0, 1 | 2 | 59 | Reserved | reserved | reserved | 2 |
| 60 | 3 | 2 | 2, 3 | 2 | 60 | Reserved | reserved | reserved | 2 |
| 61 | 3 | 2 | 4, 5 | 2 | 61 | Reserved | reserved | reserved | 2 |
| 62 | 3 | 2 | 6, 7 | 2 | 62 | Reserved | reserved | reserved | 2 |
| 63 | 3 | 2 | 8, 9 | 2 | 63 | Reserved | reserved | reserved | 2 |
| 64 | 3 | 2 | 10, 11 | 2 | 64 | Reserved | reserved | reserved | 2 |
| 65 | 3 | 3 | 0, 1, 6 | 2 | 65 | Reserved | reserved | reserved | 2 |
| 66 | 3 | 3 | 2, 3, 8 | 2 | 66 | Reserved | reserved | reserved | 2 |
| 67 | 3 | 3 | 4, 5, 10 | 2 | 67 | Reserved | reserved | reserved | 2 |
| 68 | 3 | 4 | 0, 1, 6, 7 | 2 | 68 | Reserved | reserved | reserved | 2 |
| 69 | 3 | 4 | 2, 3, 8, 9 | 2 | 69 | Reserved | reserved | reserved | 2 |
| 70 | 3 | 4 | 4, 5, 10, 11 | 2 | 70 | Reserved | reserved | reserved | 2 |
| 71 | 2 | 2 | 0, 2 | 1 | 71 | 3 | 5 | 0-4 | 2 |
| 72 | 3 | 3 | 0, 2, 4 | 1 | 72 | 2 | 5 | 0-3, 6 | 2 |
| 73 | 3 | 4 | 0-2, 4 | 1 | 73 | 3 | 6 | 0-5 | 2 |
| 74 | 2 | 2 | 0, 2 | 2 | 74 | 2 | 6 | 0-3, 6, 8 | 2 |
| 75 | 3 | 3 | 0, 2, 4 | 2 | 75 | 3 | 7 | 0-6 | 2 |
| 76 | 2 | 4 | 0, 1, 2, 3 | 2 | 76 | 3 | 8 | 0-6, 8 | 2 |
| 77 | 3 | 4 | 0, 1, 2, 4 | 2 | 77 | 3 | 8 | 0-7 | 2 |
| 78 | 3 | 3 | 2, 3, 7 | 2 | 78 | Reserved | reserved | reserved | reserved |
| 79 | 3 | 3 | 8, 9, 4 | 2 | 79 | Reserved | reserved | reserved | reserved |
| 80 | 3 | 3 | 10, 11, 5 | 2 | 80 | Reserved | reserved | reserved | reserved |
| 81 | 3 | 3 | 7, 9, 11 | 2 | 81 | Reserved | reserved | reserved | reserved. |

7. The method according to claim 1, wherein an available range of a DMRS configuration information is configured by using an RRC signaling, and the available range is determined based on at least one of the group consisting of:
   a DMRS symbol information, and
   a maximum number of symbols of a DMRS.

8. The method according to claim 1, wherein an available range of a DMRS configuration information is associated with a parameter that is in a Radio Resource Control (RRC) signaling and that indicates a maximum number of symbols of a DMRS.

9. A terminal, comprising:
   a transceiver;
   a processor; and
   a non-transitory computer-readable medium including computer-executable instructions that, when executed by the processor, facilitate the terminal carrying out a method comprising:
   receiving, by the transceiver cooperatively operating with the processor, a demodulation reference signal (DMRS) indication information that indicates a code division multiplexing (CDM) group information of an antenna port, wherein the CDM group information comprises a number of CDM groups; and
   demodulating, by the processor, a data based on the DMRS indication information received by the transceiver,
   wherein the number of CDM groups is a number of CDM groups that have a possibility of being occupied or co-scheduled in a system and that are not used for transmitting data, and
   wherein a value is assigned for the number of CDM groups as follows:
      a value of 1 for the number of CDM groups indicates that a CDM group 1 is occupied or co-scheduled;
      a value of 2 for the number of CDM groups indicates that a CDM group 1 and a CDM group 2 are occupied or co-scheduled; and
      a value of 3 for the number of CDM groups indicates that a CDM group 1, a CDM group 2, and a CDM group 3 are occupied or co-scheduled.

10. The terminal according to claim 9, wherein a DMRS configuration information corresponding to a current DMRS transmission scheme is determined from a plurality of groups of DMRS configuration information, and the DMRS indication information is obtained based on the DMRS configuration information, wherein each group of DMRS configuration information comprises a plurality of pieces of DMRS configuration information.

11. The terminal according to claim 9, wherein a DMRS configuration information further comprises a DMRS symbol information.

12. The terminal according to claim 9 wherein in a DMRS configuration information, specific DMRS port mapping rules of a DMRS type 1 and a DMRS type 2 are as follows:
   for a 1-symbol DMRS type 1, ports comprised in a CDM group 1 are {0, 1}, and ports comprised in a CDM group 2 are {2, 3};
   for a 2-symbol DMRS type 1, ports comprised in the CDM group 1 are {0, 1, 4, 5}, and ports comprised in the CDM group 2 are {2, 3, 6, 7};
   for a 1-symbol DMRS type 2, ports comprised in the CDM group 1 are {0, 1}, ports comprised in the CDM group 2 are {2, 3}, and ports comprised in the CDM group 3 are {4, 5}; and
   for a 2-symbol DMRS type 2, ports comprised in the CDM group 1 are {0, 1, 6, 7}, ports comprised in the CDM group 2 are {2, 3, 8, 9}, and ports comprised in the CDM group 3 are {4, 5, 10, 11}.

13. The terminal according to claim 12, wherein in the DMRS configuration information corresponding to the DMRS type 1, a correspondence between a number of CDM groups, a port, and a number of symbols satisfies a correspondence shown by one or more rows in the following table:

| One Codeword (≤4 Layers) | | | | Two Codewords (>4 Layers) | | | | |
| --- | --- | --- | --- | --- | --- | --- | --- | --- |
| Value | RMI (number of co-scheduled CDM groups) | UE rank | Port | number of symbols | Value | RMI (number of co-scheduled CDM groups) | UE rank | Port | number of symbols |
| 0 | 1 | 1 | 0 | 1 | 0 | reserved | Reserved | reserved | 1 |
| 1 | 1 | 1 | 1 | 1 | 1 | reserved | reserved | reserved | 1 |
| 2 | 1 | 2 | 0, 1 | 1 | 2 | reserved | reserved | reserved | 1 |
| 3 | 2 | 1 | 0 | 1 | 3 | reserved | reserved | reserved | 1 |
| 4 | 2 | 1 | 1 | 1 | 4 | reserved | reserved | reserved | 1 |
| 5 | 2 | 1 | 2 | 1 | 5 | reserved | reserved | reserved | 1 |
| 6 | 2 | 1 | 3 | 1 | 6 | reserved | reserved | reserved | 1 |
| 7 | 2 | 2 | 0, 1 | 1 | 7 | reserved | reserved | reserved | 1 |
| 8 | 2 | 2 | 2, 3 | 1 | 8 | reserved | reserved | reserved | 1 |
| 9 | 2 | 3 | 0-2 | 1 | 9 | reserved | reserved | reserved | 1 |
| 10 | 2 | 4 | 0-3 | 1 | 10 | reserved | reserved | reserved | 1 |
| 11 | 1 | 1 | 0 | 2 | 11 | 2 | 5 | 0-2, 4, 5 | 2 |
| 12 | 1 | 1 | 1 | 2 | 12 | 2 | 6 | 0-5 | 2 |
| 13 | 1 | 1 | 4 | 2 | 13 | 2 | 7 | 0-6 | 2 |
| 14 | 1 | 1 | 5 | 2 | 14 | 2 | 8 | 0-7 | 2 |
| 15 | 1 | 2 | 0, 1 | 2 | 15 | reserved | reserved | reserved | 2 |
| 16 | 1 | 2 | 4-5 | 2 | 16 | reserved | reserved | reserved | 2 |
| 17 | 1 | 3 | 0, 1, 4 | 2 | 17 | reserved | reserved | reserved | 2 |
| 18 | 1 | 4 | 0, 1, 4, 5 | 2 | 18 | reserved | reserved | reserved | 2 |
| 19 | 2 | 1 | 0 | 2 | 19 | reserved | reserved | reserved | 2 |
| 20 | 2 | 1 | 1 | 2 | 20 | reserved | reserved | reserved | 2 |
| 21 | 2 | 1 | 2 | 2 | 21 | reserved | reserved | reserved | 2 |
| 22 | 2 | 1 | 3 | 2 | 22 | reserved | reserved | reserved | 2 |
| 23 | 2 | 1 | 4 | 2 | 23 | reserved | reserved | reserved | 2 |
| 24 | 2 | 1 | 5 | 2 | 24 | reserved | reserved | reserved | 2 |
| 25 | 2 | 1 | 6 | 2 | 25 | reserved | reserved | reserved | 2 |
| 26 | 2 | 1 | 7 | 2 | 26 | reserved | reserved | reserved | 2 |

-continued

| | One Codeword (≤4 Layers) | | | | Two Codewords (>4 Layers) | | | |
|---|---|---|---|---|---|---|---|---|
| Value | RMI (number of co-scheduled CDM groups) | UE rank | Port | number of symbols | Value | RMI (number of co-scheduled CDM groups) | UE rank | Port | number of symbols |
| 27 | 2 | 2 | 0, 1 | 2 | 27 | reserved | reserved | reserved | 2 |
| 28 | 2 | 2 | 2, 3 | 2 | 28 | reserved | reserved | reserved | 2 |
| 29 | 2 | 2 | 4, 5 | 2 | 29 | reserved | reserved | reserved | 2 |
| 30 | 2 | 2 | 6, 7 | 2 | 30 | reserved | reserved | reserved | 2 |
| 31 | 2 | 3 | 0, 1, 4 | 2 | 31 | reserved | reserved | reserved | 2 |
| 32 | 2 | 3 | 2, 3, 6 | 2 | 32 | reserved | reserved | reserved | 2 |
| 33 | 2 | 4 | 0, 1, 4, 5 | 2 | 33 | reserved | reserved | reserved | 2 |
| 34 | 2 | 4 | 2, 3, 6, 7 | 2 | 34 | reserved | reserved | reserved | 2 |
| 35 | 2 | 2 | 0, 2 | 1 | 35 | 2 | 5 | 0-4 | 2 |
| 36 | 2 | 2 | 0, 2 | 2 | 36 | 2 | 6 | 0-4, 6 | 2 |
| 37 | 2 | 3 | 0-2 | 2 | 37 | reserved | reserved | reserved | reserved |
| 38 | 2 | 4 | 0-3 | 2 | 38 | reserved | reserved | reserved | reserved. |

14. The terminal according to claim 12, wherein in the DMRS configuration information corresponding to the DMRS type 2, a correspondence between a number of CDM groups, a port, and a number of symbols satisfies a correspondence shown by one or more rows in the following table:

| | One Codeword (≤4 Layers) | | | | Two Codewords (>4 Layers) | | | |
|---|---|---|---|---|---|---|---|---|
| Value | RMI (number of co-scheduled CDM groups) | UE rank | Port | number of symbols | Value | RMI (number of co-scheduled CDM groups) | UE rank | Port | number of symbols |
| 0 | 1 | 1 | 0 | 1 | 0 | 3 | 5 | 0-4 | 1 |
| 1 | 1 | 1 | 1 | 1 | 1 | 3 | 6 | 0-5 | 1 |
| 2 | 1 | 2 | 0, 1 | 1 | 2 | reserved | reserved | reserved | 1 |
| 3 | 2 | 1 | 0 | 1 | 3 | reserved | reserved | reserved | 1 |
| 4 | 2 | 1 | 1 | 1 | 4 | reserved | reserved | reserved | 1 |
| 5 | 2 | 1 | 2 | 1 | 5 | reserved | reserved | reserved | 1 |
| 6 | 2 | 1 | 3 | 1 | 6 | reserved | reserved | reserved | 1 |
| 7 | 2 | 2 | 0, 1 | 1 | 7 | reserved | reserved | reserved | 1 |
| 8 | 2 | 2 | 2, 3 | 1 | 8 | reserved | reserved | reserved | 1 |
| 9 | 2 | 3 | 0-2 | 1 | 9 | reserved | reserved | reserved | 1 |
| 10 | 2 | 4 | 0-3 | 1 | 10 | reserved | reserved | reserved | 1 |
| 11 | 3 | 1 | 0 | 1 | 11 | reserved | reserved | reserved | 1 |
| 12 | 3 | 1 | 1 | 1 | 12 | reserved | reserved | reserved | 1 |
| 13 | 3 | 1 | 2 | 1 | 13 | reserved | reserved | reserved | 1 |
| 14 | 3 | 1 | 3 | 1 | 14 | reserved | reserved | reserved | 1 |
| 15 | 3 | 1 | 4 | 1 | 15 | reserved | reserved | reserved | 1 |
| 16 | 3 | 1 | 5 | 1 | 16 | reserved | reserved | reserved | 1 |
| 17 | 3 | 2 | 0, 1 | 1 | 17 | reserved | reserved | reserved | 1 |
| 18 | 3 | 2 | 2, 3 | 1 | 18 | reserved | reserved | reserved | 1 |
| 19 | 3 | 2 | 4, 5 | 1 | 19 | reserved | reserved | reserved | 1 |
| 20 | 3 | 3 | 0-2 | 1 | 20 | reserved | reserved | reserved | 1 |
| 21 | 3 | 3 | 3-5 | 1 | 21 | reserved | reserved | reserved | 1 |
| 22 | 3 | 4 | 0-3 | 1 | 22 | reserved | reserved | reserved | 1 |
| 23 | 1 | 1 | 0 | 2 | 23 | 2 | 5 | 0-2, 6, 7 | 2 |
| 24 | 1 | 1 | 1 | 2 | 24 | 2 | 6 | 0-3, 6, 7 | 2 |
| 25 | 1 | 1 | 6 | 2 | 25 | 2 | 7 | 0-3, 6-8 | 2 |
| 26 | 1 | 1 | 7 | 2 | 26 | 2 | 8 | 0-3, 6-9 | 2 |
| 27 | 1 | 2 | 0, 1 | 2 | 27 | reserved | reserved | reserved | 2 |
| 28 | 1 | 2 | 6, 7 | 2 | 28 | reserved | reserved | reserved | 2 |
| 29 | 1 | 3 | 0, 1, 6 | 2 | 29 | reserved | reserved | reserved | 2 |
| 30 | 1 | 4 | 0, 1, 6, 7 | 2 | 30 | reserved | reserved | reserved | 2 |
| 31 | 2 | 1 | 0 | 2 | 31 | reserved | reserved | reserved | 2 |
| 32 | 2 | 1 | 1 | 2 | 32 | reserved | reserved | reserved | 2 |
| 33 | 2 | 1 | 2 | 2 | 33 | reserved | reserved | reserved | 2 |
| 34 | 2 | 1 | 3 | 2 | 34 | reserved | reserved | reserved | 2 |
| 35 | 2 | 1 | 6 | 2 | 35 | reserved | reserved | reserved | 2 |
| 36 | 2 | 1 | 7 | 2 | 36 | reserved | reserved | reserved | 2 |
| 37 | 2 | 1 | 8 | 2 | 37 | reserved | reserved | reserved | 2 |
| 38 | 2 | 1 | 9 | 2 | 38 | reserved | reserved | reserved | 2 |
| 39 | 2 | 2 | 0, 1 | 2 | 39 | reserved | reserved | reserved | 2 |
| 40 | 2 | 2 | 2, 3 | 2 | 40 | reserved | reserved | reserved | 2 |
| 41 | 2 | 2 | 6, 7 | 2 | 41 | reserved | reserved | reserved | 2 |
| 42 | 2 | 2 | 8, 9 | 2 | 42 | reserved | reserved | reserved | 2 |

| | One Codeword (≤4 Layers) | | | | | Two Codewords (>4 Layers) | | | |
|---|---|---|---|---|---|---|---|---|---|
| Value | RMI (number of co-scheduled CDM groups) | UE rank | Port | number of symbols | Value | RMI (number of co-scheduled CDM groups) | UE rank | Port | number of symbols |
| 43 | 2 | 3 | 0, 1, 6 | 2 | 43 | reserved | reserved | reserved | 2 |
| 44 | 2 | 3 | 2, 3, 8 | 2 | 44 | reserved | reserved | reserved | 2 |
| 45 | 2 | 4 | 0, 1, 6, 7 | 2 | 45 | reserved | reserved | reserved | 2 |
| 46 | 2 | 4 | 2, 3, 8, 9 | 2 | 46 | reserved | reserved | reserved | 2 |
| 47 | 3 | 1 | 0 | 2 | 47 | reserved | reserved | reserved | 2 |
| 48 | 3 | 1 | 1 | 2 | 48 | reserved | reserved | reserved | 2 |
| 49 | 3 | 1 | 2 | 2 | 49 | reserved | reserved | reserved | 2 |
| 50 | 3 | 1 | 3 | 2 | 50 | reserved | reserved | reserved | 2 |
| 51 | 3 | 1 | 4 | 2 | 51 | reserved | reserved | reserved | 2 |
| 52 | 3 | 1 | 5 | 2 | 52 | reserved | reserved | reserved | 2 |
| 53 | 3 | 1 | 6 | 2 | 53 | reserved | reserved | reserved | 2 |
| 54 | 3 | 1 | 7 | 2 | 54 | reserved | reserved | reserved | 2 |
| 55 | 3 | 1 | 8 | 2 | 55 | reserved | reserved | reserved | 2 |
| 56 | 3 | 1 | 9 | 2 | 56 | reserved | reserved | reserved | 2 |
| 57 | 3 | 1 | 10 | 2 | 57 | reserved | reserved | reserved | 2 |
| 58 | 3 | 1 | 11 | 2 | 58 | reserved | reserved | reserved | 2 |
| 59 | 3 | 2 | 0, 1 | 2 | 59 | reserved | reserved | reserved | 2 |
| 60 | 3 | 2 | 2, 3 | 2 | 60 | reserved | reserved | reserved | 2 |
| 61 | 3 | 2 | 4, 5 | 2 | 61 | reserved | reserved | reserved | 2 |
| 62 | 3 | 2 | 6, 7 | 2 | 62 | reserved | reserved | reserved | 2 |
| 63 | 3 | 2 | 8, 9 | 2 | 63 | reserved | reserved | reserved | 2 |
| 64 | 3 | 2 | 10, 11 | 2 | 64 | reserved | reserved | reserved | 2 |
| 65 | 3 | 3 | 0, 1, 6 | 2 | 65 | reserved | reserved | reserved | 2 |
| 66 | 3 | 3 | 2, 3, 8 | 2 | 66 | reserved | reserved | reserved | 2 |
| 67 | 3 | 3 | 4, 5, 10 | 2 | 67 | reserved | reserved | reserved | 2 |
| 68 | 3 | 4 | 0, 1, 6, 7 | 2 | 68 | reserved | reserved | reserved | 2 |
| 69 | 3 | 4 | 2, 3, 8, 9 | 2 | 69 | reserved | reserved | reserved | 2 |
| 70 | 3 | 4 | 4, 5, 10, 11 | 2 | 70 | reserved | reserved | reserved | 2 |
| 71 | 2 | 2 | 0, 2 | 1 | 71 | 3 | 5 | 0-4 | 2 |
| 72 | 3 | 3 | 0, 2, 4 | 1 | 72 | 2 | 5 | 0-3, 6 | 2 |
| 73 | 3 | 4 | 0-2, 4 | 1 | 73 | 3 | 6 | 0-5 | 2 |
| 74 | 2 | 2 | 0, 2 | 2 | 74 | 2 | 6 | 0-3, 6, 8 | 2 |
| 75 | 3 | 3 | 0, 2, 4 | 2 | 75 | 3 | 7 | 0-6 | 2 |
| 76 | 2 | 4 | 0, 1, 2, 3 | 2 | 76 | 3 | 8 | 0-6, 8 | 2 |
| 77 | 3 | 4 | 0, 1, 2, 4 | 2 | 77 | 3 | 8 | 0-7 | 2 |
| 78 | 3 | 3 | 2, 3, 7 | 2 | 78 | reserved | reserved | reserved | reserved |
| 79 | 3 | 3 | 8, 9, 4 | 2 | 79 | reserved | reserved | reserved | reserved |
| 80 | 3 | 3 | 10, 11, 5 | 2 | 80 | reserved | reserved | reserved | reserved |
| 81 | 3 | 3 | 7, 9, 11 | 2 | 81 | reserved | reserved | reserved | reserved. |

15. The terminal according to claim 9, wherein an available range of a DMRS configuration information is configured by using Radio Resource Control (RRC) signaling, and the available range is determined based on DMRS symbol information or a maximum number of symbols of a DMRS.

16. The terminal according to claim 9, wherein an available range of a DMRS configuration information is associated with a parameter that is in Radio Resource Control (RRC) signaling and that indicates a maximum number of symbols of a DMRS.

17. A chip, comprising at least one processor and an interface, wherein
the at least one processor is configured to read and execute
a program instruction to implement a demodulation reference signal (DMRS) receiving method, comprising:
controlling receiving a DMRS indication information that indicates a code division multiplexing (CDM) group information of an antenna port, wherein the CDM group information comprises a number of CDM groups; and
demodulating a data based on the DMRS indication information, wherein the number of CDM groups is a number of CDM groups that have a possibility of being occupied or co-scheduled in a system and that are not used for transmitting data; and
wherein a value is assigned for the number of CDM groups as follows:
a value of 1 for the number of CDM groups indicates that a CDM group 1 is occupied or co-scheduled;
a value of 2 for the number of CDM groups indicates that a CDM group 1 and a CDM group 2 are occupied or co-scheduled; and
a value of 3 for the number of CDM groups indicates that a CDM group 1, a CDM group 2, and a CDM group 3 are occupied or co-scheduled.

18. The chip according to claim 17, wherein a DMRS configuration information corresponding to a current DMRS transmission scheme is determined from a plurality of groups of DMRS configuration information, and the DMRS indication information is obtained based on the DMRS configuration information, wherein each group of DMRS configuration information comprises a plurality of pieces of DMRS configuration information.

19. A non-transitory computer storage medium, wherein the computer non-transitory storage medium stores an instruction, and when being run on a processing component of a computer, the instruction enables the processing component to perform a demodulation reference signal receiving method comprising:
controlling receiving of a demodulation reference signal (DMRS) indication information that indicates a code division multiplexing (CDM) group information of an antenna port, wherein the CDM group information comprises a number of CDM groups; and demodulating a data based on the DMRS indication information, wherein the number of CDM groups is a number of CDM groups that have a possibility of being occupied or co-scheduled in a system and that are not used for transmitting data; and wherein a value is assigned for the number of CDM groups as follows:
- a value of 1 for the number of CDM groups indicates that a CDM group 1 is occupied or co-scheduled;
- a value of 2 for the number of CDM groups indicates that a CDM group 1 and a CDM group 2 are occupied or co-scheduled; and
- a value of 3 for the number of CDM groups indicates that a CDM group 1, a CDM group 2, and a CDM group 3 are occupied or co-scheduled.

20. The non-transitory computer storage medium according to claim 19, wherein a DMRS configuration information corresponding to a current DMRS transmission scheme is determined from a plurality of groups of DMRS configuration information, and the DMRS indication information is obtained based on the DMRS configuration information, wherein each group of DMRS configuration information comprises a plurality of pieces of DMRS configuration information.

* * * * *